US012437197B2

(12) United States Patent
Tian et al.

(10) Patent No.: US 12,437,197 B2
(45) Date of Patent: Oct. 7, 2025

(54) IMAGE PROCESSING METHOD AND RELATED DEVICE

(71) Applicant: HUAWEI TECHNOLOGIES CO., LTD., Guangdong (CN)

(72) Inventors: Jingduo Tian, Shenzhen (CN); Xiaoe Wang, Shenzhen (CN); Chen Yang, Shenzhen (CN); Jinlei Zhang, Shanghai (CN); Tizheng Wang, Shenzhen (CN); Shisheng Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 18/476,027

(22) Filed: Sep. 27, 2023

(65) Prior Publication Data

US 2024/0031675 A1   Jan. 25, 2024

Related U.S. Application Data

(63) Continuation of application No. PCT/CN2022/082980, filed on Mar. 25, 2022.

(30) Foreign Application Priority Data

Mar. 29, 2021   (CN) .......................... 202110333994.9

(51) Int. Cl.
*H04N 23/68* (2023.01)
*G06N 3/08* (2023.01)
(Continued)

(52) U.S. Cl.
CPC ................. *G06N 3/08* (2013.01); *G06T 5/80* (2024.01); *G06V 10/761* (2022.01);
(Continued)

(58) Field of Classification Search
None
See application file for complete search history.

(56) References Cited

U.S. PATENT DOCUMENTS 8,525,871 B2   9/2013  Agarwala et al.
9,787,902 B1 * 10/2017  Beysserie ............ H04N 23/683
(Continued)

FOREIGN PATENT DOCUMENTS

CN   102104767 B   3/2015
CN   107113376 B   7/2019
(Continued)

OTHER PUBLICATIONS

MChang Shih et al.:"Distortion-free wide-angle portraits on camera phones."Jul. 12, 2019, total 12 pages.

*Primary Examiner* — Cynthia Segura
(74) *Attorney, Agent, or Firm* — WOMBLE BOND DICKINSON (US) LLP

(57) ABSTRACT

This application provides an image processing method, including: performing stabilization on two adjacent image frames of a video stream acquired by a camera to obtain cropped areas, and performing perspective distortion correction on the cropped areas obtained through stabilization. Because the cropped areas output after stabilization is performed on the two adjacent frames include same or basically same content, it can be ensured that a subsequently generated video is smooth and stable. In this application, position relationships, for perspective distortion correction, between the cropped areas obtained through stabilization are further mapped, so that degrees or effects of perspective distortion correction of the adjacent frames of the subsequently generated video are the same, in other words, degrees of transformation of a same object in the images are the same.

20 Claims, 49 Drawing Sheets

(51) Int. Cl.
*G06T 5/80* (2024.01)
*G06V 10/74* (2022.01)
*H04N 23/69* (2023.01)

(52) U.S. Cl.
CPC ........... *H04N 23/683* (2023.01); *H04N 23/69* (2023.01); *G06T 2207/20132* (2013.01)

(56) References Cited

U.S. PATENT DOCUMENTS

| | | | |
|---|---|---|---|
| 2011/0150443 | A1 | 6/2011 | Furuyama |
| 2016/0006978 | A1 | 1/2016 | Satoh et al. |
| 2018/0082457 | A1* | 3/2018 | Tao .......................... G06T 11/60 |
| 2019/0356856 | A1* | 11/2019 | Derbanne ............ H04N 23/683 |
| 2020/0250796 | A1* | 8/2020 | Tao ............................ G06T 7/13 |
| 2020/0267320 | A1* | 8/2020 | Song ...................... H04N 23/45 |

FOREIGN PATENT DOCUMENTS

| | | | |
|---|---|---|---|
| CN | 110519486 | A | 11/2019 |
| CN | 110602393 | A | 12/2019 |
| CN | 111861932 | A | 10/2020 |
| JP | 2005195656 | A | 7/2005 |
| JP | 2005252626 | A | 9/2005 |
| JP | 2018097870 | A | 6/2018 |
| JP | 2020520603 | A | 7/2020 |
| JP | 2021040300 | A | 3/2021 |
| WO | 2019234877 | A1 | 12/2019 |

* cited by examiner

CONT. FROM FIG. 4b-1

CONT.
FROM

IMAGE PROCESSING METHOD AND RELATED DEVICE

CROSS-REFERENCE TO RELATED APPLICATIONS

This application is a continuation of International Application No. PCT/CN2022/082980, filed on Mar. 25, 2022, which claims priority to Chinese Patent Application No. 202110333994.9, filed on Mar. 29, 2021. The disclosures of the aforementioned applications are hereby incorporated by reference in their entireties.

TECHNICAL FIELD

This application relates to the image processing field, and in particular, to an image processing method and a related device.

BACKGROUND

When a camera is in a mode in which a wide-angle camera acquires an image or a mode in which a medium-focus camera acquires an image, an acquired original image has obvious perspective distortion. Specifically, perspective distortion (also referred to as 3D distortion) is transformation in 3D object imaging (for example, transverse stretching, radial stretching, and a combination thereof) caused by different magnification ratios, when a three-dimensional shape in space is mapped to an image plane, due to a difference in depths of field for photographing. Therefore, perspective distortion correction needs to be performed on the image.

When a user holds a terminal for photographing, because the user cannot keep a posture of holding the terminal stably, the terminal shakes in a direction of an image plane. To be specific, when the user wants to hold the terminal to photograph a target area, because a posture of the user when holding the terminal is unstable, the target area has a large offset between adjacent image frames acquired by the camera, and consequently, a video acquired by the camera is blurry.

However, it is a common problem that terminals may shake, and an existing technology for performing perspective distortion correction is not mature. As a result, a video that has been corrected still has low quality.

SUMMARY

Embodiments of this application provide an image display method, so that an obvious jello phenomenon or effect does not occur, thereby improving quality of a video output.

According to a first aspect, this application provides an image processing method. The method is used by a terminal to acquire a video stream in real time, and the method includes:
performing stabilization on an acquired first image to obtain a first cropped area;
performing perspective distortion correction on the first cropped area to obtain a third cropped area;
obtaining a third image based on the first image and the third cropped area; and
performing stabilization on an acquired second image to obtain a second cropped area, where the second cropped area is related to the first cropped area and shake information, and the shake information indicates a shake that occurs in a process in which the terminal acquires the first image and the second image; and for stabilization, an offset shift (including an offset direction and an offset distance) of a picture in a viewfinder frame of a latter original image frame from a picture of a former original image frame needs to be determined. In an embodiment, the offset shift may be determined based on a shake that occurs in a process in which the terminal acquires two adjacent original image frames. In an embodiment, the offset shift may be a posture change that occurs in a process in which the terminal acquires two adjacent original image frames. The posture change may be obtained based on a photographed posture corresponding to the viewfinder frame in a previous original image frame and a posture when the terminal photographs a current original image frame.

The method further includes: performing perspective distortion correction on the second cropped area to obtain a fourth cropped area; and
obtaining a fourth image based on the second image and the fourth cropped area, where the third image and the fourth image are used for generating a target video, where
the first image and the second image are a pair of original images that are acquired by the terminal and that are adjacent to each other in time domain.

Different from performing perspective distortion correction on all areas of an original image according to an existing embodiment, in this embodiment of this application, perspective distortion correction is performed on the first cropped area. As when a terminal device shakes, content misalignment usually occurs between two adjacent original image frames acquired by the camera, positions of cropped areas to be output after stabilization is performed on the two image frames are different in an original image, that is, distances between the cropped areas to be output after stabilization is performed on the two image frames and a center point of the original image are different. However, sizes of the cropped areas to be output after stabilization is performed on the two frames are the same. Therefore, if perspective distortion correction is performed on the cropped areas obtained through stabilization, degrees of perspective distortion correction performed on the adjacent frames are the same (because distances between each sub-area in each of the cropped areas output through stabilization on the two frames and a center point of the cropped area output through stabilization are the same). In addition, because the cropped areas output through stabilization on the two adjacent frames are images that include same or basically same content, and degrees of transformation of a same object in the images are the same, that is, inter-frame consistency is kept, an obvious jello phenomenon or effect does not occur, thereby improving quality of a video output. It should be understood that, the inter-frame consistency herein may also be referred to as time-domain consistency, and indicates that processing results for areas with same content in adjacent frames are the same.

Therefore, in this embodiment of this application, perspective distortion correction is not performed on the first image, but perspective distortion correction is performed on the first cropped area obtained through stabilization, to obtain the third cropped area. Same processing is further performed for a frame (the second image) adjacent to the first image, that is, perspective distortion correction is performed on the second cropped area obtained through stabilization, to obtain the fourth cropped area. In this way, degrees of transformation correction of a same object in the third cropped area and the fourth cropped area are the same, so that inter-frame consistency is kept, and an obvious jello phenomenon does not occur, thereby improving quality of a video output.

In this embodiment of this application, a same target object (for example, a human object) may be included in cropped areas of a former frame and a latter frame. Because an object for perspective distortion correction is a cropped area obtained through stabilization, for the target object, a difference between degrees of transformation of the target object in the former frame and the latter frame due to perspective distortion correction is tiny. That the difference is tiny may be understood as that it is difficult to identify a shape difference from naked eyes of a human, or it is difficult to find a jello phenomenon between the former frame and the latter frame from naked eyes of a human.

The image processing method according to the first aspect may be further understood as follows: For processing on a single image (for example, the second image) in an acquired video stream, stabilization may be performed on the acquired second image to obtain the second cropped area, where the second cropped area is related to the first cropped area and shake information; the first cropped area is obtained after stabilization is performed on an image frame that is adjacent to the second image and that is before the second image in time domain, where the shake information indicates a shake that occurs in a process in which the terminal acquires the second image and the image frame that is adjacent to the second image and that is before the second image in the time domain; and perspective distortion correction is performed on the second cropped area to obtain the fourth cropped area, the fourth image is obtained based on the second image and the fourth cropped area, and the target video is generated based on the fourth image. It should be understood that the second image may be any image that is not the first in the acquired video stream, and the image that is not the first refers to an image frame that is not the first in the video stream in time domain. The target video may be obtained by processing a plurality of images in the video stream in a same manner as that of processing the second image.

In an embodiment, a direction of an offset of a position of the second cropped area in the second image relative to a position of the first cropped area in the first image is opposite to a shake direction, on an image plane, of the shake that occurs in the process in which the terminal acquires the first image and the second image.

Performing stabilization is to eliminate a shake in an acquired video due to a posture change when a user holds a terminal device. In an embodiment, performing stabilization is to crop the original image acquired by the camera, to obtain an output in a viewfinder frame. The output in the viewfinder frame is an output of stabilization. When the terminal has a large posture change within a very short time, there is a large offset of a picture in the viewfinder frame of a latter image frame from a picture of a former image frame. For example, compared with when an $n^{th}$ frame is acquired, when the terminal acquires an $(n+1)^{th}$ frame, there is a shake in a direction A in a direction of an image plane (it should be understood that the shake in the direction A may be a shake of a direction of a principal optical axis of the camera on the terminal toward the direction A or a shake of a position of an optical center of the camera on the terminal toward the direction A in the direction of the image plane). In this case, a picture in the viewfinder frame of the $(n+1)^{th}$ image frame is deviated, in the $n^{th}$ image frame, toward a direction opposite to the direction A.

In an embodiment, the first cropped area indicates a first sub-area in the first image, and the second cropped area indicates a second sub-area in the second image.

A similarity between first image content, in the first image, corresponding to the first sub-area and second image content, in the second image, corresponding to the second sub-area is greater than a similarity between the first image and the second image. The similarity between the image content may be understood as a similarity between scenarios in images, a similarity between backgrounds in the images, or a similarity between target subjects in the images.

In an embodiment, the similarity between the images may be understood as an overall similarity between image content in an image area at a same position. Due to the shake of the terminal, image content of the first image and the second image is misaligned, and positions of same image content in the images are different. In other words, a similarity between image content in image areas at a same position in the first image and the second image is lower than a similarity between image content in image areas at a same position in the first sub-area and the second sub-area.

In an embodiment, the similarity between the images may alternatively be understood as a similarity between image content included in the images. Due to the shake of the terminal, there is a part of image content that does not exist in the second image in an edgy area of the first image, and similarly, there is a part of image content that does not exist in the first image in an edgy area of the second image. In other words, the first image and the second image both include image content that does not exist in one another, and a similarity between image content included in the first image and the second image is lower than a similarity between image content included in the first sub-area and the second sub-area.

In addition, if a pixel is used as a granularity for determining a similarity, the similarity may be represented by an overall similarity between pixel values of pixels at a same position in images.

In an embodiment, before the performing perspective distortion correction on the first cropped area, the method further includes:

detecting that the terminal satisfies a distortion correction condition, and enabling a distortion correction function. It may be further understood that a current photographing environment, a photographing parameter, or photographing content of the terminal satisfies a condition in which perspective distortion correction needs to be performed.

It should be understood that time at which an action of detecting that the terminal satisfies the distortion correction condition and enabling the distortion correction function may be before the operation of performing stabilization on the acquired first image; or may be after stabilization is performed on the acquired first image and before perspective distortion correction is performed on the first cropped area. This is not limited in this application.

In an embodiment, perspective distortion correction needs to be enabled, that is, only when it is detected that perspective distortion correction is currently in an enabled state, perspective distortion correction is performed on the first cropped area.

In an embodiment, detecting that the terminal satisfies the distortion correction condition includes, but is not limited to, one or more of the following cases:

Case 1: It is detected that a zoom ratio of the terminal is less than a first preset threshold.

In an embodiment, whether perspective distortion correction is enabled may be determined based on the zoom ratio of the terminal. When the zoom ratio of the terminal is large (for example, within a full or partial zoom ratio range of a long-focus photographing mode, or within a full or partial zoom ratio range of a medium-focus photographing mode), a degree of perspective distortion in a picture of an image acquired by the terminal is low. That the degree of perspective distortion is low may be understood as that human eyes almost cannot identify any perspective distortion in the picture of the image acquired by the terminal. Therefore, when the zoom ratio of the terminal is large, perspective distortion correction does not need to be enabled.

In an embodiment, when the zoom ratio ranges from a to 1, the terminal acquires a video stream in real time by using a front-facing wide-angle camera or a rear-facing wide-angle camera, where the first preset threshold is greater than 1, a is a fixed zoom ratio of the front-facing wide-angle camera or the rear-facing wide-angle camera, and a value of a ranges from 0.5 to 0.9; or when the zoom ratio ranges from 1 to b, the terminal acquires a video stream in real time by using a rear-facing main camera, where b is a fixed zoom ratio of a rear-facing long-focus camera on the terminal or a maximum zoom of the terminal, the first preset threshold ranges from 1 to 15, and a value of b ranges from 3 to 15.

Case 2: A first enabling operation of a user for enabling the perspective distortion correction function is detected.

In an embodiment, the first enabling operation includes a first operation on a first control in a photographing interface on the terminal, the first control is used to indicate to enable or disable perspective distortion correction, and the first operation is used to indicate to enable perspective distortion correction.

In an embodiment, a control (referred to as the first control in this embodiment of this application) used to indicate to enable or disable perspective distortion correction may be included in the photographing interface. The user may trigger to enable perspective distortion correction through the first operation on the first control, that is, enable perspective distortion correction through the first operation on the first control. In this way, the terminal may detect the first enabling operation of the user for enabling perspective distortion correction, and the first enabling operation includes the first operation on the first control in the photographing interface on the terminal.

In an embodiment, the control (referred to as the first control in this embodiment of this application) used to indicate to enable or disable perspective distortion correction is displayed in the photographing interface only when it is detected that the zoom ratio of the terminal is less than the first preset threshold.

Case 3: A human face in a photographing scenario is identified;

a human face in a photographing scenario is identified, where a distance between the human face and the terminal is less than a preset value; or a human face in a photographing scenario is identified, where a proportion of pixels occupied by the human face in an image corresponding to the photographing scenario is greater than a preset proportion.

It should be understood that, when there is a human face in the photographing scenario, because a degree of transformation of the human face due to perspective distortion correction is more visually obvious, and when a distance between the human face and the terminal is smaller or a proportion of pixels occupied by the human face in an image corresponding to the photographing scenario is greater, a size of the human face in the image is larger, the degree of transformation of the human face due to perspective distortion correction is even more visually obvious. Therefore, perspective distortion correction needs to be enabled in the foregoing scenario. In this embodiment, whether to enable perspective distortion correction is determined by determining the foregoing condition related to a human face in a photographing scenario, so that a photographing scenario in which perspective distortion occurs can be accurately determined, and perspective distortion correction is performed for the photographing scenario in which perspective distortion occurs. Perspective distortion correction is not performed in a photographing scenario in which perspective distortion does not occur. In this way, an image signal is processed accurately, and power consumption is reduced.

It should be understood that, the photographing scenario may be understood as an image acquired before the camera acquires the first image, or when the first image is the first image frame of a video acquired by the camera, the photographing scenario may be the first image or an image close to the first image in time domain. Whether there is a human face in the photographing scenario, a distance between the human face and the terminal is less than a preset value, and a proportion of pixels occupied by the human face in an image corresponding to the photographing scenario may be determined by using a neural network or in another manner. The preset value may range from 0 m to 10 m. For example, the preset value may be 1, 2, 3, 4, 5, 6, 7, 8, 9, or 10. This is not limited herein. The proportion of pixels may range from 30% to 100%. For example, the proportion of pixels may be 30%, 40%, 50%, 60%, 70%, 80%, 90% or 100%. This is not limited herein.

In an embodiment, before the performing stabilization on an acquired first image, the method further includes:

detecting that the terminal satisfies a stabilization condition, and enabling a stabilization function. It may be further understood that a current photographing environment, a photographing parameter, or photographing content of the terminal satisfies a condition in which stabilization needs to be performed.

In an embodiment, detecting that the terminal satisfies the stabilization condition includes, but is not limited to, one or more of the following cases:

Case 1: It is detected that a zoom ratio of the terminal is greater than a second preset threshold.

In an embodiment, a difference between the second preset threshold and a fixed zoom ratio of a target camera on the terminal device is within a preset range, where the target camera is a camera, on the terminal, with a smallest fixed zoom ratio.

In an embodiment, whether to enable the stabilization function may be determined based on the zoom ratio of the terminal. When the zoom ratio of the terminal is small (for example, within a full or partial zoom ratio range of a wide-angle photographing mode), a size of a physical area corresponding to a picture displayed in the viewfinder frame in the photographing interface is already tiny. If stabilization is further performed, that is, an image is further cropped, the size of the physical area corresponding to the picture displayed in the viewfinder frame becomes smaller. Therefore, the stabilization function may be enabled only when the zoom ratio of the terminal is greater than a specific preset threshold.

The target camera may be a front-facing wide-angle camera, and a preset range may be 0 to 0.3. For example, when a fixed zoom ratio of the front-facing wide-angle camera is 0.5, the second preset threshold may be 0.5, 0.6, 0.7, or 0.8.

Case 2: A second enabling operation of the user for enabling the stabilization function is detected.

In an embodiment, the second enabling operation includes a second operation on a second control in the photographing interface on the terminal, the second control is used to indicate to enable or disable the stabilization function, and the second operation is used to indicate to enable the stabilization function.

In an embodiment, a control (referred to as the second control in this embodiment of this application) used to indicate to enable or disable the stabilization function may be included in the photographing interface. The user may trigger to enable the stabilization function through the second operation on the second control, that is, enable the stabilization function through the second operation on the second control. In this way, the terminal may detect the second enabling operation of the user for enabling the stabilization function, and the second enabling operation includes the second operation on the second control in the photographing interface on the terminal.

In an embodiment, the control (referred to as the second control in this embodiment of this application) used to indicate to enable or disable the stabilization function is displayed in the photographing interface only when it is detected that the zoom ratio of the terminal is greater than or equal to the second preset threshold.

In an embodiment, the obtaining a fourth image based on the second image and the fourth cropped area includes: obtaining a first mapping relationship and a second mapping relationship, where the first mapping relationship indicates a mapping relationship between each position point in the second cropped area and a corresponding position point in the second image, and the second mapping relationship indicates a mapping relationship between each position point in the fourth cropped area and a corresponding position point in the second cropped area; and obtaining the fourth image based on the second image, the first mapping relationship, and the second mapping relationship.

In an embodiment, the obtaining the fourth image based on the second image, the first mapping relationship, and the second mapping relationship includes:
coupling the first mapping relationship to the second mapping relationship, to determine a target mapping relationship, where the target mapping relationship includes a mapping relationship between each position point in the fourth cropped area and a corresponding position point in the second image; and
determining the fourth image based on the second image and the target mapping relationship.

That is, index tables for the first mapping relationship and the second mapping relationship are coupled. By coupling the index tables, there is no need to perform a warp operation after the cropped area is obtained through stabilization and perform a warp operation again after perspective distortion correction, but only one warp operation needs to be performed after an output is obtained based on the coupled index tables after perspective distortion correction, thereby reducing overheads of a warp operation. The warp operation may refer to an affine transformation operation on an image. For a specific embodiment, refer to an existing warp technology.

In an embodiment, the first mapping relationship is different from the second mapping relationship.

In an embodiment, the performing perspective distortion correction on the first cropped area includes: performing optical distortion correction on the first cropped area to obtain a corrected first cropped area; and performing perspective distortion correction on the corrected first cropped area;
the obtaining a third image based on the first image and the third cropped area includes: performing optical distortion correction on the third cropped area to obtain a corrected third cropped area; and obtaining the third image based on the first image and the corrected third cropped area;
the performing perspective distortion correction on the second cropped area includes: performing optical distortion correction on the second cropped area to obtain a corrected second cropped area; and performing perspective distortion correction on the corrected second cropped area; or
the obtaining a fourth image based on the second image and the fourth cropped area includes: performing optical distortion correction on the fourth cropped area to obtain a corrected fourth cropped area; and obtaining the fourth image based on the second image and the corrected fourth cropped area.

Compared with coupling an optical distortion correction index table and a perspective distortion correction index table by using a distortion correction module, because optical distortion is an important cause of a jello phenomenon, and effectiveness of optical distortion correction and perspective distortion correction is controlled at a video stabilization back end, this embodiment can resolve a problem that when a video stabilization module disables optical distortion correction, a perspective distortion correction module cannot control the jello phenomenon.

According to a second aspect, this application provides an image processing apparatus. The apparatus is used by a terminal to acquire a video stream in real time, and the apparatus includes:
a stabilization module, configured to perform stabilization on an acquired first image to obtain a first cropped area, and further configured to perform stabilization on an acquired second image to obtain a second cropped area, where the second cropped area is related to the first cropped area and shake information, and the shake information indicates a shake that occurs in a process in which the terminal acquires the first image and the second image, and the first image and the second image are a pair of original images that are acquired by the terminal and that are adjacent to each other in time domain;
a perspective distortion correction module, configured to perform perspective distortion correction on the first cropped area to obtain a third cropped area, and further configured to perform perspective distortion correction on the second cropped area to obtain a fourth cropped area; and
an image generation module, configured to obtain a third image based on the first image and the third cropped area, and further configured to: obtain a fourth image based on the second image and the fourth cropped area, and generate a target video based on the third image and the fourth image.

In an embodiment, a direction of an offset of a position of the second cropped area in the second image relative to a position of the first cropped area in the first image is opposite to a shake direction, on an image plane, of the shake that occurs in the process in which the terminal acquires the first image and the second image.

In an embodiment, the first cropped area indicates a first sub-area in the first image, and the second cropped area indicates a second sub-area in the second image.

A similarity between first image content, in the first image, corresponding to the first sub-area and second image content, in the second image, corresponding to the second sub-area is greater than a similarity between the first image and the second image.

In an embodiment, the apparatus further includes:
a first detection module, configured to: before the stabilization module performs stabilization on the acquired first image, detect that the terminal satisfies a distortion correction condition, and enable a distortion correction function.

In an embodiment, detecting that the terminal satisfies the distortion correction condition includes, but is not limited to:
detecting that a zoom ratio of the terminal is less than a first preset threshold.

In an embodiment, when the zoom ratio ranges from a to 1, the terminal acquires a video stream in real time by using a front-facing wide-angle camera or a rear-facing wide-angle camera, where the first preset threshold is greater than 1, a is a fixed zoom ratio of the front-facing wide-angle camera or the rear-facing wide-angle camera, and a value of a ranges from 0.5 to 0.9; or
when the zoom ratio ranges from 1 to b, the terminal acquires a video stream in real time by using a rear-facing main camera, where b is a fixed zoom ratio of a rear-facing long-focus camera on the terminal or a maximum zoom of the terminal, the first preset threshold ranges from 1 to 15, and a value of b ranges from 3 to 15.

In an embodiment, detecting that the terminal satisfies the distortion correction condition includes, but is not limited to:
detecting a first enabling operation of a user for enabling the perspective distortion correction function, where the first enabling operation includes a first operation on a first control in a photographing interface on the terminal, the first control is used to indicate to enable or disable perspective distortion correction, and the first operation is used to indicate to enable perspective distortion correction.

In an embodiment, detecting that the terminal satisfies the distortion correction condition includes, but is not limited to:
identifying a human face in a photographing scenario;
identifying a human face in a photographing scenario, where a distance between the human face and the terminal is less than a preset value; or
identifying a human face in a photographing scenario, where a proportion of pixels occupied by the human face in an image corresponding to the photographing scenario is greater than a preset proportion.

In an embodiment, the apparatus further includes:
a second detection module, configured to: before the stabilization module performs stabilization on the acquired first image, detect that the terminal satisfies a stabilization condition, and enable a stabilization function.

In an embodiment, detecting that the terminal satisfies the stabilization condition includes, but is not limited to:
detecting that the zoom ratio of the terminal is greater than a fixed zoom ratio of a camera, on the terminal, with a smallest zoom ratio.

In an embodiment, detecting that the terminal satisfies the stabilization condition includes, but is not limited to:
detecting a second enabling operation of the user for enabling the stabilization function, where the second enabling operation includes a second operation on a second control in the photographing interface on the terminal, the second control is used to indicate to enable or disable the stabilization function, and the second operation is used to indicate to enable the stabilization function.

In an embodiment, the image generation module is configured to: obtain a first mapping relationship and a second mapping relationship, where the first mapping relationship indicates a mapping relationship between each position point in the second cropped area and a corresponding position point in the second image, and the second mapping relationship indicates a mapping relationship between each position point in the fourth cropped area and a corresponding position point in the second cropped area; and
obtain the fourth image based on the second image, the first mapping relationship, and the second mapping relationship.

In an embodiment, the perspective distortion correction module is configured to: determine a target mapping relationship based on the first mapping relationship and the second mapping relationship, where the target mapping relationship includes a mapping relationship between each position point in the fourth cropped area and a corresponding position point in the second image; and
determine the fourth image based on the target mapping relationship and the second image.

In an embodiment, the first mapping relationship is different from the second mapping relationship.

In an embodiment, the perspective distortion correction module is configured to: perform optical distortion correction on the first cropped area to obtain a corrected first cropped area; and perform perspective distortion correction on the corrected first cropped area;
the image generation module is configured to: perform optical distortion correction on the third cropped area to obtain a corrected third cropped area; and obtain the third image based on the first image and the corrected third cropped area;
the perspective distortion correction module is configured to: perform optical distortion correction on the second cropped area to obtain a corrected second cropped area; and perform perspective distortion correction on the corrected second cropped area; or
the image generation module is configured to: perform optical distortion correction on the fourth cropped area to obtain a corrected fourth cropped area; and obtain the fourth image based on the second image and the corrected fourth cropped area.

According to a third aspect, this application provides an image processing method. The method is used by a terminal to acquire a video stream in real time, and the method includes:
determining a target object in an acquired first image, to obtain a first cropped area including the target object;
performing perspective distortion correction on the first cropped area to obtain a third cropped area;
obtaining a third image based on the first image and the third cropped area;
determining the target object in an acquired second image, to obtain a second cropped area including the target object, where the second cropped area is related to target movement information, and the target movement information indicates a movement of the target object in a process in which the terminal acquires the first image and the second image;

performing perspective distortion correction on the second cropped area to obtain a fourth cropped area;

obtaining a fourth image based on the second image and the fourth cropped area; and generating a target video based on the third image and the fourth image, where the first image and the second image are a pair of original images that are acquired by the terminal and that are adjacent to each other in time domain.

The image processing method according to the third aspect may be further understood as follows: For processing on a single image (for example, the second image) in an acquired video stream, the target object in an acquired second image is determined, to obtain a second cropped area including the target object, where the second cropped area is related to target movement information, and the target movement information indicates a movement of the target object in a process in which the terminal acquires the second image and an image frame that is adjacent to the second image and that is before the second image in time domain; perspective distortion correction is performed on the second cropped area to obtain a fourth cropped area; a fourth image is obtained based on the second image and the fourth cropped area; and a target video is generated based on the fourth image. It should be understood that the second image may be any image that is not the first in the acquired video stream, and the image that is not the first refers to an image frame that is not the first in the video stream in time domain. The target video may be obtained by processing a plurality of images in the video stream through a same process as that of processing the second image.

In an embodiment, a position, of the target object, in the second image is different from a position, of the target object, in the first image.

Different from performing perspective distortion correction on all areas of an original image according to an existing embodiment, in this embodiment of this application, perspective distortion correction is performed on a cropped area. Because the target object moves, positions of cropped areas including a human object, in a former image frame and a latter image frame are different, shifts for perspective distortion correction on position points or pixels in two output image frames are different. However, sizes of the cropped areas, of the two frames, determined after target identification is performed are the same. Therefore, if perspective distortion correction is performed on each of the cropped areas, a degree of perspective distortion correction performed on an adjacent frame is the same (because distances between each position point or pixel in the cropped area of each of the two frames and a center point of the cropped area are the same). In addition, because the cropped areas of the two adjacent frames are images that include same or basically same content, and degrees of transformation of a same object in the images are the same, that is, inter-frame consistency is kept, an obvious jello (Jello) phenomenon does not occur, thereby improving quality of a video output.

In an embodiment, before the performing perspective distortion correction on the first cropped area, the method further includes:

detecting that the terminal satisfies a distortion correction condition, and enabling a distortion correction function.

In an embodiment, detecting that the terminal satisfies the distortion correction condition includes, but is not limited to, one or more of the following cases: Case 1: It is detected that a zoom ratio of the terminal is less than a first preset threshold.

In an embodiment, whether perspective distortion correction is enabled may be determined based on the zoom ratio of the terminal. When the zoom ratio of the terminal is large (for example, within a full or partial zoom ratio range of a long-focus photographing mode, or within a full or partial zoom ratio range of a medium-focus photographing mode), a degree of perspective distortion in a picture of an image acquired by the terminal is low. That the degree of perspective distortion is low may be understood as that human eyes almost cannot identify any perspective distortion in the picture of the image acquired by the terminal. Therefore, when the zoom ratio of the terminal is large, perspective distortion correction does not need to be enabled. In an embodiment, when the zoom ratio ranges from a to 1, the terminal acquires a video stream in real time by using a front-facing wide-angle camera or a rear-facing wide-angle camera, where the first preset threshold is greater than 1, a is a fixed zoom ratio of the front-facing wide-angle camera or the rear-facing wide-angle camera, and a value of a ranges from 0.5 to 0.9; or when the zoom ratio ranges from 1 to b, the terminal acquires a video stream in real time by using a rear-facing main camera, where b is a fixed zoom ratio of a rear-facing long-focus camera on the terminal or a maximum zoom of the terminal, the first preset threshold ranges from 1 to 15, and a value of b ranges from 3 to 15.

Case 2: A first enabling operation of a user for enabling the perspective distortion correction function is detected.

In an embodiment, the first enabling operation includes a first operation on a first control in a photographing interface on the terminal, the first control is used to indicate to enable or disable perspective distortion correction, and the first operation is used to indicate to enable perspective distortion correction.

In an embodiment, a control (referred to as the first control in this embodiment of this application) used to indicate to enable or disable perspective distortion correction may be included in the photographing interface. The user may trigger to enable perspective distortion correction through the first operation on the first control, that is, enable perspective distortion correction through the first operation on the first control. In this way, the terminal may detect the first enabling operation of the user for enabling perspective distortion correction, and the first enabling operation includes the first operation on the first control in the photographing interface on the terminal.

In an embodiment, the control (referred to as the first control in this embodiment of this application) used to indicate to enable or disable perspective distortion correction is displayed in the photographing interface only when it is detected that the zoom ratio of the terminal is less than the first preset threshold.

Case 3: A human face in a photographing scenario is identified;

a human face in a photographing scenario is identified, where a distance between the human face and the terminal is less than a preset value; or a human face in a photographing scenario is identified, where a proportion of pixels occupied by the human face in an image corresponding to the photographing scenario is greater than a preset proportion.

It should be understood that, when there is a human face in the photographing scenario, because a degree of transformation of the human face due to perspective distortion correction is more visually obvious, and when a distance between the human face and the terminal is smaller or a proportion of pixels occupied by the human face in an image corresponding to the photographing scenario is greater, a size of the human face in the image is larger, the degree of transformation of the human face due to perspective distortion correction is even more visually obvious. Therefore, perspective distortion correction needs to be enabled in the foregoing scenario. In this embodiment, whether to enable perspective distortion correction is determined by determining the foregoing condition related to a human face in a photographing scenario, so that a photographing scenario in which perspective distortion occurs can be accurately determined, and perspective distortion correction is performed for the photographing scenario in which perspective distortion occurs. Perspective distortion correction is not performed in a photographing scenario in which perspective distortion does not occur. In this way, an image signal is processed accurately, and power consumption is reduced.

According to a fourth aspect, this application provides an image processing apparatus. The apparatus is used by a terminal to acquire a video stream in real time, and the apparatus includes:
an object determining module, configured to determine a target object in an acquired first image, to obtain a first cropped area including the target object, and further configured to determine the target object in an acquired second image, to obtain a second cropped area including the target object, where the second cropped area is related to target movement information, the target movement information indicates a movement of the target object in a process in which the terminal acquires the first image and the second image, and the first image and the second image are a pair of original images that are acquired by the terminal and that are adjacent to each other in time domain;
a perspective distortion correction module, configured to perform perspective distortion correction on the first cropped area to obtain a third cropped area, and further configured to perform perspective distortion correction on the second cropped area to obtain a fourth cropped area; and
an image generation module, configured to obtain a third image based on the first image and the third cropped area, and further configured to: obtain a fourth image based on the second image and the fourth cropped area, and generate a target video based on the third image and the fourth image.

In an embodiment, a position, of the target object, in the second image is different from a position, of the target object, in the first image.

In an embodiment, the apparatus further includes:
a first detection module, configured to: before the perspective distortion correction module performs perspective distortion correction on the first cropped area, detect that the terminal satisfies a distortion correction condition, and enable a distortion correction function.

In an embodiment, detecting that the terminal satisfies the distortion correction condition includes, but is not limited to:
detecting that a zoom ratio of the terminal is less than a first preset threshold.

In an embodiment, when the zoom ratio ranges from a to 1, the terminal acquires a video stream in real time by using a front-facing wide-angle camera or a rear-facing wide-angle camera, where the first preset threshold is greater than 1, a is a fixed zoom ratio of the front-facing wide-angle camera or the rear-facing wide-angle camera, and a value of a ranges from 0.5 to 0.9; or
when the zoom ratio ranges from 1 to b, the terminal acquires a video stream in real time by using a rear-facing main camera, where b is a fixed zoom ratio of a rear-facing long-focus camera on the terminal or a maximum zoom of the terminal, the first preset threshold ranges from 1 to 15, and a value of b ranges from 3 to 15.

In an embodiment, detecting that the terminal satisfies the distortion correction condition includes, but is not limited to:
detecting a first enabling operation of a user for enabling the perspective distortion correction function, where the first enabling operation includes a first operation on a first control in a photographing interface on the terminal, the first control is used to indicate to enable or disable perspective distortion correction, and the first operation is used to indicate to enable perspective distortion correction.

In an embodiment, detecting that the terminal satisfies the distortion correction condition includes, but is not limited to:
identifying a human face in a photographing scenario;
identifying a human face in a photographing scenario, where a distance between the human face and the terminal is less than a preset value; or
identifying a human face in a photographing scenario, where a proportion of pixels occupied by the human face in an image corresponding to the photographing scenario is greater than a preset proportion.

According to a fifth aspect, this application provides an image processing device, including a processor, a memory, a camera, and a bus. The processor, the memory, and the camera are connected through the bus.

The camera is configured to acquire a video in real time.
The memory is configured to store computer programs or instructions.
The processor is configured to invoke or execute the program or the instructions stored in the memory, and is further configured to invoke the camera to implement operations in the first aspect or any embodiment of the first aspect and operations in the third aspect or any embodiment of the third aspect.

According to a sixth aspect, this application provides a computer storage medium, including computer instructions. When the computer instructions are run on an electronic device or a server, operations in the first aspect or any embodiment of the first aspect and operations in the third aspect or any embodiment of the third aspect are performed.

According to a seventh aspect, this application provides a computer program product. When the computer program product runs on an electronic device or a server, operations in the first aspect or any embodiment of the first aspect and operations in the third aspect or any embodiment of the third aspect are performed.

According to an eighth aspect, this application provides a chip system. The chip system includes a processor, configured to support an execution device or a training device in implementing functions in the foregoing aspect, for example, of sending or processing data or information in the foregoing method. In a possible design, the chip system further includes a memory. The memory is configured to store program instructions and data that are necessary for the execution device or the training device. The chip system may include a chip, or may include a chip and another discrete device.

This application provides an image display method, used by a terminal to acquire a video stream in real time and including: performing stabilization on an acquired first image to obtain a first cropped area; performing perspective distortion correction on the first cropped area to obtain a third cropped area; obtaining a third image based on the first image and the third cropped area; performing stabilization on an acquired second image to obtain a second cropped area, where the second cropped area is related to the first cropped area and shake information, and the shake information indicates a shake that occurs in a process in which the terminal acquires the first image and the second image; performing perspective distortion correction on the second cropped area to obtain a fourth cropped area; and obtaining a fourth image based on the second image and the fourth cropped area, where the third image and the fourth image are used for generating a target video, and the first image and the second image are a pair of original images that are acquired by the terminal and that are adjacent to each other in time domain. In addition, because outputs of stabilization on two adjacent frames are images that include same or basically same content, and degrees of transformation of a same object in the images are the same, that is, inter-frame consistency is kept, an obvious jello (Jello) phenomenon does not occur, thereby improving quality of video display.

BRIEF DESCRIPTION OF DRAWINGS

FIG. 4b-1 to FIG. 4b-4 are schematic diagrams of a shake of a terminal according to an embodiment of this application;

DETAILED DESCRIPTION

Embodiments of the present application are described below with reference to the accompanying drawings in embodiments of the present application. Terms used in embodiments of the present application are merely intended to explain specific embodiments of the present application, but not intended to limit the present application.

Embodiments of this application are described below with reference to the accompanying drawings. A person of ordinary skill in the art can understand that, with development of technologies and emergence of new scenarios, technical solutions provided in embodiments of this application are also applicable to a similar technical problem.

The terms "first", "second", and the like in the description, the claims, and the accompanying drawings of this application are used to distinguish between similar objects, and are not necessarily intended to describe a specific order or sequence. It should be understood that the terms used in such a way are interchangeable in proper circumstances, and this is merely a manner of discrimination for describing objects having a same attribute in embodiments of this application. In addition, the terms "include", "contain", and any other variants thereof are intended to cover non-exclusive inclusion, so that a process, method, system, product, or device that includes a series of units is not necessarily limited to those units, but may include another unit not expressly listed or not inherent to such a process, method, system, product, or device.

Figure 1:
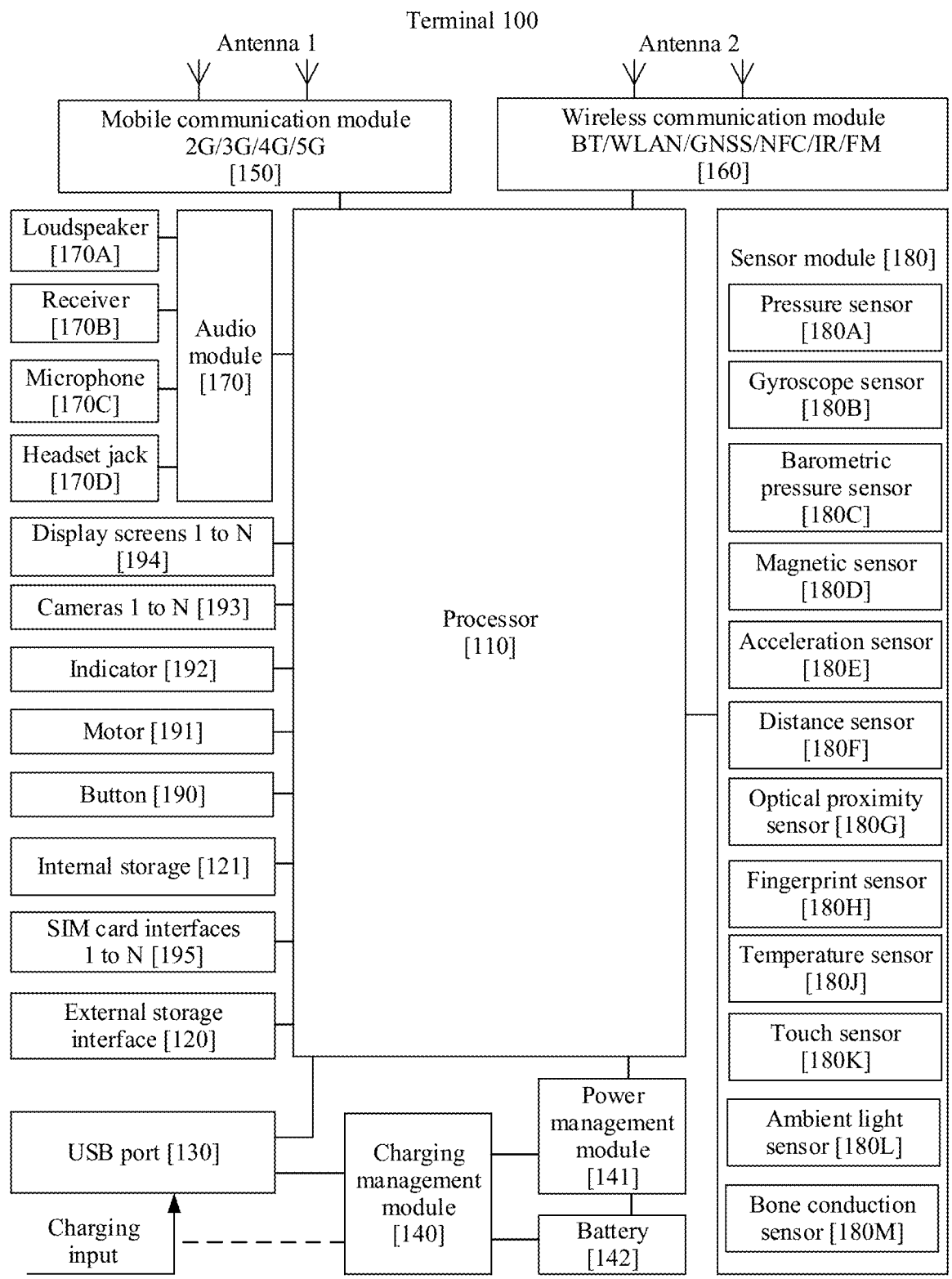
FIG. 1 is a schematic diagram of a structure of a terminal device according to an embodiment of this application.

For ease of understanding, a structure of a terminal 100 provided in an embodiment of this application is described below with an example. FIG. 1 is a schematic diagram of a structure of a terminal device according to an embodiment of this application.

As shown in FIG. 1, the terminal 100 may include a processor 110, an external storage interface 120, an internal storage 121, a universal serial bus (USB) interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present application does not constitute a specific limitation on the terminal 100. In some other embodiments, the terminal 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instructions or data that has just been used or is cyclically used by the processor 110. If the processor 110 needs to use the instructions or the data again, the processor may directly invoke the instructions or the data from the memory. This avoids repeated access, reduces a time for waiting of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, with analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus. The bus converts between serial communication and parallel communication for data to be transmitted. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be used to connect the processor 110 to a peripheral component, for example, the display screen 194 or the camera 193. The MIPI interface includes a camera serial interface (CSI), a display serial interface (DSI), and the like. In some embodiments, the processor 110 communicates with the camera 193 through the CSI, to implement a photographing function of the terminal 100. The processor 110 communicates with the display screen 194 through the DSI, to implement a display function of the terminal 100.

The GPIO interface may be configured by using software. The GPIO interface may be configured with a control signal, or may be configured with a data signal. In some embodiments, the GPIO interface may be used to connect the processor 110 to the camera 193, the display screen 194, the wireless communication module 160, the audio module 170, the sensor module 180, and the like. The GPIO interface may be further configured as an I2C interface, an I2S interface, a UART interface, a MIPI, or the like.

In an embodiment, a video (including an image frame sequence, including, for example, a first image and a second image in this application) acquired by the camera 193 may be transferred to the processor 110 through, but not limited to, the interface (for example, the CSI interface or the GPIO interface) described above that connects the camera 193 to the processor 110.

The processor 110 may obtain instructions from the memory, and perform, according to the obtained instructions, video processing (for example, stabilization or perspective distortion correction in this application) on the video acquired by the camera 193, to obtain a processed image (for example, a third image and a fourth image in this application).

The processor 110 may transfer the processed image to the display screen 194 through, but not limited to, the interface (for example, the DSI interface or the GPIO interface) described above that connects the display screen 194 and the processor 110, so that the display screen 194 may display the video.

The USB interface 130 is an interface that conforms to a USB standard specification, and may be a mini-USB interface, a micro-USB interface, a USB Type-C interface, or the like. The USB interface 130 may be used to connect to a charger to charge the terminal 100, or may be used to transmit data between the terminal 100 and a peripheral device, or may be used to connect to a headset for playing audio through the headset. The interface may be further used to connect to another electronic device, for example, an AR device.

It can be understood that an interface connection relationship between the modules that are shown in this embodiment of the present application is merely an example for description, and does not constitute a limitation on a structure of the terminal 100. In some other embodiments of this application, the terminal 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the terminal 100. The charging management module 140 supplies power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal storage 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may be alternatively disposed in a same component.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be used to cover one or more communication frequency bands. Different antennas may be further reused, to improve antenna utilization. For example, the antenna 1 may be reused as a diversity antenna in a wireless local area network. In some other embodiments, the antenna may be used in combination with a tuning switch.

The mobile communication module 150 may provide a wireless communication solution including 2G/3G/4G/5G that is applied to the terminal 100. The mobile communication module 150 may include at least one filter, a switch, a power amplifier, a low noise amplifier (LNA), and the like. The mobile communication module 150 may receive an electromagnetic wave through the antenna 1, perform processing, for example, filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least a part of functional modules of the mobile communication module 150 may be disposed in the processor 110. In some embodiments, at least a part of functional modules of the mobile communication module 150 and at least a part of modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal that is then transferred to the application processor. The application processor outputs a sound signal through an audio device (that is not limited to the loudspeaker 170A, the receiver 170B, and the like), or displays an image or a video by using the display screen 194.

In some embodiments, the modem processor may be an independent component. In some other embodiments, the modem processor may be independent of the processor 110, and is disposed with the mobile communication module 150 or another functional module in the same device.

The wireless communication module 160 may provide a wireless communication solution that is applied to the terminal 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processor module. The wireless communication module 160 receives an electromagnetic wave through the antenna 2, performs frequency modulation and filtering on an electromagnetic wave signal, and sends a processed signal to the processor 110. The wireless communication module 160 may further receive a signal, that is to be transmitted, from the processor 110, perform frequency modulation and amplification on the signal, and convert the signal into an electromagnetic wave for radiation through the antenna 2.

In some embodiments, the antenna 1 and the mobile communication module 150 on the terminal 100 are coupled, and the antenna 2 and the wireless communication module 160 in the terminal device are coupled, so that the terminal 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time division-synchronous code division multiple access (TD-SCDMA), long term evolution (LTE), BT, a GNSS, a WLAN, NFC, FM, IR, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The terminal 100 may implement a display function by using the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs that execute program instructions to generate or change display information. In an embodiment, the one or more GPUs of the processor 110 may implement an image rendering task (for example, a rendering task related to an image that needs to be displayed in this application, where a rendering result is transferred to an application processor or another display driver, and the application processor or the another display driver triggers the display screen 194 to display a video).

The display screen 194 is configured to display an image, a video, or the like. The display screen 194 includes a display panel. The display panel may use a liquid crystal display (LCD), an organic light-emitting diode (OLED), an active-matrix organic light-emitting diode (AMOLED), a flexible light-emitting diode (FLED), a Mini-LED, a Micro-LED, a Micro-OLED, a quantum dot light-emitting diode (QLED), and the like. In some embodiments, the terminal 100 may include one or N display screens 194, and N is a positive integer greater than 1. The display screen 194 may display a target video in embodiments of this application. In an embodiment, the terminal 100 may run an application related to photographing. When the terminal starts the application related to photographing, the display screen 194 may display a photographing interface. The photographing interface may include a viewfinder frame, and the target video may be displayed in the viewfinder frame.

The terminal 100 may implement a photographing function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature in a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the terminal 100 may include one or N cameras 193, where N is a positive integer greater than 1.

The DSP converts the digital image signal into the image signal in the standard format, for example, RGB or YUV, to obtain an original image (for example, a first image and a second image in embodiments of this application). The processor 110 may further perform image processing on the original image. The image processing includes, but is not limited to, stabilization, perspective distortion correction, optical distortion correction, and cropping for adapting to a size of the display screen 194. A processed image (for example, a third image and a fourth image in embodiments of this application) may be displayed in the viewfinder frame in the photographing interface displayed on the display screen 194.

In this embodiment of this application, there may be at least two cameras 193 on the terminal 100. For example, there are two cameras, where one is a front-facing camera, and the other is a rear-facing camera; for example, there are three cameras, where one is a front-facing camera, and the other two are rear-facing cameras; or for example, there are four cameras, where one is a front-facing camera, and the other three are rear-facing cameras. It should be noted that the camera 193 may be one or more of a wide-angle camera, a main camera, or a long-focus camera.

For example, there are two cameras, where a front-facing camera may be a wide-angle camera, and a rear-facing camera may be a main camera. In this case, a field of view of an image acquired by the rear-facing camera is larger, and there is more image information.

For example, there are three cameras, where a front-facing camera may be a wide-angle camera, and rear-facing cameras may be a wide-angle camera and a main camera.

For example, there are four cameras, where a front-facing camera may be a wide-angle camera, and rear-facing cameras may be a wide-angle camera, a main camera, and a long-focus camera.

The digital signal processor is configured to process a digital signal, and may process another digital signal in addition to the digital image signal. For example, when the terminal 100 selects a frequency, the digital signal processor is configured to perform Fourier transform on frequency energy.

The video codec is configured to compress or decompress a digital video. The terminal 100 may support one or more types of video codecs. Therefore, the terminal 100 may play or record videos in a plurality of encoding formats, for example, moving picture experts group (MPEG)-1, MPEG-2, MPEG-3, and MPEG-4.

The NPU is a neural-network (NN) computing processor that quickly processes input information by referring to a structure of a biological neural network, for example, by referring to a mode of transmission between human brain neurons, and may further continuously perform self-learning. Applications such as intelligent cognition of the terminal 100, for example, image recognition, facial recognition, speech recognition, and text understanding, may be implemented by using the NPU.

The external storage interface 120 may be used to connect to an external storage card, for example, a micro SD card, to extend a storage capability of the terminal 100. The external storage card communicates with the processor 110 through the external storage interface 120, to implement a data storage function. For example, files such as music and a video are stored in the external storage card.

The internal storage 121 may be configured to store computer-executable program code. The executable program code includes instructions. The internal storage 121 may include a program storage area and a data storage area. The program storage area may store an operating system, an application required for at least one function (for example, a sound play function or an image play function), and the like. The data storage area may store data (for example, audio data and an address book) and the like that are created during use of the terminal 100. In addition, the internal storage 121 may include a high-speed random access memory, and may further include a non-volatile memory, for example, at least one magnetic disk storage device, a flash storage device, or a universal flash storage (UFS). The processor 110 runs the instructions stored in the internal storage 121 and/or instructions stored in the memory disposed in the processor, to implement various function applications and data processing of the terminal 100.

The terminal 100 may implement an audio function, for example, music play or recording, by using the audio module 170, the loudspeaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal. In some embodiments, the audio module 170 may be disposed in the processor 110, or a part of functional modules of the audio module 170 are disposed in the processor 110.

The loudspeaker 170A, also referred to as a "speaker", is configured to convert an electrical audio signal into a sound signal. The terminal 100 may receive music or receive a hands-free call by using the loudspeaker 170A.

The receiver 170B, also referred to as an "earpiece", is configured to convert an electrical audio signal into a sound signal. When a call or audio information is received by the terminal 100, the receiver 170B may be put close to a human ear to listen to a voice.

The microphone 170C, also referred to as a "mike" or a "mic", is configured to convert a sound signal into an electrical signal. When making a call or sending a voice message, a user may move the mouth close to the microphone 170C and make a sound, to input a sound signal to the microphone 170C. At least one microphone 170C may be disposed in the terminal 100. In some other embodiments, two microphones 170C may be disposed in the terminal 100, to acquire a sound signal and further reduce noises. In some other embodiments, three, four, or more microphones 170C may alternatively be disposed in the terminal 100, to acquire a sound signal, reduce noises, and identify a sound source, to implement a directional sound recording function and the like.

The headset jack 170D is configured to connect to a wired headset. The headset jack 170D may be the USB interface 130, or may be a 3.5 mm open mobile terminal platform (OMTP) standard interface or a cellular telecommunication industry association of the USA (CTIA of the USA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a pressure is applied to the pressure sensor 180A, capacitance between electrodes changes. The terminal 100 determines pressure intensity based on a capacitance change. When a touch operation is performed on the display screen 194, the terminal 100 detects strength of the touch operation by using the pressure sensor 180A. The terminal 100 may calculate a touch position based on a detection signal from the pressure sensor 180A. In some embodiments, touch operations that are performed at a same touch position but have different touch operation intensity may correspond to different operation instructions. For example, when a touch operation with touch operation intensity less than a first pressure threshold is performed on icon Messages, an instruction for viewing an SMS message is executed. When a touch operation with touch operation intensity greater than or equal to the first pressure threshold is performed on the icon Messages, an instruction for creating a new SMS message is executed.

The photographing interface displayed on the display screen 194 may include a first control and a second control. The first control is used to enable or disable a stabilization function, and the second control is used to enable or disable a perspective distortion correction function. For example, a user may perform, on the display screen, an enabling operation for enabling the stabilization function. The enabling operation may be a clicking operation on the first control. The terminal 100 may determine, based on a detection signal of the pressure sensor 180A, that a position of the click on the display screen is a position of the first control, and then generate an operation instruction for enabling the stabilization function. In this way, the stabilization function is enabled according to the operation instruction for enabling the stabilization function. For example, the user may perform, on the display screen, an enabling operation for enabling the perspective distortion correction function. The enabling operation may be a clicking operation on the second control. The terminal 100 may determine, based on a detection signal of the pressure sensor 180A, that a position of the click on the display screen is a position of the second control, and then generate an operation instruction for enabling the perspective distortion correction function. In this way, the perspective distortion correction function is enabled according to the operation instruction for enabling the perspective distortion correction function.

The gyroscope sensor 180B may be configured to determine a motion posture of the terminal 100. In some embodiments, an angular velocity of the terminal 100 around three axes (that is, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the terminal 100 shakes, calculates, based on the angle, a distance for which a lens module needs to compensate, and allows the lens to cancel the shake of the terminal 100 through reverse motion, to implement stabilization. The gyroscope sensor 180B may be further used in navigation or a motion-sensing game scenario.

The barometric pressure sensor 180C is configured to measure barometric pressure. In some embodiments, the terminal 100 calculates an altitude based on a value of the barometric pressure measured by the barometric pressure sensor 180C, to help with positioning and navigation.

The magnetic sensor 180D includes a Hall sensor. The terminal 100 may detect opening and closing of a flip cover by using the magnetic sensor 180D. In some embodiments, when the terminal 100 is a clamshell phone, the terminal 100 may detect opening and closing of a flip cover by using the magnetic sensor 180D. Further, a feature, for example, automatic unlocking, upon opening of the flip cover is set based on a detected opening or closing state of the flip cover.

The acceleration sensor 180E may detect accelerations in various directions (usually on three axes) of the terminal 100. When the terminal 100 is still, a magnitude and a direction of gravity may be detected. The acceleration sensor 180E may be further configured to identify a posture of the electronic device, and is used in, for example, switching between landscape mode and portrait mode or a pedometer.

The range sensor 180F is configured to measure a distance. The terminal 100 may measure a distance using infrared or laser. In some embodiments, in a photographing scenario, the terminal 100 may measure a distance by using the range sensor 180F, to implement quick focusing.

The optical proximity sensor 180G may include a light-emitting diode (LED) and an optical detector, for example, a photodiode. The light-emitting diode may be an infrared light-emitting diode. The terminal 100 emits infrared light through the light-emitting diode. The terminal 100 detects infrared reflected light from a nearby object by using the photodiode. When sufficient reflected light is detected, the terminal 100 may determine that there is an object near the terminal 100. When insufficient reflected light is detected, the terminal 100 may determine that there is no object near the terminal 100. The terminal 100 may detect, by using the optical proximity sensor 180G, that a user is holding the terminal 100 close to the ear when making a call, so as to automatically perform screen-off for power saving. The optical proximity sensor 180G may be further used in a leather case mode or a pocket mode to automatically unlock or lock the screen.

The ambient light sensor 180L is configured to sense ambient light brightness. The terminal 100 may adaptively adjust luminance of the display screen 194 based on the sensed ambient light brightness. The ambient light sensor 180L may be further configured to automatically adjust a white balance during photographing. The ambient light sensor 180L may further cooperate with the optical proximity sensor 180G to detect whether the terminal 100 is in a pocket, to avoid an accidental touch.

The fingerprint sensor 180H is configured to acquire a fingerprint. The terminal 100 may use a feature of the acquired fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy based on the temperature detected by the temperature sensor 180J. For example, when a temperature reported by the temperature sensor 180J exceeds a threshold, the terminal 100 lowers performance of a processor near the temperature sensor 180J, to reduce power consumption and provide thermal protection. In some other embodiments, when the temperature is less than another threshold, the terminal 100 heats up the battery 142 to prevent the terminal 100 from being shut down anomalously due to a low temperature. In some other embodiments, when the temperature is less than still another threshold, the terminal 100 boosts an output voltage of the battery 142 to avoid anomalous shutdown due to a low temperature.

The touch sensor 180K may also be referred to as a "touchscreen device". The touch sensor 180K may be disposed on the display screen 194. The touch sensor 180K and the display screen 194 form a touchscreen, which is also referred to as a "touch screen". The touch sensor 180K is configured to detect a touch operation performed on or near the touch sensor. The touch sensor may transfer a detected touch operation to the application processor to determine a type of the touch event. A visual output related to the touch operation may be provided through the display screen 194. In some other embodiments, the touch sensor 180K may alternatively be disposed on a surface of the terminal 100 at a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may be further in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a keying signal input related to user settings and function control on the terminal 100.

The motor 191 may generate a vibration prompt. The motor 191 may be configured to produce an incoming call vibration prompt, and may be configured to provide touch vibration feedback. For example, touch operations performed for different applications (for example, taking a picture and playing audio) may correspond to different vibration feedback effects. For touch operations performed on different areas of the display screen 194, the motor 191 may also correspond to different vibration feedback effects. Different application scenarios (for example, time reminding, information receiving, an alarm clock, and a game) may also correspond to different vibration feedback effects. A touch vibration feedback effect may be further customized.

The indicator 192 may be an indicator light, may be configured to indicate a charging status and a power change, and may be configured to indicate a message, a missed call, a notification, and the like.

The SIM card interface 195 is used to connect a SIM card. The SIM card may be inserted into the SIM card interface 195 or removed from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 is compatible with different types of SIM cards. The SIM card interface 195 is also compatible with an external storage card. The terminal 100 interacts with a network by using the SIM card, to implement functions such as calling and data communication. In some embodiments, the terminal 100 uses an eSIM, that is, an embedded SIM card. The eSIM card may be embedded into the terminal 100, and cannot be separated from the terminal 100.

A software system on the terminal 100 may use a layered architecture, an event-driven architecture, a microkernel architecture, a micro service architecture, or a cloud architecture. In this embodiment of the present application, an Android system with a layered architecture is used as an example to describe a software structure of the terminal 100.

Figure 2:
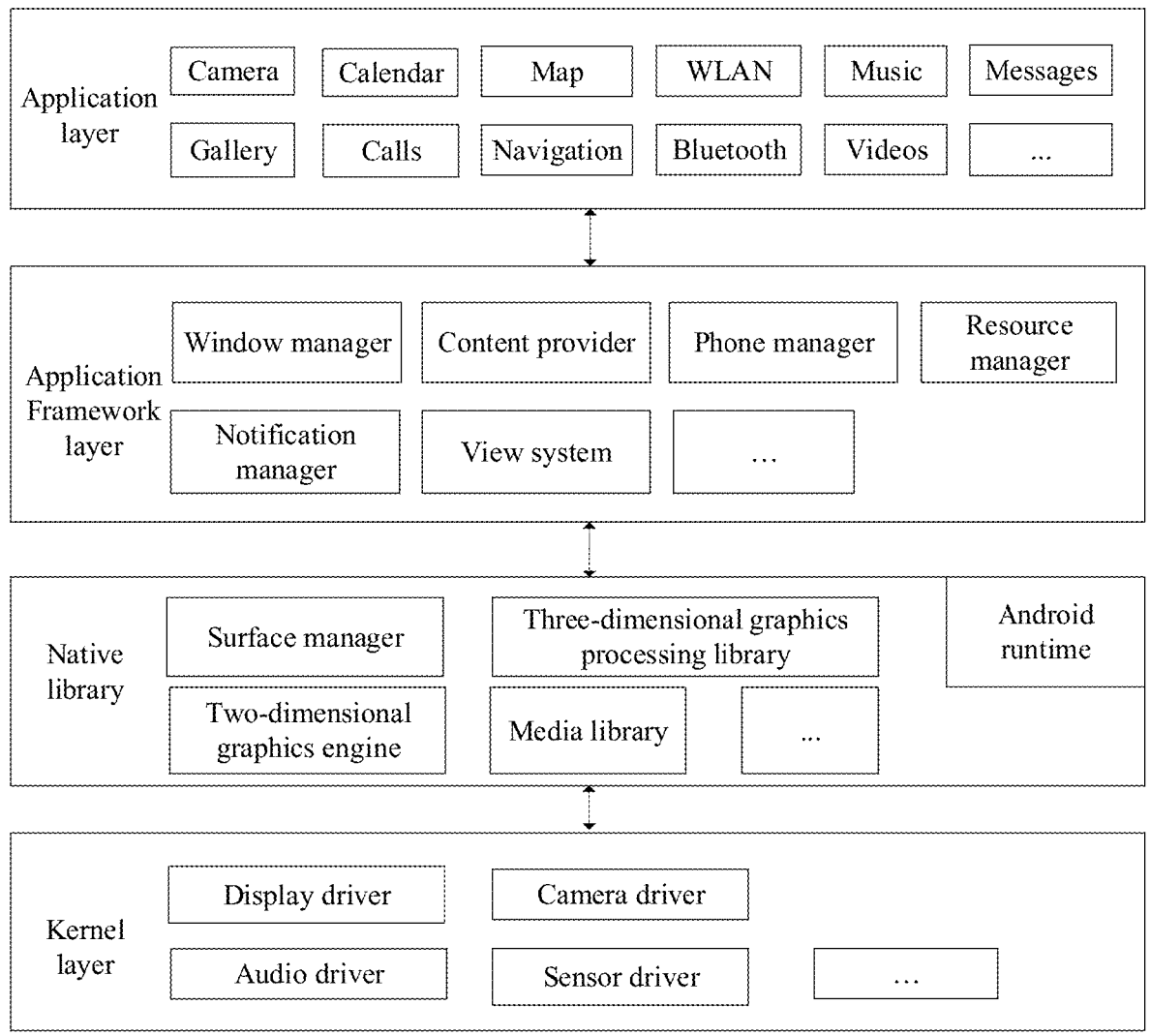
FIG. 2 is a block diagram of a software structure of a terminal device according to an embodiment of this application.

FIG. 2 is a block diagram of a software structure of the terminal 100 according to an embodiment of the present disclosure.

In the layered architecture, software is divided into several layers, and each layer has a clear-cut role and task. The layers communicate with each other through a software interface. In some embodiments, the Android system is divided into four layers: an application layer, an application framework layer, Android runtime and a native library, and a kernel layer, from top to bottom.

The application layer may include a series of application packages.

As shown in FIG. 2, an application package may include applications such as Camera, Gallery, Calendar, Calls, Maps, Navigation, WLAN, Bluetooth, Music, Videos, and Messages.

The application framework layer provides an application programming interface (API) and a programming framework to an application at the application layer. The application framework layer includes some predefined functions.

As shown in FIG. 2, the application framework layer may include a window manager, a content provider, a view system, a phone manager, a resource manager, a notification manager, and the like.

The window manager is used to manage a window program. The window manager may obtain a size of a display screen, determine whether there is a status bar, lock the screen, take a screenshot, and the like.

The content provider is used to store and obtain data, and enable the data to be accessed by an application. The data may include a video, an image, audio, outgoing and incoming calls, a browsing history and bookmarks, contacts, and the like.

The view system includes a visual control, for example, a control for displaying text and a control for displaying an image. The view system may be used to construct an application. A display interface may include one or more views. For example, a display interface including a notification icon of Messages may include a text display view and a picture display view.

The phone manager is used to provide a communication function of the terminal 100, for example, management of a call status (including answering, hanging up, and the like).

The resource manager provides, to an application, various resources, such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a status bar atop the system in a form of a graph or a scroll bar text, for example, a notification of an application that is run on the background, or may be a notification that appears on the screen in a form of a dialog window. For example, text information is prompted in the status bar, a prompt tone is played, the electronic device vibrates, or the indicator light blinks.

Android runtime includes a core library and a virtual machine. Android runtime is responsible for scheduling and management of the Android system.

The core library includes two parts. One of the parts is a performance function that needs to be invoked in the Java language, and the other part is a core library of Android.

The application layer and the application framework layer run on the virtual machine. The virtual machine executes Java files at the application layer and the application framework layer as binary files. The virtual machine is configured to implement functions such as object life cycle management, stack management, thread management, safety and exception management, and garbage collection.

The native library may include a plurality of functional modules, for example, a surface manager, a media library, a three-dimensional graphics processing library (for example, OpenGL ES), and a 2D graphics engine (for example, SGL)

The surface manager is used to manage a display subsystem and provide fusion of 2D and 3D layers for a plurality of applications.

The media library supports playback and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An example of a working procedure of software and hardware on the terminal 100 is described below with reference to a photographing scenario.

When the touch sensor 180K receives a touch operation, a corresponding hardware interruption is sent to the kernel layer. The kernel layer processes the touch operation into an original input event (including information, for example, touch coordinates and a time stamp of the touch operation). The original input event is stored in the kernel layer. The application framework layer obtains the original input event from the kernel layer, and recognizes a control corresponding to the input event. For example, the touch operation is a touch and click operation, and a control corresponding to the click operation is a control of an icon of a camera application. The camera application invokes an interface in the application framework layer to start the camera application, to enable a camera driver by invoking the kernel layer and capture a static image or a video by using the camera 193. The captured video may be a first image and a second image in embodiments of this application.

For ease of understanding, an image processing method provided in an embodiment of this application is described in detail with reference to the accompanying drawings and an application scenario.

This embodiment of this application may be applied to scenarios such as real-time photographing, video post-processing, and target tracking. Descriptions about each of the scenarios are provided below.

Example 1: Real-Time Photographing

In this embodiment of this application, in a scenario of real-time photographing or recording of a terminal, a camera on the terminal may acquire a video stream in real time, and display, in a photographing interface, a preview picture generated based on the video stream acquired by the camera.

The video stream acquired by the camera may include a first image and a second image. The first image and the second image are two original image frames that are acquired by the terminal and that are adjacent to each other in time domain. In an embodiment, the video acquired by the terminal in real time is a sequence of original images that is sorted sequentially in the time domain, and the second image is an original image that is adjacent to and after the first image in the time domain. For example, the video acquired by the terminal in real time includes a $0^{th}$ image frame, a $1^{st}$ image frame, a $2^{nd}$ image frame, ..., and an $X^{th}$ image frame that are sorted in the time domain, where the first image is an $n^{th}$ image frame, the second image is an (n+1)th image frame, and n is an integer greater than or equal to 0 and less than X.

The first image and the second image are original images acquired by the camera on the terminal. A concept of an original image is described below.

The terminal may open a shutter for photographing, and light may be transferred to a photosensitive element of the camera through a lens. The photosensitive element of the camera may convert an optical signal into an electrical signal, and transfer the electrical signal to an image signal processor (image signal processor, ISP), a digital signal processor (DSP), and the like for processing, so that an image may be obtained through the conversion. The image may be referred to as an original image acquired by the camera. The first image and the second image described in this embodiment of this application may be the foregoing original images. According to the image processing method provided in this embodiment of this application, image processing may be performed on the original images based on the original images, to obtain processed target images (a third image and a fourth image), so that a preview picture including the third image and the fourth image may be displayed in a viewfinder frame 402. It should be understood that, the first image and the second image may alternatively be images obtained by cropping images obtained after being processed by the ISP and the DSP. The cropping may be performed to suit a size of a display screen of the terminal or a size of a viewfinder frame in the photographing interface.

In this embodiment of this application, stabilization and perspective distortion correction may be performed on the video stream acquired by the camera in real time. The first image and the second image in this embodiment of this application are used as an example to describe how to perform stabilization and perspective distortion correction on the first image and the second image.

In some scenarios, a user may hold a terminal device to photograph a target area. The target area may include a moving object, or the target area may be a stationary area, that is, may not include a moving object.

When stabilization and perspective distortion correction are performed on the video stream, a jello effect (or a jello phenomenon) may occur in the preview picture displayed in the viewfinder frame. The jello phenomenon (jello effect) means that a picture is transformed and changed like jello. A cause of the jello (Jello) effect is described below.

Perspective distortion and perspective distortion correction of an image are first introduced.

When a camera is in a mode of wide-angle photographing or a mode of main camera photographing, an acquired original image has obvious perspective distortion. In an embodiment, perspective distortion (also referred to as 3D distortion) is transformation in 3D object imaging (for example, transverse stretching, radial stretching, and a combination thereof) caused by different magnification ratios, when a three-dimensional shape in space is mapped to an image plane, due to a difference in depths of field for photographing. Therefore, perspective distortion correction needs to be performed on the image.

It should be understood that the transformation in 3D object imaging may be understood as image transformation due to transformation of an object in an image compared with how a real object look in human eyes.

In an image with perspective distortion, compared with an object closer to a center of the image, an object farther away from the center of the image has more obvious perspective distortion, that is, has a larger length of imaging transformation (a greater amplitude of transverse stretching, radial stretching, and a combination thereof). Therefore, to obtain an image without the problem of perspective distortion, during perspective distortion correction on the image, for position points or pixels at different distances from the center of the image, shifts that need to be corrected are different, and for position points or pixels that are farther away from the center of the image, shifts that need to be corrected are larger.

Figure 4A:
FIG. 4a is a schematic diagram of perspective distortion according to an embodiment of this application.

Refer to FIG. 4a. FIG. 4a is a schematic diagram of an image with perspective distortion. As shown in FIG. 4a, a person in an edgy area of the image has specific 3D transformation.

In some scenarios, in a process in which the user holds the terminal device for photographing, a shake may occur.

When the user holds the terminal for photographing, because the user cannot keep a posture of holding the terminal stable, the terminal shakes in a direction of an image plane (that is, the terminal has a large posture change within a very short time). The image plane may refer to a plane on which an imaging surface of a camera is located, and may be a plane on which a photosensitive surface of the photosensitive element of the camera is located. From a perspective of the user, the image plane may be a plane that is basically the same as or exactly the same as a plane on which the display screen is located. The shake in the direction of the image plane may include a shake in each direction on the image plane, for example, a leftward, rightward, upward, downward, upper left, lower left, upper right, or lower right shake.

As the user holds the terminal to photograph the target area, when the user holds the terminal and has a shake in a direction A, an offset toward a direction opposite to the direction A is included in image content that is in the original image acquired by the camera on the terminal and that includes the target area. For example, when the user holds the terminal and has a shake in an upper left direction, an offset toward a direction opposite to the upper left direction is included in image content that is in the original image acquired by the camera on the terminal and that includes the target area.

It should be understood that the shake in the direction A that occurs when the user holds the terminal may be understood as that the terminal shakes in the direction A from the perspective of the user who holds the terminal.

Figures 1, 4B:
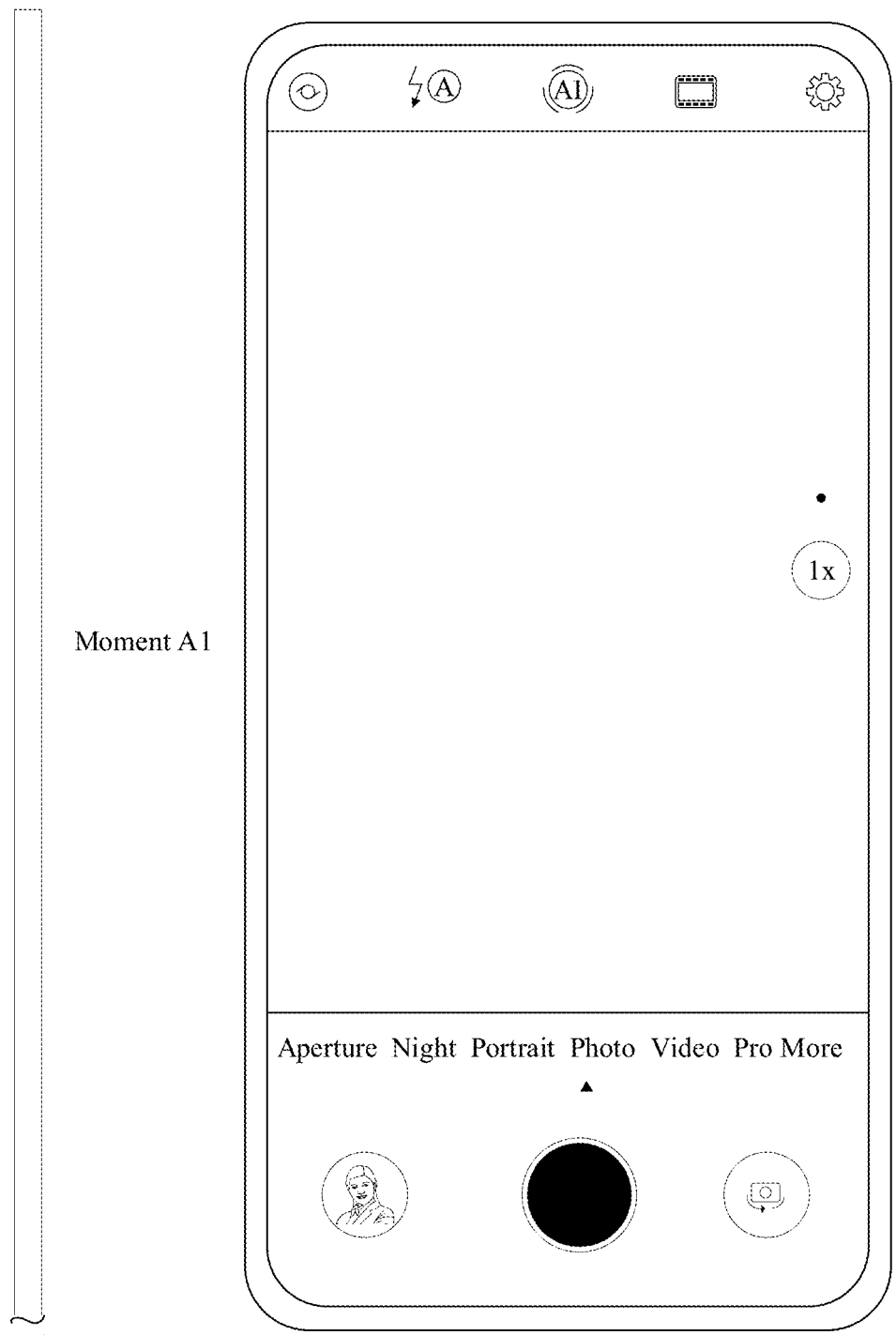
Figure 4B:
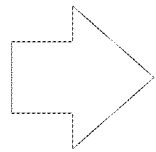
Figure 2:
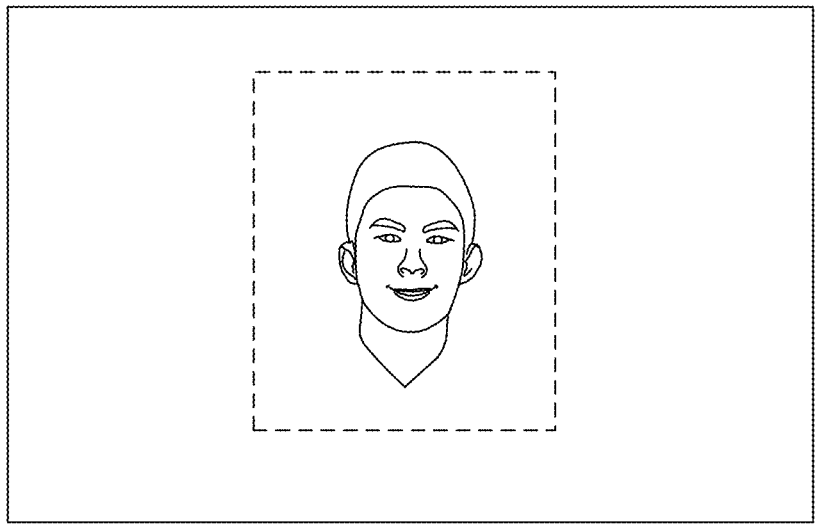
Figures 3, 4B:
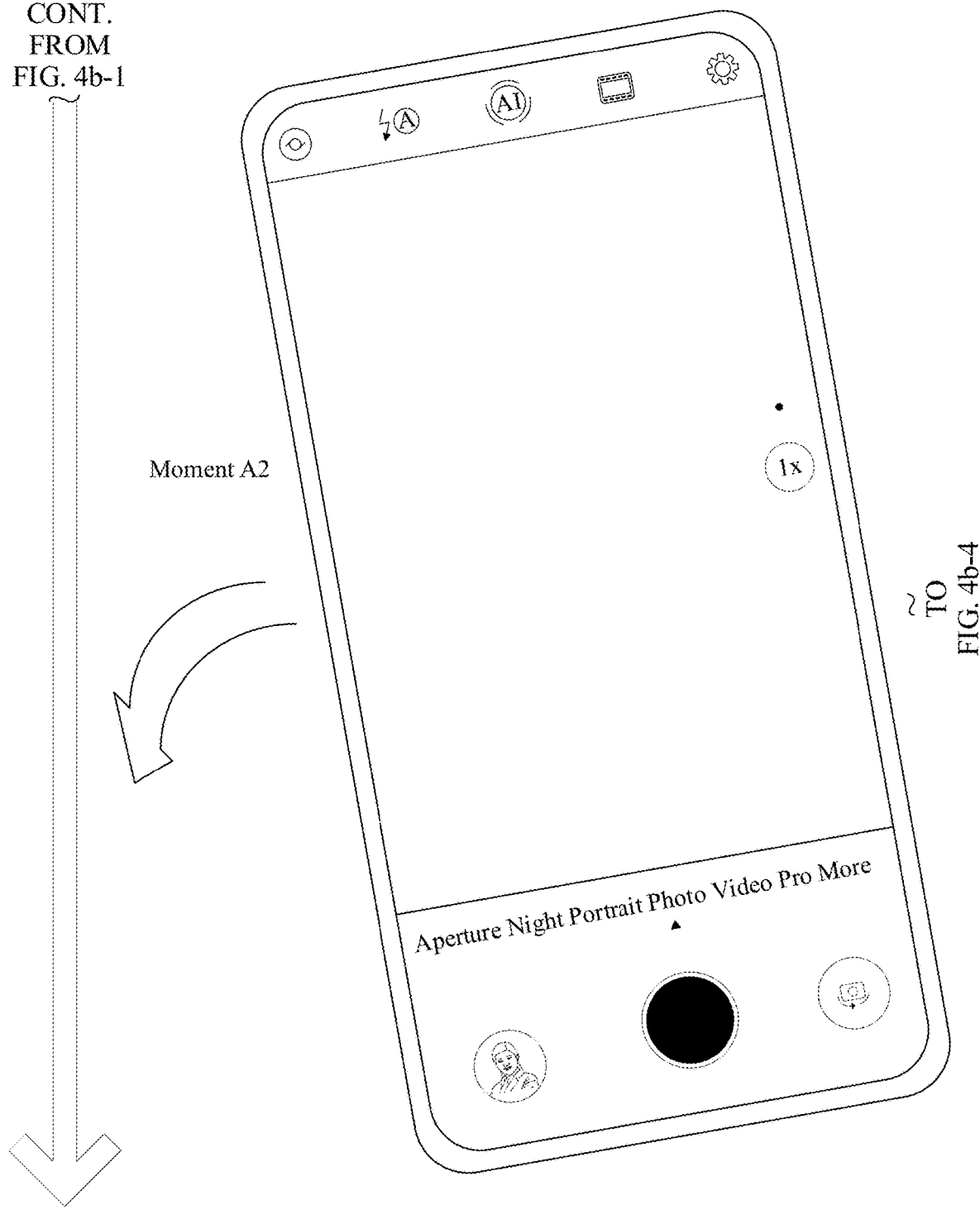
Figures 3, 4, 4B:
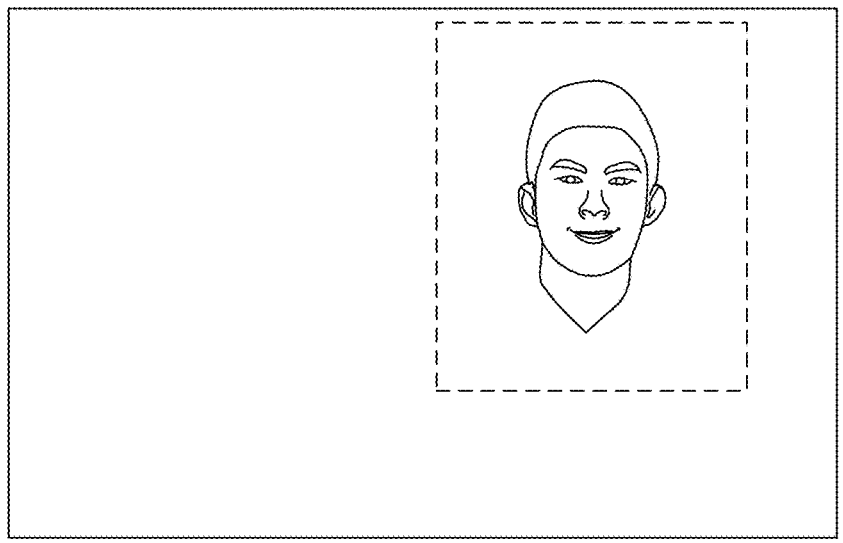

Refer to FIG. 4b-1 to FIG. 4b-4. FIG. 4b-1 to FIG. 4b-4 are a schematic diagram of a scenario in which the terminal shakes. As shown in FIG. 4b-1 to FIG. 4b-4, at a moment A1, the user holds the terminal device to photograph an object 1. In this case, the object 1 may be displayed in the photographing interface. Between moments A1 and A2, the user holds the terminal device and has a shake in a lower left direction. In this case, the object 1 in an original image acquired by the camera has an offset toward an upper right direction.

As the user holds the terminal to photograph the target area, because a posture of the user when holding the terminal is unstable, the target area has a large offset between adjacent image frames acquired by the camera (in other words, there is large content misalignment between the two adjacent image frames acquired by the camera). When the terminal device shakes, there is usually large content misalignment between the two adjacent image frames acquired by the camera, and consequently, a video acquired by the camera is blurry. It should be understood that, compared with using a wide-angle camera, when the terminal shakes, misalignment between images acquired by using a main camera is more serious, and compared with using the main camera, when the terminal shakes, misalignment between images acquired by using a long-focus camera is more serious.

During stabilization, after the two adjacent image frames are in register, an edgy part may be cropped to obtain a clear image (that may be referred to as an output of stabilization or a stabilization viewfinder frame, for example, a first cropped area and a third cropped area in this embodiment of this application).

Performing stabilization is to eliminate a shake in an acquired video due to a posture change when a user holds a terminal device. In an embodiment, performing stabilization is to crop the original image acquired by the camera, to obtain an output in a viewfinder frame. The output in the viewfinder frame is an output of stabilization. When the terminal has a large posture change within a very short time, there is a large offset of a picture in the viewfinder frame of a latter image frame from a picture of a former image frame. For example, compared with when an $n^{th}$ frame is acquired, when the terminal acquires an $(n+1)^{th}$ frame, there is a shake in a direction A in a direction of an image plane (it should be understood that the shake in the direction A may be a shake of a direction of a principal optical axis of the camera on the terminal toward the direction A or a shake of a position of an optical center of the camera on the terminal toward the direction A in the direction of the image plane). In this case, a picture in the viewfinder frame of the $(n+1)^{th}$ image frame is deviated, in the $n^{th}$ image frame, toward a direction opposite to the direction A.

FIG. 4b-1 to FIG. 4b-4 are used as an example. Between the moments A1 and A2, the user holds the terminal device and has a shake in the lower left direction. In this case, the object 1 in the original image acquired by the camera has an offset toward the upper right direction, and therefore, a cropped area (a dashed box shown in FIG. 4b-1 to FIG. 4b-4) that needs to be cropped for stabilization correspondingly has an offset toward the upper right direction.

For stabilization, an offset shift (including an offset direction and an offset distance) of a picture in the viewfinder frame of a latter original image frame from a picture of a former original image frame needs to be determined. In an embodiment, the offset shift may be determined based on a shake that occurs in a process in which the terminal acquires two adjacent original image frames. In an embodiment, the offset shift may be a posture change that occurs in a process in which the terminal acquires two adjacent original image frames. The posture change may be obtained based on a photographed posture corresponding to the viewfinder frame in a previous original image frame and a posture when the terminal photographs a current original image frame.

After stabilization, when the user holds the terminal device and has a large shake, although pictures of adjacent original image frames have a great difference, pictures in the viewfinder frame obtained after the adjacent original image frames are cropped do not have a great difference or have no difference, so that a picture displayed in the viewfinder frame in the photographing interface does not show a great shake or blur.

Figure 4C:
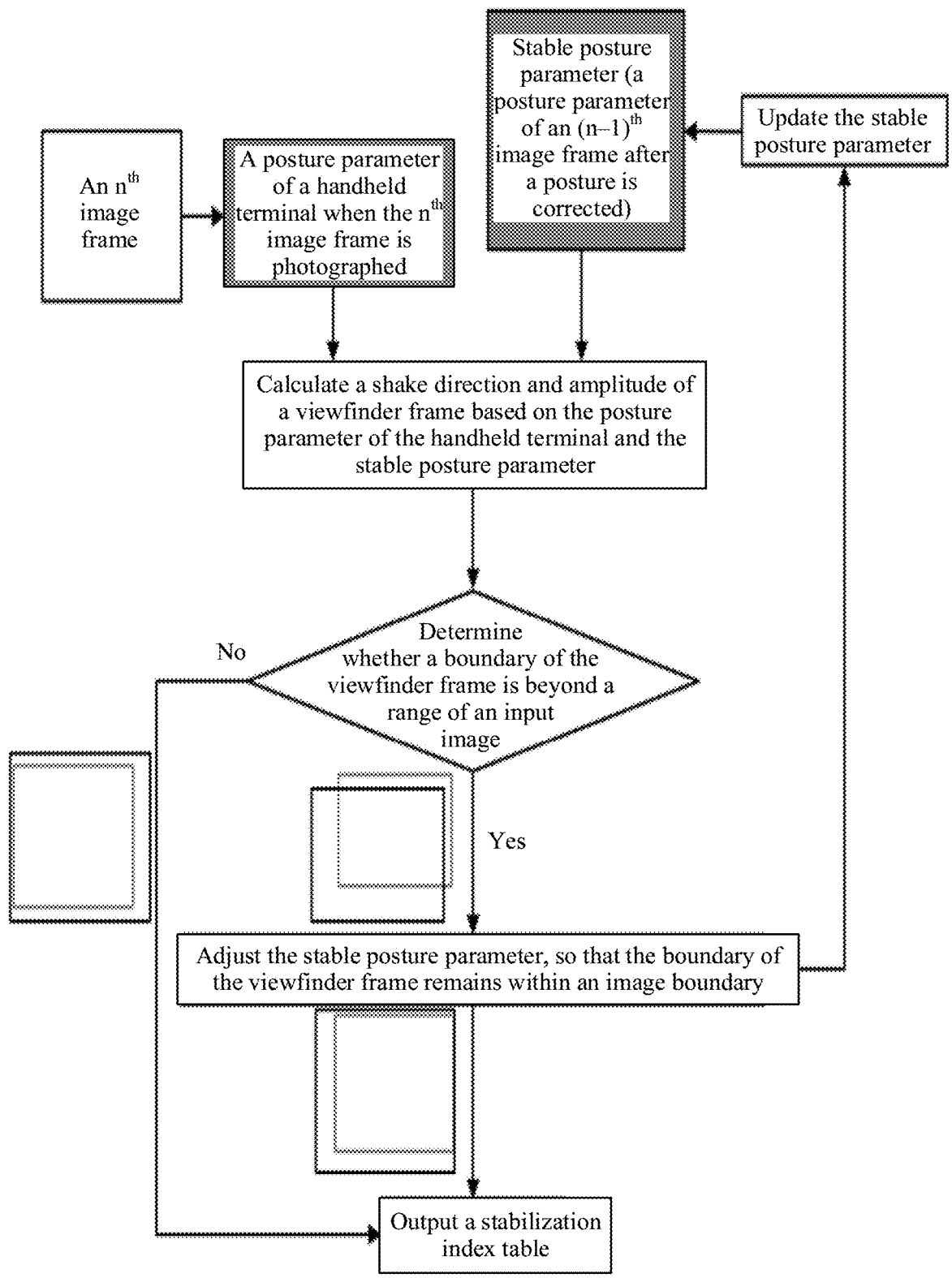
FIG. 4c is a schematic diagram of stabilization according to an embodiment of this application.

With reference to FIG. 4c, a schematic diagram of a detailed process of stabilization is provided below. Refer to FIG. 4c. For the $n^{th}$ original image frame acquired by the camera, a posture parameter of the handheld terminal when the $n^{th}$ image frame is photographed may be obtained. The posture parameter of the handheld terminal may indicate a posture of the terminal when the $n^{th}$ frame is acquired, and the posture parameter of the handheld terminal may be obtained based on information acquired by a sensor on the terminal. The sensor on the terminal may be, but not limited to, a gyroscope, and the acquired information may be, but not limited to, a rotational angular velocity of the terminal on an x-axis, a rotational angular velocity of the terminal on a y-axis, and a rotational angular velocity of the terminal on a z-axis.

In addition, a stable posture parameter of a previous image frame, that is, a posture parameter of an $(n-1)^{th}$ image frame, may be further obtained. The stable posture parameter of the previous image frame may refer to a photographing posture corresponding to the viewfinder frame in the $(n-1)^{th}$ image frame. A shake direction and amplitude (the shake direction and amplitude may also be referred to as a shake shift) of the viewfinder frame in the original image on the image plane may be calculated based on the stable posture parameter of the previous image frame and the posture parameter of the handheld terminal when the $n^{th}$ image frame is acquired. A size of the viewfinder frame is preset. When n is 0, that is, when the first image frame is acquired, a position of the viewfinder frame may be a center of the original image. After the shake direction and amplitude of the viewfinder frame in the original image on the image plane are obtained, a position of the viewfinder frame in the $n^{th}$ original image frame may be determined, and whether a boundary of the viewfinder frame is beyond a range of an input image (that is, the $n^{th}$ original image frame) is determined. If the boundary of the viewfinder frame is beyond the range of the input image due to an excessively large shake amplitude, a stable posture parameter of the $n^{th}$ image frame is adjusted, so that the boundary of the viewfinder frame remains within a boundary of the input original image. As shown in FIG. 4b-1 to FIG. 4b-4, if the boundary of the viewfinder frame is beyond the range of the input image in an upper right direction, the stable posture parameter of the $n^{th}$ image frame is adjusted, so that the position of the viewfinder frame moves toward the lower left, and the boundary of the viewfinder frame can be within the boundary of the input original image. Further, a stabilization index table is output. The output stabilization index table indicates a posture correction shift of each pixel or position point in the image after a shake is removed, and the output of the viewfinder frame may be determined based on the output stabilization index table and the $n^{th}$ original image frame. If a shake amplitude is not large or no shake occurs, and therefore the boundary of the viewfinder frame is not beyond the range of the input image, the stabilization index table may be output directly.

Similarly, when stabilization is performed on the $(n+1)^{th}$ image frame, a posture parameter of the $n^{th}$ image frame may be obtained. The posture parameter of the $n^{th}$ image frame may refer to a photographing posture corresponding to the viewfinder frame in the $n^{th}$ image frame. The shake direction and amplitude (the shake direction and amplitude may also be referred to as a shake shift) of the viewfinder frame in the original image on the image plane may be calculated based on the stable posture parameter of the $n^{th}$ image frame and a posture parameter of the handheld terminal when the $(n+1)^{th}$ image frame is acquired. The size of the viewfinder frame is preset. Then, a position of the viewfinder frame in the $(n+1)^{th}$ original image frame may be determined, and whether a boundary of the viewfinder frame is beyond a range of an input image (that is, the $(n+1)^{th}$ original image frame) is determined. If the boundary of the viewfinder frame is beyond the range of the input image due to an excessively large shake amplitude, a stable posture parameter of the $(n+1)^{th}$ image frame is adjusted, so that the boundary of the viewfinder frame remains within a boundary of the input original image. Further, a stabilization index table is output. If a shake amplitude is not large or no shake occurs, and therefore the boundary of the viewfinder frame is not beyond the range of the input image, the stabilization index table may be output directly.

To describe the foregoing process of stabilization more clearly, an example in which n is 0, that is, the first image frame is acquired is used to describe the process of stabilization.

Figure 4D:
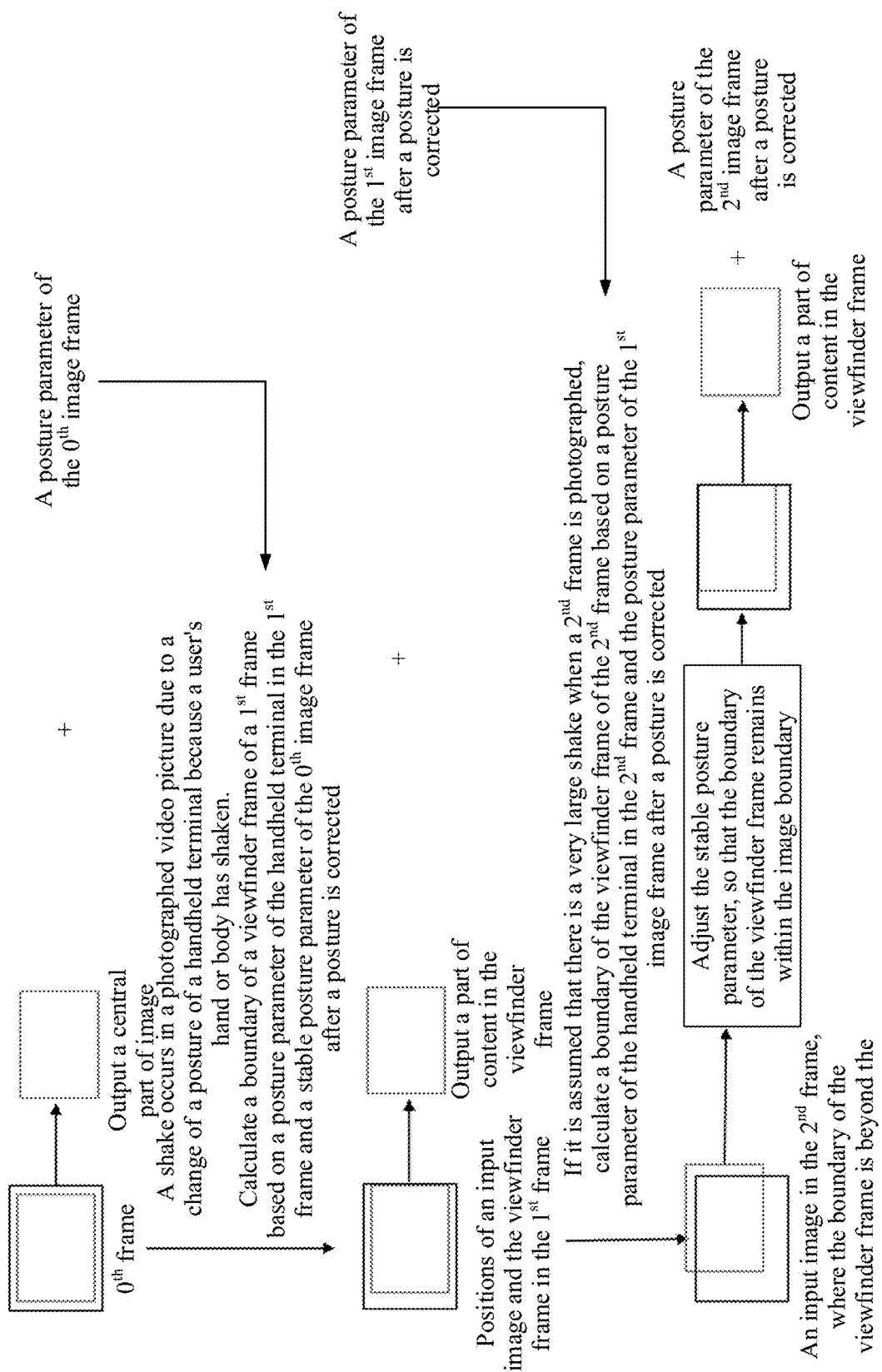
FIG. 4d is a schematic diagram of stabilization according to an embodiment of this application.

Refer to FIG. 4d. FIG. 4d is a schematic diagram of a process of stabilization according to an embodiment of this application. As shown in FIG. 4d, a central part of image of a $0^{th}$ frame is cropped as an output of stabilization of the $0^{th}$ frame (that is, an output of the viewfinder frame of the $0^{th}$ frame). Then, because the user has a shake when holding the terminal and a posture of the terminal changes, a video picture that has been photographed has a shake. A boundary of the viewfinder frame of a $1^{st}$ frame may be calculated based on a posture parameter of the handheld terminal of the $1^{st}$ frame and a stable posture parameter of a posture in the $0^{th}$ image frame. As shown in FIG. 4d, it is determined that a position of the viewfinder frame in the $1^{st}$ original image frame has a rightward offset. The viewfinder frame of the $1^{st}$ frame is output, and it is assumed that there is a very large shake when a $2^{nd}$ image frame is photographed. If a boundary of the viewfinder frame of the $2^{nd}$ frame calculated based on a posture parameter of the handheld terminal of the $2^{nd}$ frame and a posture parameter of the $1^{st}$ image frame after a posture is corrected is beyond a boundary of the $2^{nd}$ input original image frame, the stable posture parameter is adjusted, so that the boundary of the viewfinder frame of the $2^{nd}$ original image frame remains within the boundary of the $2^{nd}$ original image frame, to obtain an output of the viewfinder frame of the $2^{nd}$ original image frame.

In some photographing scenarios, performing stabilization and perspective distortion correction on an acquired original image may cause the jello (Jello) effect in a picture. The cause is described below.

In some embodiments, to perform stabilization and perspective distortion correction on an image at a same time, a stabilization viewfinder frame needs to be confirmed in an original image, and perspective distortion correction needs to be performed on all areas of the original image. In this case, it is equivalent to that perspective distortion correction is performed on an image area in the stabilization viewfinder frame, and the image area in the stabilization viewfinder frame is output. However, the foregoing manner has the following problems: As when a terminal device shakes, content misalignment usually occurs between two adjacent original image frames acquired by a camera, positions of image areas to be output after stabilization is performed on the two image frames are different in an original image, that is, distances between the image areas to be output after stabilization is performed on the two image frames and a center point of the original image are different, and as a result, shifts for perspective distortion correction on position points or pixels in two image frames to be output are different. Because outputs of stabilization on two adjacent frames are images that include same or basically same content, degrees of transformation of a same object in the images are different, that is, inter-frame consistency is lost, the jello phenomenon occurs, and quality of a video output is reduced.

Figure 4E:
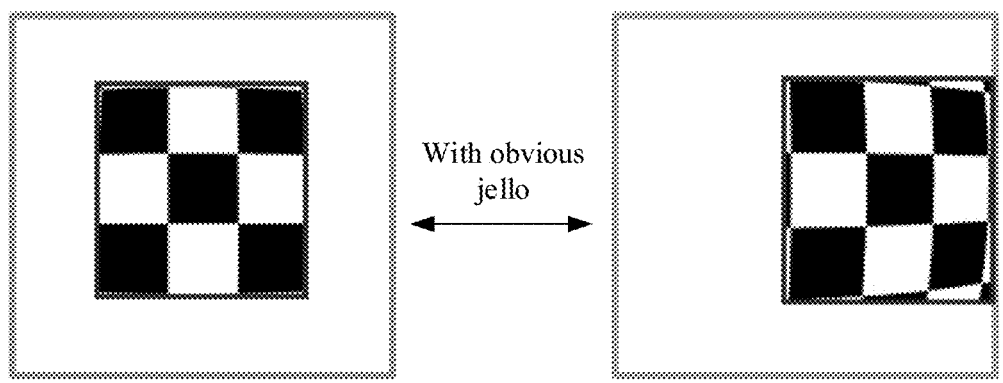
FIG. 4e is a schematic diagram of a jello phenomenon.

For example, the cause of the jello phenomenon may be shown in FIG. 4e. There is an obvious shake between a first frame and a second frame, and a stabilization viewfinder frame has moved from a center of a picture to an edge of the picture. Content in a smaller frame is an output of stabilization, and a larger frame is an original image. When a position of checkerboard-represented content in the original image changes, changes of intervals between squares in a former frame and a latter frame are different because of different shifts for perspective distortion correction. As a result, there is obvious stretching of squares (that is, the jello phenomenon) in outputs of stabilization of the former frame and the latter frame.

An embodiment of this application provides an image processing method, so that when stabilization and perspective distortion correction are performed on an image at a same time, inter-frame consistency can be ensured, and a jello phenomenon between the images is avoided, or a degree of transformation due to the jello phenomenon between the images is reduced.

How to ensure inter-frame consistency when stabilization and perspective distortion correction are performed on an image at a same time is described below in detail. This embodiment of this application is described by using an example in which stabilization and perspective distortion correction are performed on a first image and a second image. The first image and the second image are two original image frames that are acquired by a terminal and that are adjacent to each other in time domain. In an embodiment, a video acquired by the terminal in real time is a sequence of original images that is sorted sequentially in the time domain, and the second image is an original image that is adjacent to and after the first image in the time domain. For example, the video acquired by the terminal in real time includes a $0^{th}$ image frame, a $1^{st}$ image frame, a $2^{nd}$ image frame, . . . , and an $X^{th}$ image frame that are sorted in the time domain, where the first image is an $n^{th}$ image frame, the second image is an $(n+1)^{th}$ image frame, and n is an integer greater than or equal to 0 and less than X.

In this embodiment of this application, stabilization may be performed on the acquired first image to obtain a first cropped area. The first image is one original image frame of the video acquired by a camera on the terminal in real time. For a process of acquiring an original image by using the camera, refer to the descriptions in the foregoing embodiment. Details are not described herein again.

In an embodiment, the first image is the first original image frame of the video acquired by the camera on the terminal in real time, and the first cropped area is in a central area of the first image. For details, refer to the descriptions about how to perform stabilization on the $n^{th}$ frame in the foregoing embodiment. Details are not described herein again.

In an embodiment, the first image is an original image after the first original image frame of the video acquired by the camera on the terminal in real time, and the first cropped area is determined based on a shake that occurs in a process in which the terminal acquired the first image and an original image that is adjacent to and before the first image. For details, refer to the descriptions about how to perform stabilization on the $n^{th}$ (n is not equal to 0) frame in the foregoing embodiment. Details are not described herein again.

In an embodiment, stabilization may be performed on the first image by default. By default means that stabilization is directly performed on an acquired original image without a need to enable a stabilization function. For example, stabilization is performed on an acquired video when a photographing interface is opened. The stabilization function may be enabled based on an enabling operation of a user. Alternatively, whether to enable the stabilization function is determined by analyzing a photographing parameter of a current photographing scenario and content of the acquired video.

In an embodiment, it may be detected that the terminal satisfies a stabilization condition, and the stabilization function is enabled, to perform stabilization on the first image.

In an embodiment, detecting that the terminal satisfies the stabilization condition includes, but is not limited to, one or more of the following cases:

Case 1: It is detected that a zoom ratio of the terminal is greater than a second preset threshold.

In an embodiment, whether to enable the stabilization function may be determined based on the zoom ratio of the terminal. When the zoom ratio of the terminal is small (for example, within a full or partial zoom ratio range of a wide-angle photographing mode), a size of a physical area corresponding to a picture displayed in the viewfinder frame in the photographing interface is already tiny. If stabilization is further performed, that is, an image is further cropped, the size of the physical area corresponding to the picture displayed in the viewfinder frame becomes smaller. Therefore, the stabilization function may be enabled only when the zoom ratio of the terminal is greater than a specific preset threshold.

In an embodiment, before stabilization is performed on the first image, it needs to be detected that the zoom ratio of the terminal is greater than or equal to the second preset threshold. The second preset threshold is a smallest zoom ratio for enabling the stabilization function. When the zoom ratio of the terminal ranges from a to 1, the terminal acquires a video stream in real time by using a front-facing wide-angle camera or a rear-facing wide-angle camera, where a is a fixed zoom ratio of the front-facing wide-angle camera or the rear-facing wide-angle camera, and a value of a ranges from 0.5 to 0.9. In this case, the second preset threshold may be a zoom ratio value greater than or equal to a and less than or equal to 1. For example, the second preset threshold may be a. In this case, the stabilization function is not enabled only when the zoom ratio of the terminal is less than a. For example, the second preset threshold may be 0.6, 0.7, or 0.8. This is not limited herein.

Case 2: A second enabling operation of the user for enabling the stabilization function is detected.

In an embodiment, a control (referred to as the second control in this embodiment of this application) used to indicate to enable or disable the stabilization function may be included in the photographing interface. The user may trigger to enable the stabilization function through the second operation on the second control, that is, enable the stabilization function through the second operation on the second control. In this way, the terminal may detect the second enabling operation of the user for enabling the stabilization function, and the second enabling operation includes the second operation on the second control in the photographing interface on the terminal.

In an embodiment, the control (referred to as the second control in this embodiment of this application) used to indicate to enable or disable the stabilization function is displayed in the photographing interface only when it is detected that the zoom ratio of the terminal is greater than or equal to the second preset threshold. In an embodiment, optical distortion correction may be further performed on the first cropped area to obtain a corrected first cropped area.

In an embodiment, perspective distortion correction may be performed on the first cropped area by default. By default means that perspective distortion correction is directly performed on the first cropped area without a need to enable perspective distortion correction. For example, perspective distortion correction is performed, when the photographing interface is opened, on the first cropped area obtained after stabilization is performed. Perspective distortion correction may be enabled based on an enabling operation of the user. Alternatively, whether to enable perspective distortion correction is determined by analyzing the photographing parameter of the current photographing scenario and the content of the acquired video.

In an embodiment, it may be detected that the terminal satisfies a distortion correction condition, and a distortion correction function is enabled, to perform perspective distortion correction on the first cropped area.

It should be understood that time at which an action of detecting that the terminal satisfies the distortion correction condition and enabling the distortion correction function may be before the operation of performing stabilization on the acquired first image; or may be after stabilization is performed on the acquired first image and before perspective distortion correction is performed on the first cropped area. This is not limited in this application.

In an embodiment, detecting that the terminal satisfies the distortion correction condition includes, but is not limited to, one or more of the following cases:

Case 1: It is detected that a zoom ratio of the terminal is less than a first preset threshold.

In an embodiment, whether perspective distortion correction is enabled may be determined based on the zoom ratio of the terminal. When the zoom ratio of the terminal is large (for example, within a full or partial zoom ratio range of a long-focus photographing mode, or within a full or partial zoom ratio range of a medium-focus photographing mode), a degree of perspective distortion in a picture of an image acquired by the terminal is low. That the degree of perspective distortion is low may be understood as that human eyes almost cannot identify any perspective distortion in the picture of the image acquired by the terminal. Therefore, when the zoom ratio of the terminal is large, perspective distortion correction does not need to be enabled.

In an embodiment, before perspective distortion correction is performed on the first cropped area by default, it needs to be detected that the zoom ratio of the terminal is less than the first preset threshold. The first preset threshold is a maximum zoom ratio value for enabling perspective distortion correction. In other words, when the zoom ratio of the terminal is less than the first preset threshold, perspective distortion correction can be enabled.

When the zoom ratio of the terminal ranges from a to 1, the terminal acquires a video stream in real time by using a front-facing wide-angle camera or a rear-facing wide-angle camera, where a zoom ratio corresponding to an image photographed by the wide-angle camera may range from a to 1. The minimum value a may be a fixed zoom ratio of the wide-angle camera, and a value of a may range from 0.5 to 0.9. For example, a may be, but not limited to, 0.5, 0.6, 0.7, 0.8, or 0.9. It should be understood that the wide-angle camera may include the front-facing wide-angle camera and the rear-facing wide-angle camera. Ranges of zoom ratios corresponding to the front-facing wide-angle camera and the rear-facing wide-angle camera may be the same or may be different. For example, a zoom ratio corresponding to the front-facing wide-angle camera may range from a1 to 1, where the minimum value a1 may be a fixed zoom ratio of the front-facing wide-angle camera, and a value of a1 may range from 0.5 to 0.9. For example, a1 may be, but not limited to, 0.5, 0.6, 0.7, 0.8, or 0.9. For example, a zoom ratio corresponding to the rear-facing wide-angle camera may range from a2 to 1, where the minimum value a2 may be a fixed zoom ratio of the rear-facing wide-angle camera, and a value of a2 may range from 0.5 to 0.9. For example, a2 may be, but not limited to, 0.5, 0.6, 0.7, 0.8, or 0.9. When the terminal uses the front-facing wide-angle camera or the rear-facing wide-angle camera to acquire the video stream in real time, the first preset threshold is greater than 1. For example, the first preset threshold may be 2, 3, 4, 5, 6, 7, or 8. This is not limited herein.

When the zoom ratio of the terminal ranges from 1 to b, the terminal acquires a video stream in real time by using a rear-facing main camera. When a rear-facing long-focus camera is further integrated on the terminal, b may be a fixed zoom ratio of the rear-facing long-focus camera, and a value of b may range from 3 to 15. For example, b may be, but not limited to, 3, 4, 5, 6, 7, 8, 9, 10, 11, 12, 13, 14, or 15. When no rear-facing long-focus camera is integrated on the terminal, a value of b may be a maximum zoom of the terminal, and the value of b may range from 3 to 15. For example, b may be, but not limited to, 3, 4, 5, 6, 7, 8, 9, 10, 11, 12, 13, 14, or 15. When the terminal acquires the video stream in real time by using the rear-facing main camera, the first preset threshold is 1 to 15. For example, the first preset threshold may be 1, 2, 3, 4, 5, 6, 7, 8, 9, 11, 12, 13, 14, or 15. This is not limited herein.

It should be understood that a range (from 1 to 15) of the first preset threshold may include the zoom ratios at two ends (1 and 15), may not include the zoom ratios at two ends (1 and or may include one of the zoom ratios at two ends.

For example, the range of the first preset threshold may be an interval [1, 15].

For example, the range of the first preset threshold may be an interval (1, 15].

For example, the range of the first preset threshold may be an interval [1, 15).

For example, the range of the first preset threshold may be an interval (1, 15).

Case 2: A first enabling operation of a user for enabling the perspective distortion correction function is detected.

In an embodiment, a control (referred to as the first control in this embodiment of this application) used to indicate to enable or disable perspective distortion correction may be included in the photographing interface. The user may trigger to enable perspective distortion correction through the first operation on the first control, that is, enable perspective distortion correction through the first operation on the first control. In this way, the terminal may detect the first enabling operation of the user for enabling perspective distortion correction, and the first enabling operation includes the first operation on the first control in the photographing interface on the terminal.

In an embodiment, the control (referred to as the first control in this embodiment of this application) used to indicate to enable or disable perspective distortion correction is displayed in the photographing interface only when it is detected that the zoom ratio of the terminal is less than the first preset threshold.

Case 3: A human face in a photographing scenario is identified; a human face in a photographing scenario is identified, where a distance between the human face and the terminal is less than a preset value; or a human face in a photographing scenario is identified, where a proportion of pixels occupied by the human face in an image corresponding to the photographing scenario is greater than a preset proportion, to determine to enable perspective distortion correction.

It should be understood that, when there is a human face in the photographing scenario, because a degree of transformation of the human face due to perspective distortion correction is more visually obvious, and when a distance between the human face and the terminal is smaller or a proportion of pixels occupied by the human face in an image corresponding to the photographing scenario is greater, a size of the human face in the image is larger, the degree of transformation of the human face due to perspective distortion correction is even more visually obvious. Therefore, perspective distortion correction needs to be enabled in the foregoing scenario. In this embodiment, whether to enable perspective distortion correction is determined by determining the foregoing condition related to a human face in a photographing scenario, so that a photographing scenario in which perspective distortion occurs can be accurately determined, and perspective distortion correction is performed for the photographing scenario in which perspective distortion occurs. Perspective distortion correction is not performed in a photographing scenario in which perspective distortion does not occur. In this way, an image signal is processed accurately, and power consumption is reduced.

Figure 3:
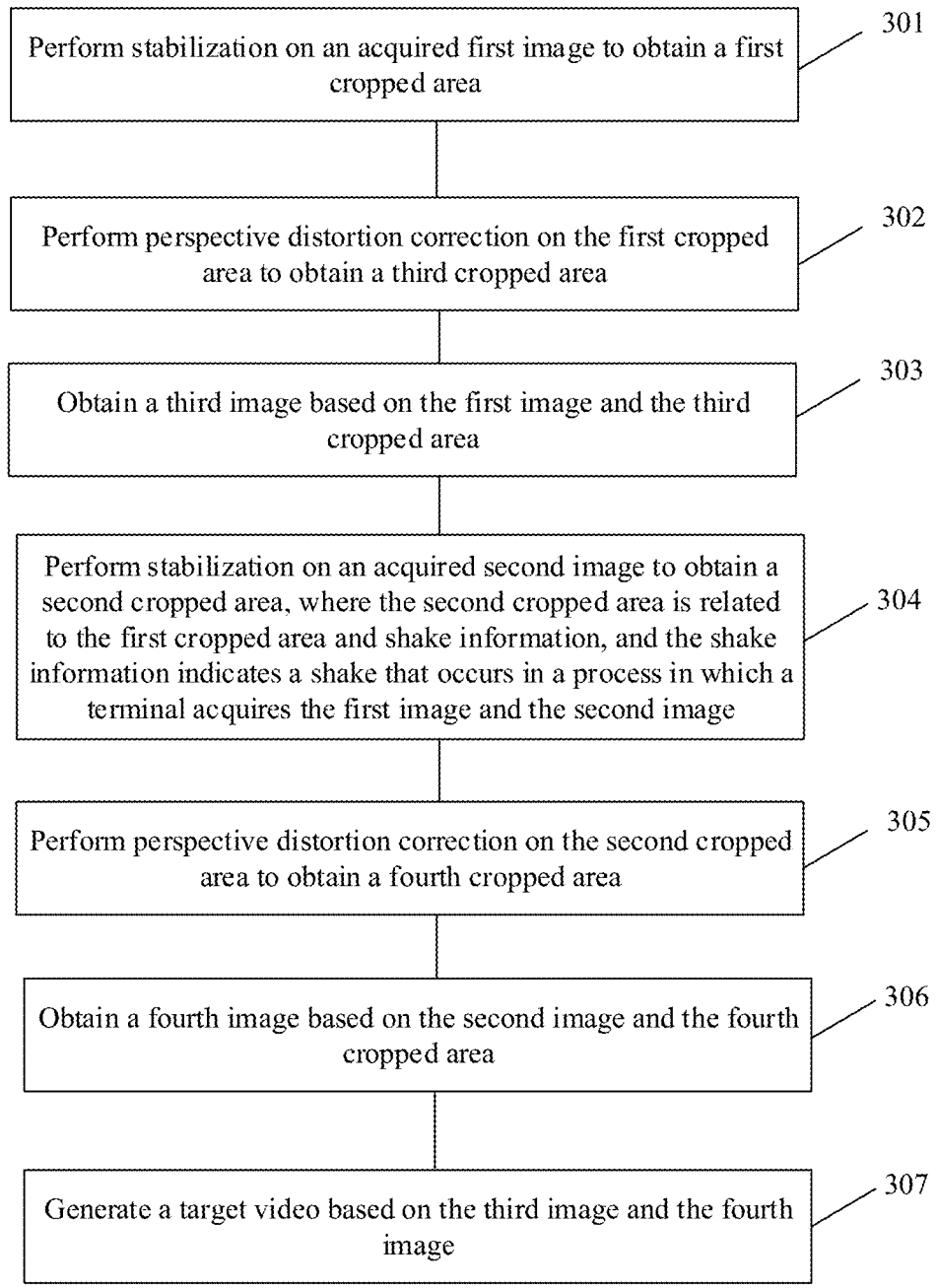
FIG. 3 is a schematic diagram of an embodiment of an image processing method according to an embodiment of this application.

In the foregoing manner, when the stabilization function is enabled and the perspective distortion correction function is enabled, the following operation 301 to operation 306 may be performed. FIG. 3 is a schematic diagram of an embodiment of an image processing method according to an embodiment of this application. As shown in FIG. 3, the image processing method provided in this application includes the following operations.

301: Perform stabilization on an acquired first image to obtain a first cropped area.

In this embodiment of this application, stabilization may be performed on the acquired first image to obtain a first cropped area. The first image is one original image frame of a video acquired by a camera on a terminal in real time. For a process of acquiring an original image by using the camera, refer to the descriptions in the foregoing embodiment. Details are not described herein again.

In an embodiment, the first image is the first original image frame of the video acquired by the camera on the terminal in real time, and the first cropped area is in a central area of the first image. For details, refer to the descriptions about how to perform stabilization on the $0^{th}$ frame in the foregoing embodiment. Details are not described herein again.

In an embodiment, the first image is an original image after the first original image frame of the video acquired by the camera on the terminal in real time, and the first cropped area is determined based on a shake that occurs in a process in which the terminal acquired the first image and an original image that is adjacent to and before the first image. For details, refer to the descriptions about how to perform stabilization on the $n^{th}$ (n is not equal to 0) frame in the foregoing embodiment. Details are not described herein again.

In an embodiment, optical distortion correction may be further performed on the first cropped area to obtain a corrected first cropped area.

302: Perform perspective distortion correction on the first cropped area to obtain a third cropped area.

In this embodiment of this application, after the first cropped area is obtained, perspective distortion correction may be performed on the first cropped area to obtain the third cropped area.

It should be understood that, the photographing scenario may be understood as an image acquired before the camera acquires the first image, or when the first image is the first image frame of a video acquired by the camera, the photographing scenario may be the first image or an image close to the first image in time domain. Whether there is a human face in the photographing scenario, a distance between the human face and the terminal is less than a preset value, and a proportion of pixels occupied by the human face in an image corresponding to the photographing scenario may be determined by using a neural network or in another manner. The preset value may range from 0 m to 10 m. For example, the preset value may be 1, 2, 3, 4, 5, 6, 7, 8, 9, or 10. This is not limited herein. The proportion of pixels may range from 30% to 100%. For example, the proportion of pixels may be 30%, 30%, 30%, 30%, 30%, 30%, 30% or 30%. This is not limited herein.

How to enable perspective distortion correction is described above. How to perform perspective distortion correction is described below.

Different from performing perspective distortion correction on all areas of an original image according to an existing embodiment, in this embodiment of this application, perspective distortion correction is performed on the first cropped area. As when a terminal device shakes, content misalignment usually occurs between two adjacent original image frames acquired by the camera, positions of cropped areas to be output after stabilization is performed on the two image frames are different in an original image, that is, distances between the cropped areas to be output after stabilization is performed on the two image frames and a center point of the original image are different. However, sizes of the cropped areas to be output after stabilization is performed on the two frames are the same. Therefore, if perspective distortion correction is performed on the cropped areas obtained through stabilization, degrees of perspective distortion correction performed on the adjacent frames are the same (because distances between each sub-area in each of the cropped areas output through stabilization on the two frames and a center point of the cropped area output through stabilization are the same). In addition, because the cropped areas output through stabilization on the two adjacent frames are images that include same or basically same content, and degrees of transformation of a same object in the images are the same, that is, inter-frame consistency is kept, an obvious jello phenomenon does not occur, thereby improving quality of a video output. It should be understood that, the inter-frame consistency herein may also be referred to as time-domain consistency, and indicates that processing results for areas with same content in adjacent frames are the same.

Therefore, in this embodiment of this application, perspective distortion correction is not performed on the first image, but perspective distortion correction is performed on the first cropped area obtained through stabilization, to obtain the third cropped area. Same processing is further performed for a frame (the second image) adjacent to the first image, that is, perspective distortion correction is performed on the second cropped area obtained through stabilization, to obtain the third cropped area. In this way, degrees of transformation correction of a same object in the third cropped area and the third cropped area are the same, so that inter-frame consistency is kept, and an obvious jello phenomenon does not occur, thereby improving quality of a video output.

In this embodiment of this application, a same target object (for example, a human object) may be included in cropped areas of a former frame and a latter frame. Because an object for perspective distortion correction is a cropped area obtained through stabilization, for the target object, a difference between degrees of transformation of the target object in the former frame and the latter frame due to perspective distortion correction is tiny. That the difference is tiny may be understood as that it is difficult to identify a shape difference from naked eyes of a human, or it is difficult to find a jello phenomenon between the former frame and the latter frame from naked eyes of a human.

Figure 22A:
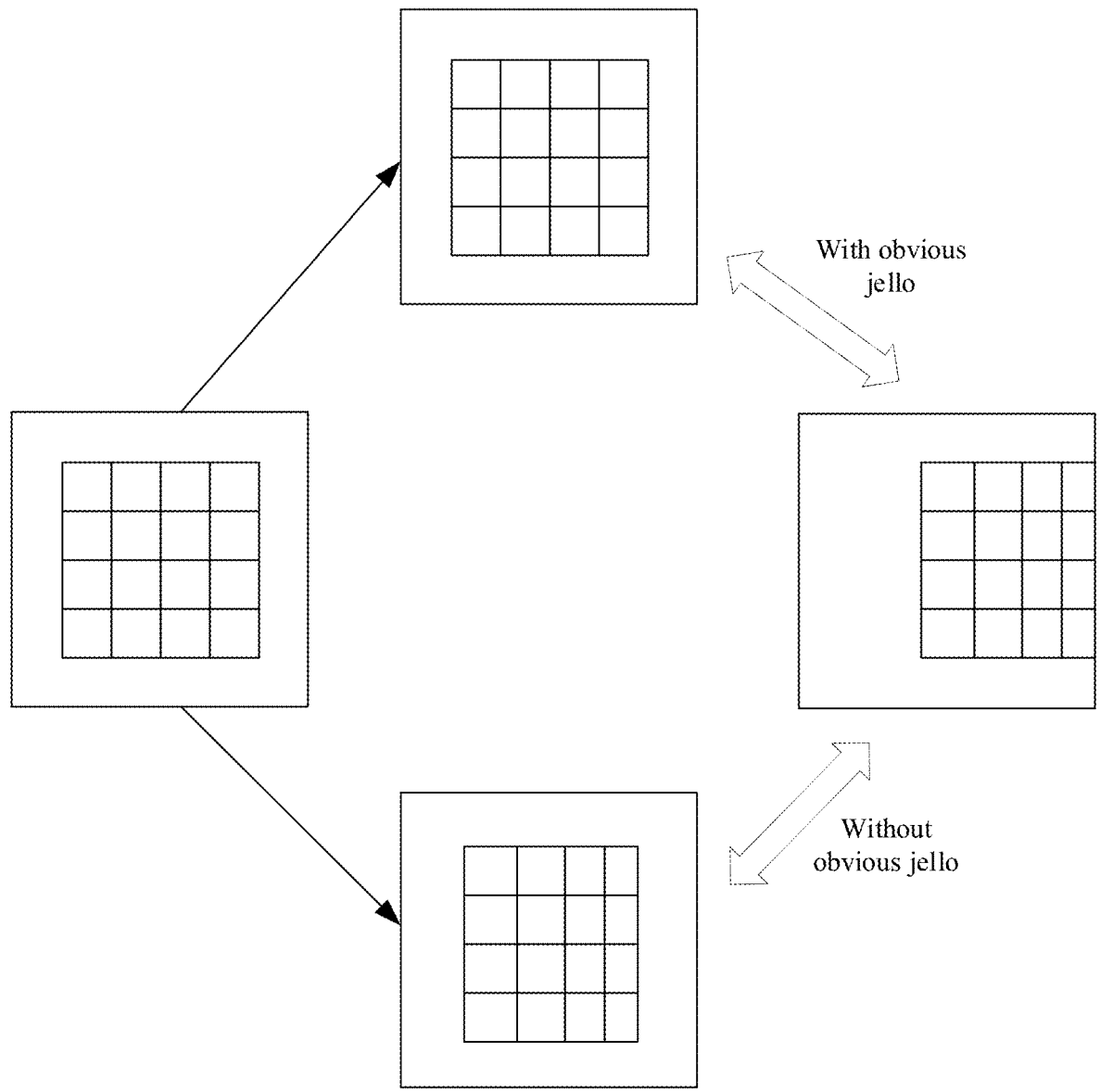
FIG. 22a is a schematic diagram of a jello phenomenon according to an embodiment of this application.

In an embodiment, refer to FIG. 22a. There is an obvious jello phenomenon in an output obtained after perspective distortion correction is performed on all areas of an original image, and there is no obvious jello phenomenon in an output obtained after perspective distortion correction is performed on a cropped area obtained through stabilization.

In an embodiment, optical distortion correction may be further performed on the third cropped area, to obtain a corrected third cropped area.

303: Obtain a third image based on the first image and the third cropped area.

In this embodiment of this application, the third cropped area may indicate an output of perspective distortion correction. In an embodiment, the third cropped area may indicate how to crop the first image and a shift of a pixel or position point, to obtain an image area that needs to be output.

In an embodiment, the third cropped area may indicate a pixel or position point in the first image that needs to be mapped or is selected after stabilization and perspective distortion correction are performed, and a shift, that is needed, of the pixel or position point, in the first image, that needs to be mapped or is selected.

In an embodiment, the third cropped area may include a mapping relationship between each pixel or position point in the output of perspective distortion correction and a pixel or position point in the first image. In this way, the third image may be obtained based on the first image and the third cropped area, and the third image may be displayed in a viewfinder frame in a photographing interface. It should be understood that the third image may be obtained based on the first image and the third cropped area through a warp operation, where the warp operation refers to affine transformation on an image.

304: Perform stabilization on an acquired second image to obtain a second cropped area, where the second cropped area is related to the first cropped area and shake information, and the shake information indicates a shake that occurs in a process in which the terminal acquires the first image and the second image.

The shake of the terminal indicated by the shake information may be a shake of the terminal that occurs within a time period from a moment T1 to a moment T2. T1 may be a moment at which the terminal acquires the first image, or a moment that has a specific deviation from a moment at which the terminal acquires the first image. T2 is a moment at which the terminal acquires the second image, or a moment that has a specific deviation from a moment at which the terminal acquires the second image.

In an embodiment, the shake of the terminal indicated by the shake information may be a shake of the terminal that occurs within a time period from a moment before the moment at which the terminal acquires the first image to the moment at which the terminal acquires the second image, may be a shake of the terminal that occurs within a time period from a moment after the moment at which the terminal acquires the first image (also before the moment at which the terminal acquires the second image) to the moment at which the terminal acquires the second image, may be a shake of the terminal that occurs within a time period from a moment after the moment at which the terminal acquires the first image (also before the moment at which the terminal acquires the second image) to a moment after the moment at which the terminal acquires the second image, may be a shake of the terminal that occurs within a time period from a moment after the moment at which the terminal acquires the first image to a moment before the moment at which the terminal acquires the second image, may be a shake of the terminal that occurs within a time period from the moment at which the terminal acquires the first image to a moment before the moment at which the terminal acquires the second image, or may be a shake of the terminal that occurs within a time period from the moment at which the terminal acquires the first image to a moment after the moment at which the terminal acquires the second image. In an embodiment, the moment before the moment at which the terminal acquires the first image may be a moment at which the terminal acquires an image before acquiring the first image, and the moment after the moment at which the terminal acquires the second image may be a moment at which the terminal acquires an image after acquiring the second image.

In an embodiment, a direction of an offset of a position of the second cropped area in the second image relative to a position of the first cropped area in the first image is opposite to a shake direction, on an image plane, of the shake that occurs in the process in which the terminal acquires the first image and the second image.

For more descriptions about operation 304, refer to the descriptions about how to perform stabilization on the acquired first image in the foregoing embodiment. Details are not described herein again.

It should be understood that there is no strict time sequence limitation between operation 304, operation 302, and operation 303. Operation 304 may be performed before operation 302 and after operation 301, operation 304 may be performed before operation 303 and after operation 302, or operation 304 may be performed after operation 303. This is not limited in this application.

305: Perform perspective distortion correction on the second cropped area to obtain a fourth cropped area.

In this embodiment of this application, distortion correction may be performed on the second cropped area to obtain a second mapping relationship. The second mapping relationship includes a mapping relationship between each position point in the fourth cropped area and a corresponding position point in the second cropped area; and the fourth cropped area is determined based on the second cropped area and the second mapping relationship.

In this embodiment of this application, a first mapping relationship may be determined based on the shake information and the second image. The first mapping relationship includes a mapping relationship between each position point in the second cropped area and a corresponding position point in the second image. Then the second cropped area may be determined based on the first mapping relationship and the second image. Distortion correction is performed on the second cropped area to obtain the second mapping relationship. The second mapping relationship includes a mapping relationship between each position point in the fourth cropped area and a corresponding position point in the second cropped area; and the fourth cropped area is determined based on the second cropped area and the second mapping relationship.

In an embodiment, the first mapping relationship may be further coupled to the second mapping relationship, to determine a target mapping relationship. The target mapping relationship includes a mapping relationship between each position point in the fourth cropped area and a corresponding position point in the second image; and the fourth image is determined based on the target mapping relationship and the second image. That is, index tables for the first mapping relationship and the second mapping relationship are coupled. By coupling the index tables, there is no need to perform a warp operation after the cropped area is obtained through stabilization and perform a warp operation again after perspective distortion correction, but only one warp operation needs to be performed after an output is obtained based on the coupled index tables after perspective distortion correction, thereby reducing overheads of a warp operation.

The first mapping relationship may be referred to as a stabilization index table, and the second mapping relationship may be referred to as a perspective distortion correction index table. Detailed descriptions are provided below in detail. How to determine a correction index table (or referred to as the second mapping relationship) for perspective distortion correction is first described below. A mapping relationship between the second cropped area and the fourth cropped area output through stabilization may be as follows:

$$x = x0(1 + K_{01} * r_x^2 + K_{02} * r_x^4)$$

$$y = y0(1 + K_{11} * r_y^2 + K_{12} * r_y^4)$$

In the formula, (x0, y0) are normalized coordinates of a pixel or position point in the second cropped area output through stabilization, and a relationship between (x0, y0) and pixel coordinates (xi, yi), an image width W, and an image height H may be as follows:

$$x0 = (xi - 0.5 \times W)/W; \text{ and}$$

$$y0 = (yi - 0.5 \times H)/H$$

In the formula, (x, y) are normalized coordinates of a corresponding position point or pixel in the fourth cropped area, and (x, y) needs to be converted into target pixel coordinates (xo, yo) according to the following formula:

$$xo = x \times W + 0.5 \times W; \text{ and}$$

$$yo = y \times H + 0.5 \times H$$

In the formula, K01, K02, K11, and K12 are relational parameters that have specific values determined by a field of view of a distorted image. $r_x$ is a distortion distance of (x0, y0) in a direction of x, and $r_y$ is a distortion distance of (x0, y0) in a direction of y. The two distances may be determined by using the following relational expression:

$$r_x = \sqrt{(\alpha_x * x0^2 + \alpha_y * y0^2)}$$

$$r_y = \sqrt{(\beta_x * x0^2 + \beta_y * y0^2)}$$

In the formula, $\alpha_x = 1$, and $\alpha_y$, $\beta_x$, and $\beta_y$ are relational coefficients that each have a value ranging from 0.0 to 1.0. When the values of αx, αy, βx, and βy are 1.0, 1.0, 1.0, and 1.0, $r_x = r_y$, and is a distance from the pixel (x0, y0) to a center of an image. When the values are 1.0, 0.0, 0.0, and 1.0, $r_x$ is a distance from the pixel (x0, y0) to a central axis of the image in the direction of x, and $r_y$ is a distance from the pixel (x0, y0) to a central axis of the image in the direction of y. A coefficient may be adjusted based on an effect of perspective distortion correction and a bending degree of a background straight line, to achieve a correction effect with a balance between the effect of perspective distortion correction and the bending degree of the background straight line. How to Perform Stabilization and Perspective Distortion Correction on the First Image Based on an Index Table (the First Mapping Relationship and the Second Mapping Relationship) is Described Below.

Figure 22B:
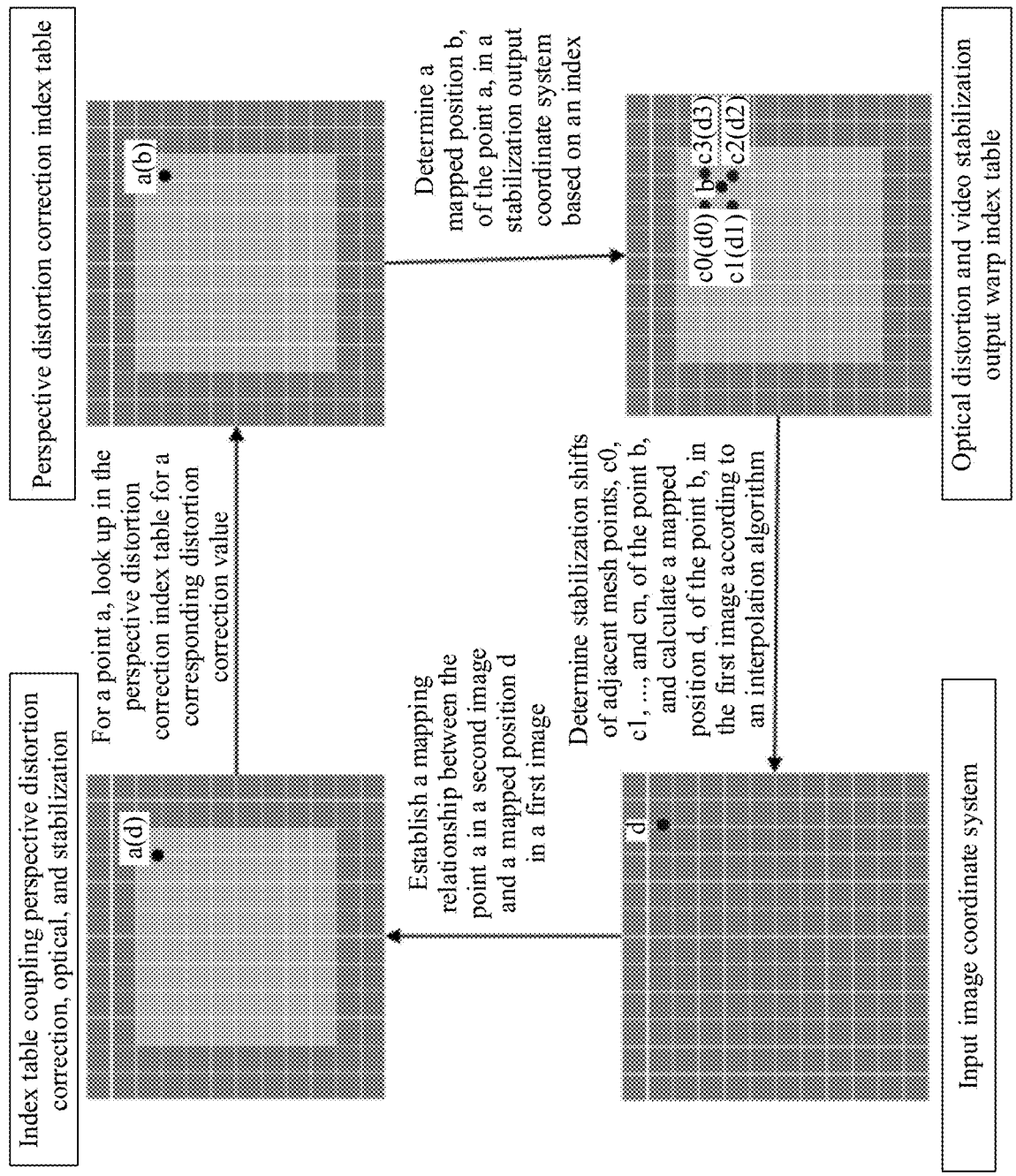
FIG. 22b is a schematic diagram of creating an index table according to an embodiment of this application.

In an embodiment, an optical distortion correction index table T1 may be determined based on a related parameter of an imaging module of the camera, and the optical distortion correction index table T1 includes a point, in the first image, mapped from a position in an image obtained through optical distortion correction. A granularity of the optical distortion correction index table T1 may be a pixel or a position point. Then, a stabilization index table T2 may be generated, and the stabilization index table T2 includes a point, in the first image, mapped from a position in an image obtained through shake compensation. Then, an optical distortion and stabilization index table T3 may be generated, and the optical and stabilization index table T3 may include a point, in the first image, mapped from a position in an image obtained through optical distortion correction and shake compensation (it should be understood that optical distortion correction mentioned above is optional, that is, optical distortion correction may not be performed, and stabilization may be directly performed on the first image, to obtain the stabilization index table T2). Then, a perspective distortion correction index table T4 is determined based on information about an image output through stabilization (including a position of the image obtained through optical distortion correction and shake compensation), and the perspective distortion correction index table T4 may include a point mapped from the fourth cropped area to the second cropped area output through stabilization. Based on T3 and T4, a coupling index table T5 may be generated in a coordinate system switching table look-up manner. Refer to FIG. 22b. In an embodiment, starting from the fourth cropped area, the tables may be reversely looked up twice to establish a mapping relationship between the fourth cropped area and the first image. A position point a in the fourth cropped area is used as an example. For the position point a in the fourth cropped area currently looked up, a mapped position b of the point a in a stabilization output coordinate system may be determined based on an index according to the perspective distortion correction index table T4. Further, in the optical distortion and stabilization output index table T3, optical distortion correction and stabilization correction shifts delta1, delta2, . . . , and deltan of adjacent mesh points, c0, c1, . . . , and cn, of the point b may be obtained based on a mapping relationship between the adjacent mesh points and coordinates d0, d1, . . . , and dn in the first image. Finally, after an optical and stabilization correction shift of the point b is calculated based on delta1, delta2, . . . , and deltan according to an interpolation algorithm, a mapped position d, of the point b, in the first image is obtained, so that a mapping relationship between the position point a in the fourth cropped area and the mapped position d in the first image is established. For each position point in the fourth cropped area, the coupling index table T5 may be obtained by performing the foregoing procedure.

Then, an image warp interpolation algorithm may be performed based on the coupling index table T5 and the second image, to output the fourth image.

Figure 22C:
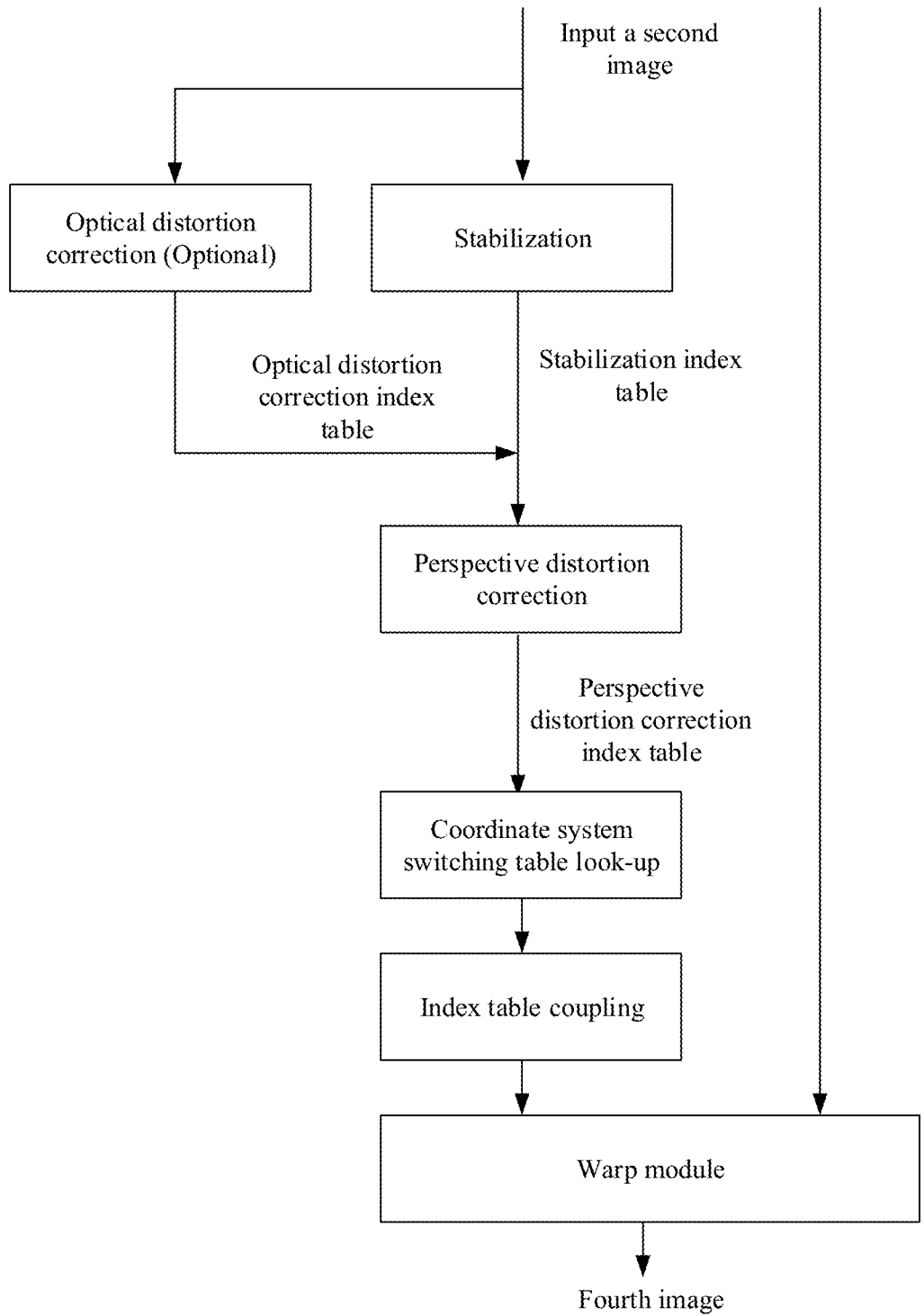
FIG. 22c is a schematic diagram of creating an index table according to an embodiment of this application.
Figure 22D:
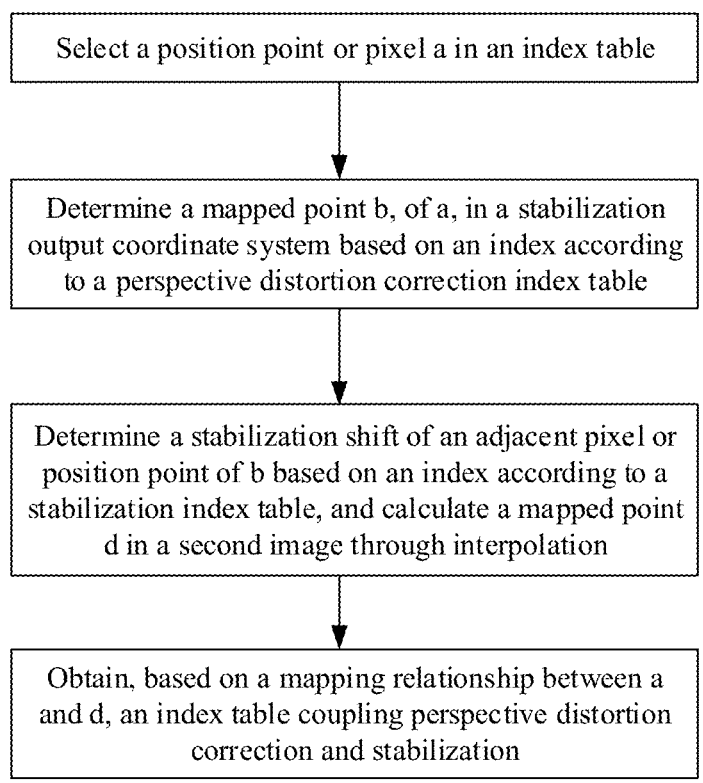
FIG. 22d is a schematic diagram of creating an index table according to an embodiment of this application.
Figure 22E:
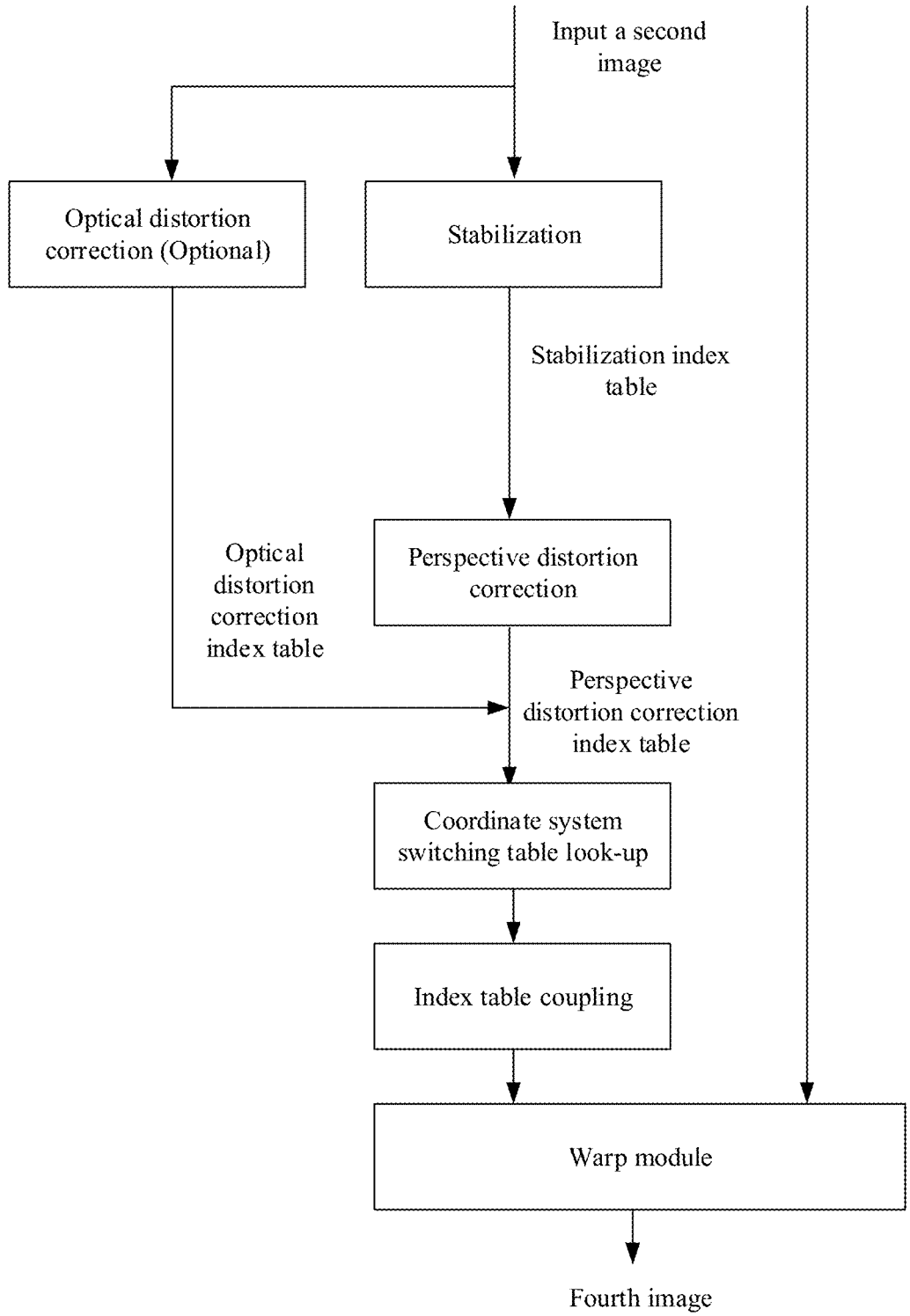
FIG. 22e is a schematic diagram of creating an index table according to an embodiment of this application.
Figure 22F:
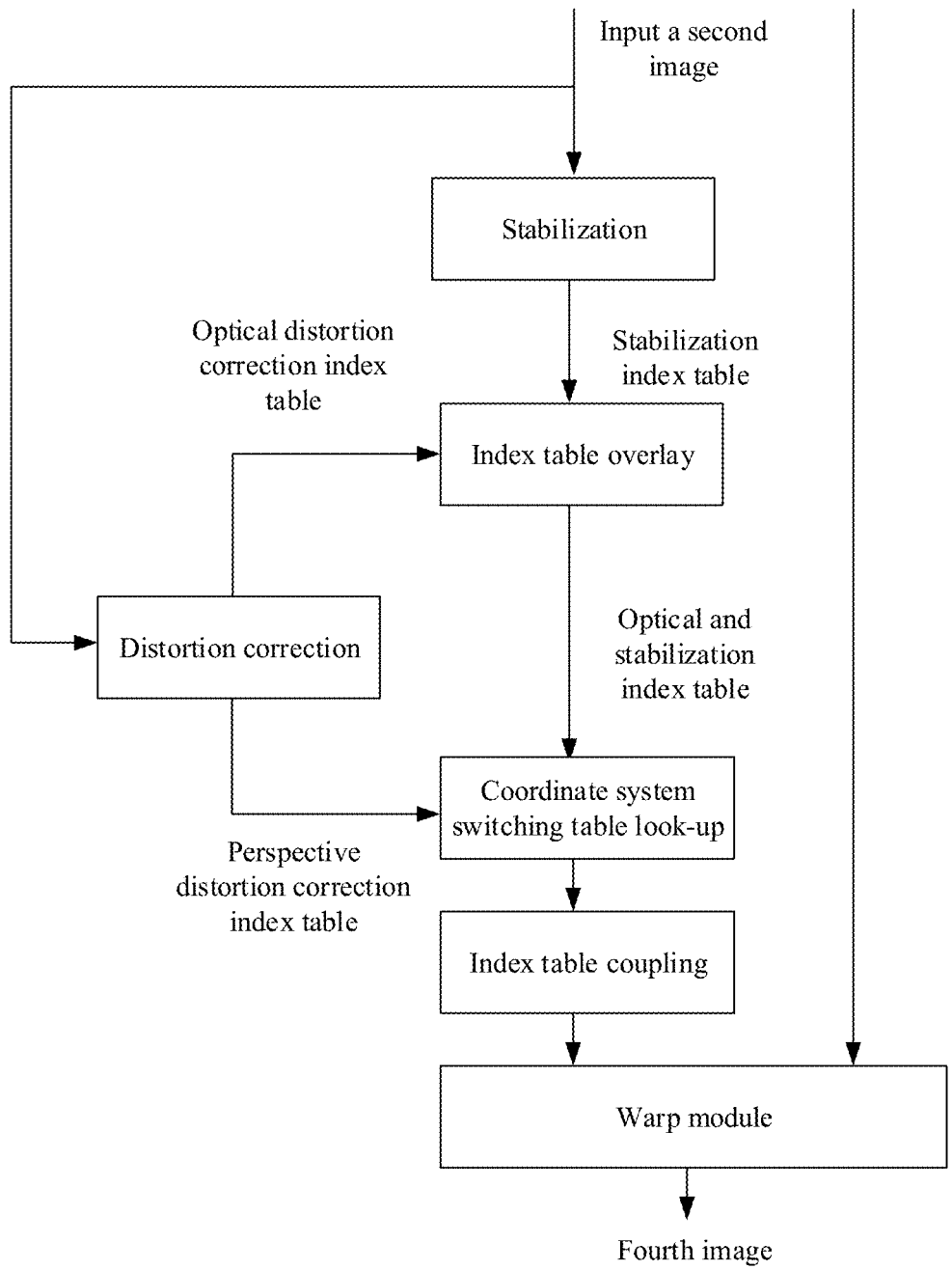
FIG. 22f is a schematic diagram of creating an index table according to an embodiment of this application.
Figure 23A:
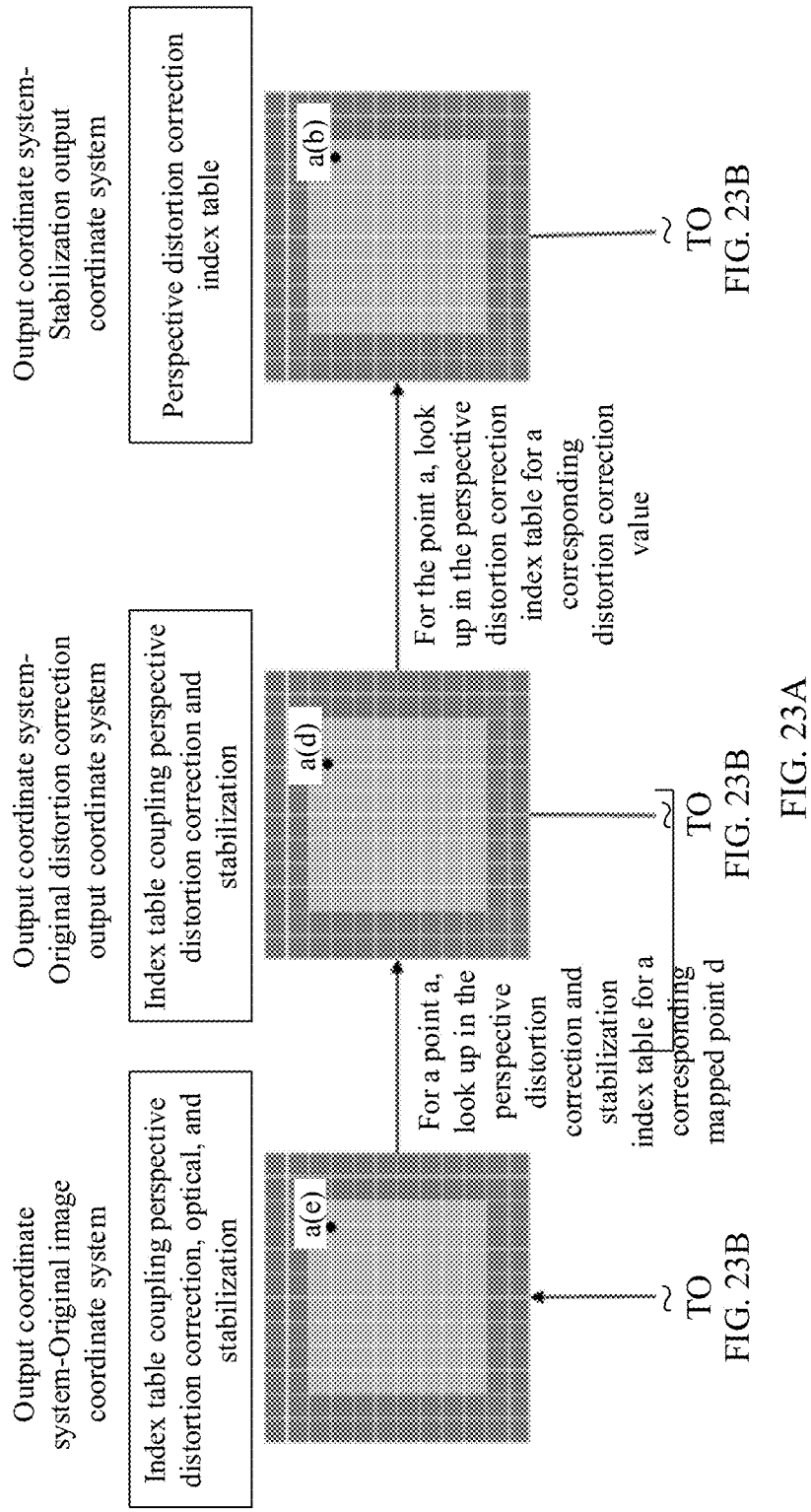
FIG. 23A and FIG. 23B are schematic diagrams of creating an index table according to an embodiment of this application.
Figure 23B:
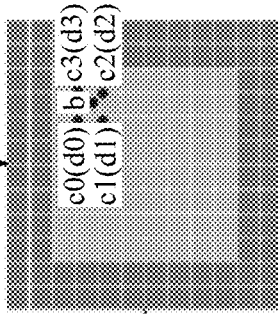
Figure 23B:
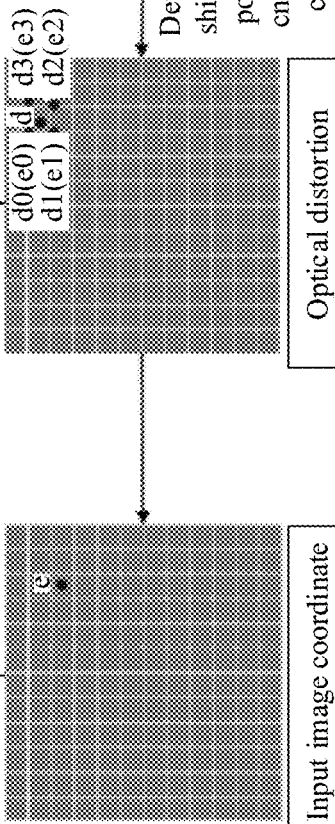

For example, the second image is processed. For a specific flowchart, refer to FIG. 22c, FIG. 22e, and FIG. 22f. FIG. 22c describes how to create an index table and a process of warping based on the second image and the index table T5 coupling stabilization, perspective distortion, and optical distortion. FIG. 22e, FIG. 22f, and FIG. 22c are different in that the stabilization index table and the optical distortion correction index table are coupled in FIG. 22c, the perspective distortion correction index table and the optical distortion correction index table are coupled in FIG. 22e, and all distortion correction processes (including optical distortion correction and perspective distortion correction) are coupled by using a distortion correction module at a video stabilization back end in FIG. 22f. FIG. 22d shows a coordinate system switching table look-up process. It should be understood that, in an embodiment, the perspective distortion correction index table and the stabilization index table may be first coupled, and the optical distortion correction index table is then coupled. A specific procedure is as follows: Based on the stabilization index table T2 and a perspective distortion correction index table T3, an index table T4 coupling stabilization and perspective distortion is generated in the coordinate system switching table look-up manner. Then, starting from output coordinates of perspective distortion correction, the tables are reversely looked up twice to establish a mapping relationship between the output coordinates of perspective distortion correction and input coordinates of stabilization. In an embodiment, refer to FIG. 23A and FIG. 23B, for a point a currently looked up in the perspective distortion correction index table T3, a mapped position b of the point a in a stabilization output (perspective correction input) coordinate system may be determined based on an index. In the stabilization index table T2, stabilization correction shifts delta1', delta2', . . . , and deltan' of adjacent mesh points, c0, c1, . . . , and cn, of the point b may be obtained based on a mapping relationship between the adjacent mesh points and stabilization input coordinates d0, d1, . . . , and dn. After a stabilization correction shift of the point b is calculated according to the interpolation algorithm, a mapped position d, of the point b, in a stabilization input coordinate system is obtained, so that a mapping relationship between the perspective distortion correction output point a and the stabilization input coordinate point d is established. For each point in the perspective distortion correction index table T3, the foregoing procedure is performed to obtain the index table T4 coupling perspective distortion correction and stabilization.

Then, based on T1 and T4, the index table T5 coupling stabilization, perspective distortion, and optical distortion may be generated still in the coordinate system switching table look-up manner. Starting from the fourth cropped area, the tables are reversely looked up twice to establish a coordinate mapping relationship between the fourth cropped area and the second image. In an embodiment, for a position point a currently looked up in the fourth cropped area, a mapped position d, of the position point a, in the stabilization input (optical distortion correction output) coordinate system may be determined based on an index according to the index table T4 coupling perspective distortion correction and stabilization. Further, in the optical distortion correction index table T1, optical distortion correction shifts delta1", delta2", . . . , and deltan" of adjacent mesh points, d0, d1, . . . , and dn, of the point d may be obtained based on a mapping relationship between the adjacent mesh points and original image coordinates e0, e1, . . . , and en. After an optical distortion correction shift of the point d is calculated according to the interpolation algorithm, a mapped position e, of the point d, in a coordinate system of the second image is obtained, so that a mapping relationship between the position point a and the mapped position e in the second image is established. For each position point in the fourth cropped area, the index table T5 coupling stabilization, perspective distortion, and optical distortion may be obtained by performing the foregoing procedure.

Compared with coupling the optical distortion correction index table and the perspective distortion correction index table by using the distortion correction module, because optical distortion is an important cause of a jello phenomenon, and effectiveness of optical distortion correction and perspective distortion correction is controlled at the video stabilization back end, this embodiment can resolve a problem that when a video stabilization module disables optical distortion correction, a perspective distortion correction module cannot control the jello phenomenon.

In an embodiment, to strictly keep inter-frame consistency between a former frame and a latter frame, correction index tables (or referred to as the second mapping relationship) used for perspective distortion correction on the former frame and the latter frame may be the same, so that inter-frame consistency between the former frame and the latter frame can be strictly kept.

For more descriptions about operation 305, refer to the descriptions about how to perform perspective distortion correction on the first cropped area in the foregoing embodiment. Similarities are not described herein again.

306: Obtain the fourth image based on the second image and the fourth cropped area.

In an embodiment, a first mapping relationship and a second mapping relationship may be obtained, where the first mapping relationship indicates a mapping relationship between each position point in the second cropped area and a corresponding position point in the second image, and the second mapping relationship indicates a mapping relationship between each position point in the fourth cropped area and a corresponding position point in the second cropped area; and the fourth image is obtained based on the second image, the first mapping relationship, and the second mapping relationship.

For more descriptions about operation 306, refer to the descriptions about obtaining the third image based on the first image and the third cropped area in the foregoing embodiment. Details are not described herein again.

307: Generate a target video based on the third image and the fourth image.

In an embodiment, the target video may be generated based on the third image and the fourth image, and the target video is displayed. In an embodiment, for any two image frames of a video stream acquired by a terminal device in real time, an output image on which stabilization and perspective distortion correction has been performed may be obtained according to the foregoing operation 301 to operation 306, and then a video (that is, the target video) on which stabilization and perspective distortion correction has been performed may be obtained. For example, the first image may be an $n^{th}$ frame of the video stream, and the second image may be an $(n+1)^{th}$ frame. In this case, an $(n-2)^{th}$ frame and an $(n-1)^{th}$ frame may be further used as the first image and the second image respectively for processing in operation 301 to operation 306, the $(n-1)^{th}$ frame and the $n^{th}$ frame may be further used as the first image and the second image respectively for processing in operation 301 to operation 306, and the $(n+1)^{th}$ frame and the $(n+2)^{th}$ frame may be further used as the first image and the second image respectively for processing in operation 301 to operation 306. The rest may be deduced from the descriptions above, and more details and examples are not described herein.

In an embodiment, after the target video is obtained, the target video may be displayed in the viewfinder frame in the photographing interface on the camera.

It should be understood that the photographing interface may be a preview interface in a photographing mode, and the target video is a preview picture in the photographing mode. A user may trigger a shutter of the camera by clicking a photographing control in the photographing interface or in another manner of triggering, to obtain a photographed image.

It should be understood that the photographing interface may be a preview interface before video recording is started in a video recording mode, and the target video is a preview picture before video recording is started in the video recording mode. A user may trigger the camera to start recording by clicking a photographing control in the photographing interface or in another manner of triggering.

It should be understood that the photographing interface may be a preview interface after video recording is started in a video recording mode, and the target video is a preview picture after video recording is started in the video recording mode. A user may trigger the camera to stop recording by clicking a photographing control in the photographing interface or in another manner of triggering, and save a video photographed during recording.

This application provides an image display method, used by a terminal to acquire a video stream in real time and including: performing stabilization on an acquired first image to obtain a first cropped area; performing perspective distortion correction on the first cropped area to obtain a third cropped area; obtaining a third image based on the first image and the third cropped area; performing stabilization on an acquired second image to obtain a second cropped area, where the second cropped area is related to the first cropped area and shake information, and the shake information indicates a shake that occurs in a process in which the terminal acquires the first image and the second image; performing perspective distortion correction on the second cropped area to obtain a fourth cropped area; and obtaining a fourth image based on the second image and the fourth cropped area, where the third image and the fourth image are used for generating a target video, and the first image and the second image are a pair of original images that are acquired by the terminal and that are adjacent to each other in time domain. In addition, because outputs of stabilization on two adjacent frames are images that include same or basically same content, and degrees of transformation of a same object in the images are the same, that is, inter-frame consistency is kept, an obvious jello (Jello) phenomenon does not occur, thereby improving quality of video display.

An image processing method provided in an embodiment of this application is described below with reference to interaction with a terminal side.

Figure 5A:
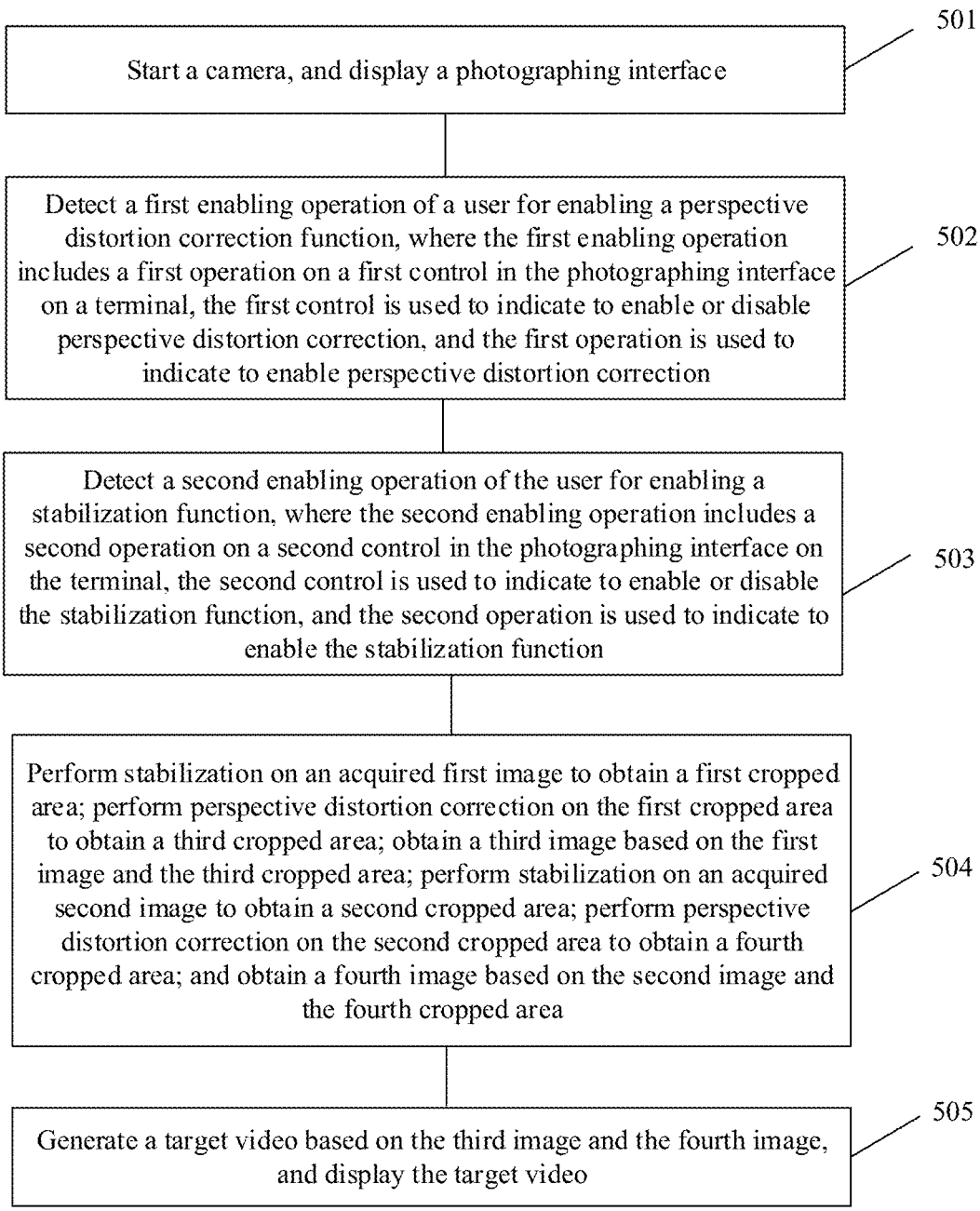
FIG. 5a is a schematic diagram of an embodiment of an image processing method according to an embodiment of this application.
Figure 5B:
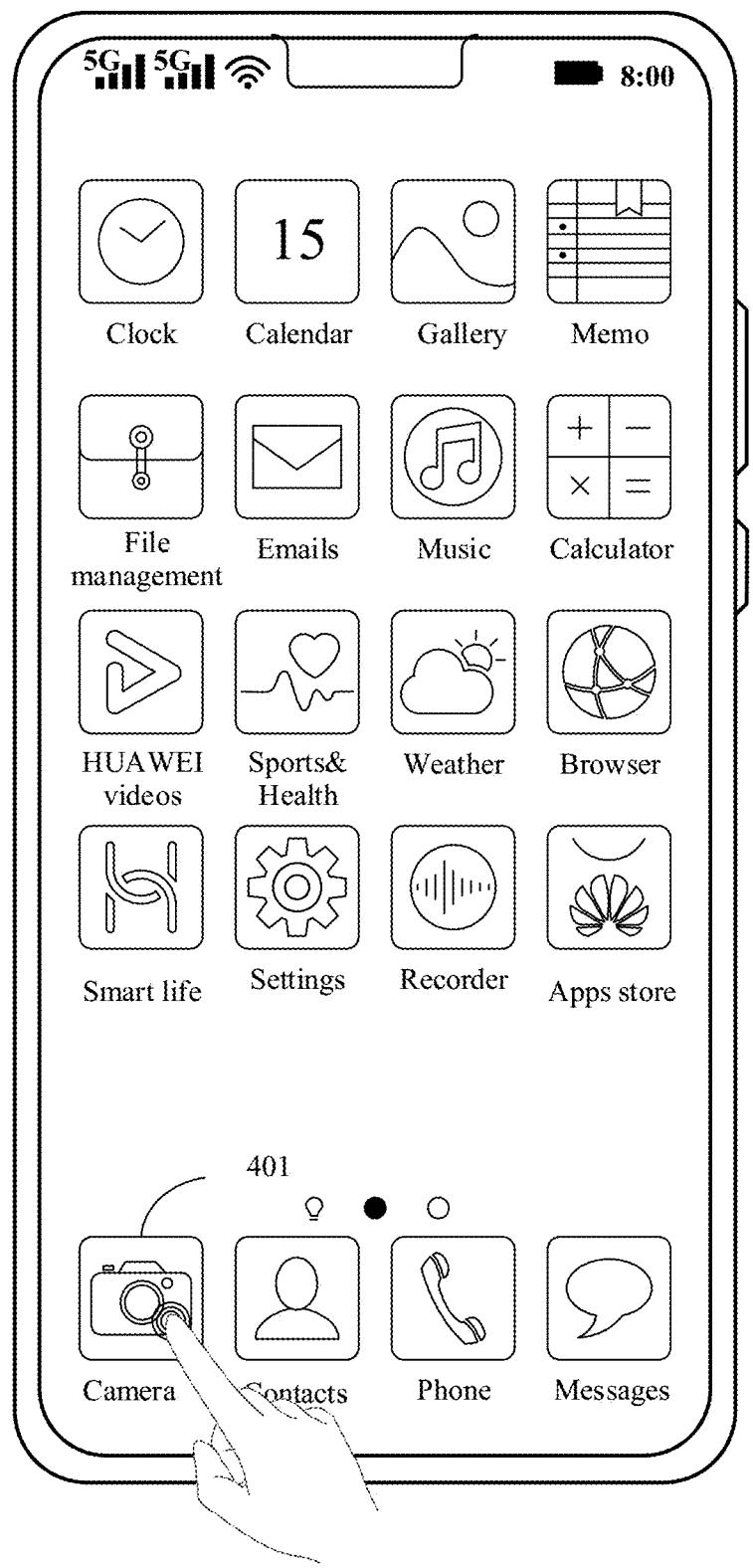
FIG. 5b is a schematic diagram of an interface on a terminal according to an embodiment of this application.

Refer to FIG. 5a. FIG. 5a is a schematic flowchart of an image processing method according to an embodiment of this application. As shown in FIG. 5a, the image processing method provided in this embodiment of this application includes the following operations.

501: Start a camera, and display a photographing interface.

This embodiment of this application may be applied to a photographing scenario using a terminal. Photographing may include image photographing and video recording. In an embodiment, a user may start an application (that may also be referred to as a camera application in this application) related to photographing on the terminal, and the terminal may display a photographing interface for photographing.

In this embodiment of this application, the photographing interface may be a preview interface in a photographing mode, a preview interface before video recording is started in a video recording mode, or a preview interface after video recording is started in a video recording mode.

A Process in which the Terminal Starts the Camera Application and Opens the Photographing Interface is First Described with Reference to Interaction Between the Terminal and a User.

For example, the user may indicate the terminal to start the camera application by touching a specific control on a screen of a mobile phone, pressing a specific physical button or a set of buttons, inputting speech, making a gesture without a touch, or in another manner. The terminal may start the camera in response to receiving an indication of the user to start the camera, and displays the photographing interface.

Figure 6:
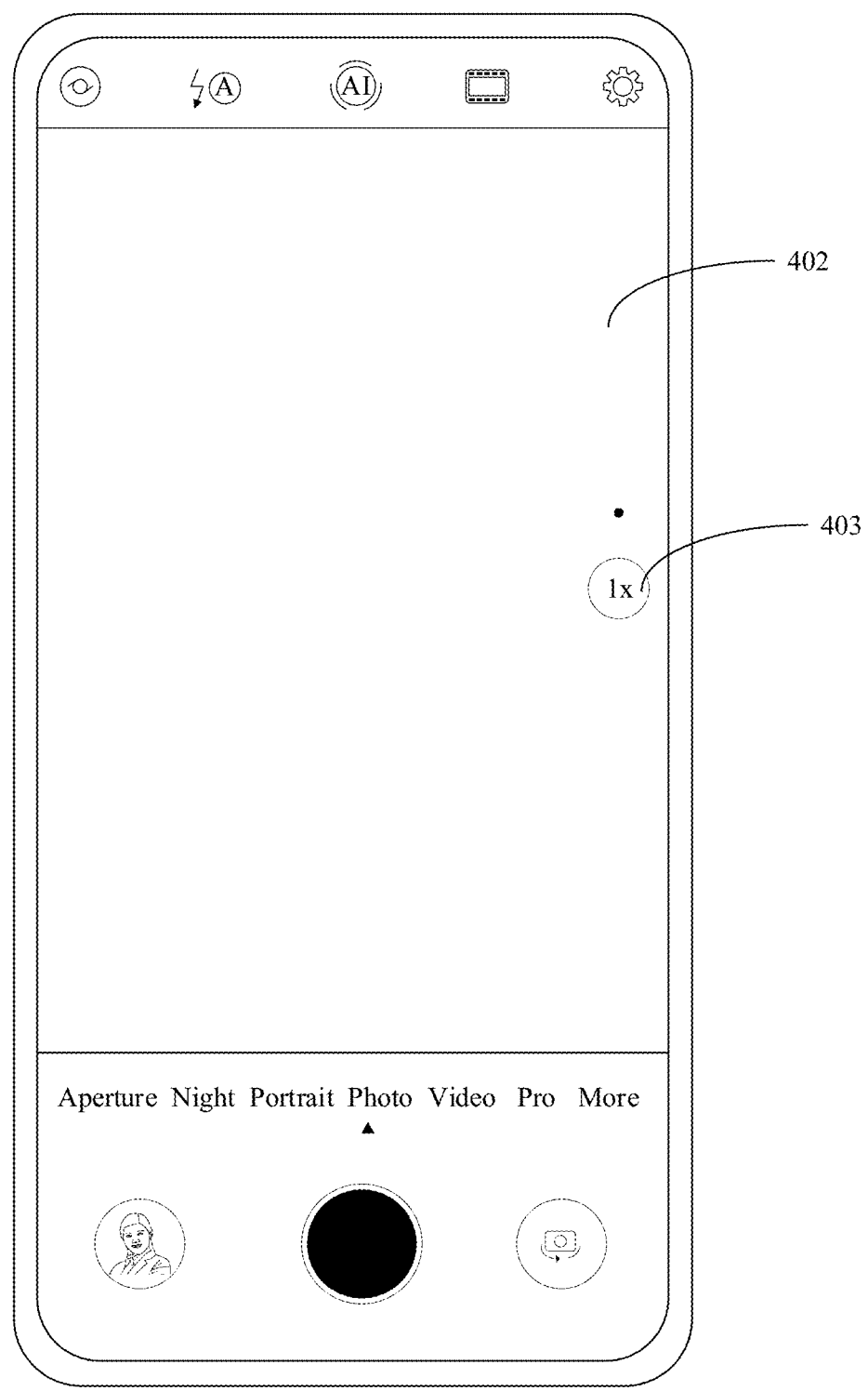
FIG. 6 is a schematic diagram of an interface on a terminal according to an embodiment of this application.

For example, as shown in FIG. 5a, the user may click an application icon 401 "Camera" on a home screen of the mobile phone, to indicate the mobile phone to start the camera application, and the mobile phone displays a photographing interface as shown in FIG. 6.

For another example, when the mobile phone is in a lock screen state, the user may indicate, by using a gesture of swiping right on the screen of the mobile phone, the mobile phone to start the camera application, and the mobile phone may further display the photographing interface as shown in FIG. 6.

Alternatively, when the mobile phone is in the lock screen state, the user may click a shortcut icon of the application "Camera" in a lock screen interface, to indicate the mobile phone to start the camera application, and the mobile phone may further display the photographing interface as shown in FIG. 6.

For another example, when another application is running on the mobile phone, the user may click a corresponding control to enable the mobile phone to start the camera application for photographing. For example, when the user is using an instant messaging application (for example, the application WeChat), the user may alternatively indicate, by selecting a control of a camera function, the mobile phone to start the camera application for photographing and video recording.

As shown in FIG. 6, a viewfinder frame 402, a photographing control, and another function control ("Wide Aperture", "Portrait", "Photo", "Video", or the like) are generally included in the photographing interface on the camera. The viewfinder frame may be used to display a preview picture generated based on a video acquired by the camera. The user may determine, based on the preview picture in the viewfinder frame, time to indicate the terminal to perform a photographing operation. The photographing operation performed as the user indicates the terminal to perform may be, for example, an operation of the user of clicking a photographing control, or an operation of the user of pressing a volume button.

In an embodiment, the user may trigger, through an operation of clicking the control "Photo", the camera to enter an image photographing mode. When the camera is in the image photographing mode, the viewfinder frame in the photographing interface may be used to display the preview picture generated based on the video acquired by the camera. The user may determine, based on the preview picture in the viewfinder frame, the time to indicate the terminal to perform the photographing operation, and the user may click a photographing button to obtain an image.

In an embodiment, the user may trigger, through an operation of clicking the control "Video", the camera to enter a video recording mode. When the camera is in the video recording mode, the viewfinder frame in the photographing interface may be used to display the preview picture generated based on the video acquired by the camera. The user may determine, based on the preview picture in the viewfinder frame, time to indicate the terminal to perform video recording, and the user may click a photographing button to start video recording. In this case, a preview picture during video recording may be displayed in the viewfinder frame, and then the user may click the photographing button to stop video recording.

In this embodiment of this application, a third image and a fourth image may be displayed in the preview picture in the image photographing mode, in a preview picture before video recording is started in the video recording mode, or in a preview picture after video recording is started in the video recording mode.

In some embodiments, a zoom ratio indication 403 may be further included in the photographing interface. The user may adjust a zoom ratio of the terminal based on the zoom ratio indication 403. The zoom ratio of the terminal may be described as a zoom ratio of a preview picture in the viewfinder frame in the photographing interface.

It should be understood that the user may alternatively adjust the zoom ratio of the preview picture in the viewfinder frame in the photographing interface through other interaction (for example, based on a volume button on the terminal). This is not limited in this application.

The Zoom Ratio of the Terminal is Described Below in Detail.

If a plurality of cameras are integrated on the terminal, each of the cameras has a fixed zoom ratio. The fixed zoom ratio of the camera may be understood as that a focal length of the camera is equivalent to a demagnifying/magnifying multiple of a reference focal length. The reference focal length is usually a focal length of a main camera on the terminal.

In some embodiments, the user adjusts a zoom ratio of a preview picture in the viewfinder frame in the photographing interface, so that the terminal may perform digital zoom (digital zoom) on an image captured by the camera. To be specific, an ISP or another processor of the terminal is used to enlarge an area occupied by each pixel of an image captured by the camera with a fixed zoom ratio and correspondingly narrow a viewfinder coverage of the image, so that a processed image is equivalent to an image photographed by the camera using another zoom ratio. In this application, the zoom ratio of the terminal may be understood as a zoom ratio of the image presented in the processed image.

An image photographed by each of the cameras may correspond to a zoom ratio range. Different types of cameras are described below.

In an embodiment, one or more of a front-facing short-focus (wide-angle) camera, a rear-facing short-focus (wide-angle) camera, a rear-facing medium-focus camera, and a rear-facing long-focus camera may be integrated on the terminal.

An example in which a short-focus (wide-angle) camera (including a front-facing wide-angle camera and a rear-facing wide-angle camera), a rear-facing medium-focus camera, and a rear-facing long-focus camera are integrated on the terminal is used for description. When a position of the terminal relative to a position of an object to be photographed remains unchanged, the short-focus (wide-angle) camera has a smallest focal length and a largest field of view, and an object in an image photographed by the camera has a smallest size. The medium-focus camera has a greater focal length than the short-focus (wide-angle) camera, a smaller field of view than the short-focus (wide-angle) camera, and an object in an image photographed by the medium-focus camera has a larger size than an object in an image photographed by the short-focus (wide-angle) camera. The long-focus camera has a largest focal length and a smallest field of view, and an object in an image photographed by the camera has a largest size.

The field of view indicates a maximum range of angle that can be photographed through the camera during image photographing of a mobile phone. That is, if an object to be photographed is within the range of angle, the object to be photographed can be acquired by the mobile phone. If an object to be photographed is outside the range of angle, the object to be photographed cannot be acquired by the mobile phone. Usually, a larger field of view of a camera indicates a larger range that can be photographed through the camera. A smaller field of view of a camera indicates a smaller range that can be photographed through the camera. It can be understood that the "field of view" may alternatively be another word, for example, a "field range", "view range", "field of vision", "imaging range", or "imaging field".

Usually, the user uses the medium-focus camera in most scenarios. Therefore, the medium-focus camera is usually set as a main camera. A focal length of the main camera is set to the reference focal length, and a fixed zoom ratio of the main camera is usually 1 x. In some embodiments, digital zoom may be performed on an image captured by the main camera. To be specific, the ISP or the another processor of the mobile phone is used to enlarge an area occupied by each pixel of a "1 x" image captured by the main camera, and correspondingly narrow a viewfinder coverage of the image, so that a processed image is equivalent to an image photographed by the main camera using another zoom ratio (for example, "2×"). In other words, an image photographed by the main camera may correspond to a zoom ratio range, for example, "1×" to "5×". It should be understood that, when a rear-facing long-focus camera is further integrated on the terminal, the zoom ratio range corresponding to the image photographed by the main camera may be 1 to b, and a maximum zoom ratio b within the zoom ratio range may be a fixed zoom ratio of the rear-facing long-focus camera. A value of b may range from 3 to 15. For example, b may be, but not limited to, 3, 4, 5, 6, 7, 8, 9, 10, 11, 12, 13, 14, or 15.

It should be understood that, when no rear-facing long-focus camera is integrated on the terminal, a maximum zoom ratio b within the zoom ratio range corresponding to the image photographed by the main camera may be a maximum zoom of the terminal, and a value of b may range from 3 to 15. For example, b may be, but not limited to, 3, 4, 5, 6, 7, 8, 9, 10, 11, 12, 13, 14, or 15.

It should be understood that the zoom ratio range (from 1 to b) corresponding to the image photographed by the main camera may include the zoom ratios at two ends (1 and b), may not include the zoom ratios at two ends (1 and b), or may include one of the zoom ratios at two ends.

For example, the zoom ratio range corresponding to the image photographed by the main camera may be an interval [1, b].

For example, the zoom ratio range corresponding to the image photographed by the main camera may be an interval (1, b].

For example, the zoom ratio range corresponding to the image photographed by the main camera may be an interval [1, b).

For example, the zoom ratio range corresponding to the image photographed by the main camera may be an interval (1, b).

Similarly, how many times the focal length of the long-focus camera greater than the focal length of the main camera may be used as a zoom ratio of the long-focus camera, also referred to as a fixed zoom ratio of the long-focus camera. For example, the focal length of the long-focus camera may be 5 times the focal length of the main camera, that is, the fixed zoom ratio of the long-focus camera is "5×". Similarly, digital zoom may be further performed on an image captured by the long-focus camera. That is, an image photographed by the long-focus camera may correspond to a zoom ratio range, for example, "5×" to "50×". It should be understood that the zoom ratio range corresponding to the image photographed by the long-focus camera may range from b to c, and a maximum zoom ratio c within the zoom ratio range corresponding to the image photographed by the long-focus camera may range from 3 to 50.

Similarly, how many times the focal length of the short-focus (wide-angle) camera smaller than the focal length of the main camera may be used as a zoom ratio of the short-focus (wide-angle) camera. For example, the focal length of the short-focus camera may be 0.5 times the focal length of the main camera, that is, the zoom ratio of the short-focus camera is "0.5×". Similarly, digital zoom may be further performed on an image captured by the short-focus (wide-angle) camera. That is, an image photographed by the short-focus camera may correspond to a zoom ratio range, for example, "0.5×" to "1 X".

A zoom ratio corresponding to an image photographed by the wide-angle camera may range from a to 1. The minimum value a may be a fixed zoom ratio of the wide-angle camera, and a value of a may range from 0.5 to 0.9. For example, a may be, but not limited to, 0.5, 0.6, 0.7, 0.8, or 0.9.

It should be understood that the wide-angle camera may include the front-facing wide-angle camera and the rear-facing wide-angle camera. Ranges of zoom ratios corresponding to the front-facing wide-angle camera and the rear-facing wide-angle camera may be the same or may be different. For example, a zoom ratio corresponding to the front-facing wide-angle camera may range from a1 to 1, where the minimum value a1 may be a fixed zoom ratio of the front-facing wide-angle camera, and a value of a1 may range from 0.5 to 0.9. For example, a1 may be, but not limited to, 0.5, 0.6, 0.7, 0.8, or 0.9. For example, a zoom ratio corresponding to the rear-facing wide-angle camera may range from a2 to 1, where the minimum value a2 may be a fixed zoom ratio of the rear-facing wide-angle camera, and a value of a2 may range from 0.5 to 0.9. For example, a2 may be, but not limited to, 0.5, 0.6, 0.7, 0.8, or 0.9.

It should be understood that the zoom ratio range (from a to 1) corresponding to the image photographed by the wide-angle camera may include the zoom ratios at two ends (a and 1), may not include the zoom ratios at two ends (a and 1), or may include one of the zoom ratios at two ends.

For example, the zoom ratio range corresponding to the image photographed by the wide-anglecamera may be an interval [a, 1].

For example, the zoom ratio range corresponding to the image photographed by the main camera may be an interval (a, 1].

For example, the zoom ratio range corresponding to the image photographed by the main camera may be an interval [a, 1).

For example, the zoom ratio range corresponding to the image photographed by the main camera may be an interval (a, 1).

502: Detect a first enabling operation of a user for enabling a perspective distortion correction function, where the first enabling operation includes a first operation on a first control in the photographing interface on the terminal, the first control is used to indicate to enable or disable perspective distortion correction, and the first operation is used to indicate to enable perspective distortion correction.

503: Detect a second enabling operation of the user for enabling a stabilization function, where the second enabling operation includes a second operation on a second control in the photographing interface on the terminal, the second control is used to indicate to enable or disable the stabilization function, and the second operation is used to indicate to enable the stabilization function.

How to adjust the zoom ratio of the terminal for photographing is first described.

In some embodiments, a user may manually adjust the zoom ratio of the terminal for photographing.

For example, as shown in FIG. 6, the user may adjust the zoom ratio of the terminal by operating on the zoom ratio indication 403 in the photographing interface. For example, when a current zoom ratio of the terminal is "1×", the user may change the zoom ratio of the terminal to "5×" by clicking the zoom ratio indication 403 for one or more times.

For another example, the user may decrease the zoom ratio used by the terminal by using a gesture of pinching with two fingers (or three fingers) in the photographing interface, or increase the zoom ratio used by the terminal by using a gesture of swiping outward (in a direction opposite to that of pinching) with two fingers (or three fingers).

For another example, the user may alternatively change the zoom ratio of the terminal by dragging a zoom scale in the photographing interface.

For another example, the user may alternatively change the zoom ratio of the terminal by switching a currently used camera in the photographing interface or a photographing settings interface. For example, if the user selects to switch to the long-focus camera, the zoom ratio of the terminal automatically becomes greater.

For another example, the user may alternatively change the zoom ratio of the terminal by selecting a control for a long-focus photographing scenario, a control for a distant photographing scenario, or the like in the photographing interface or the photographing settings interface.

In some other embodiments, the terminal may alternatively automatically identify a specific scenario of an image captured by a camera, and automatically adjust the zoom ratio based on the identified specific scenario. For example, if the terminal identifies that the image captured by the camera includes a scene with a large view range, for example, a sea, a mountain, or a forest, the zoom ratio may automatically decrease. For another example, if the terminal identifies that the image captured by the camera is a distant object, for example, a distant bird or an athlete on a sports ground, the zoom ratio may automatically increases. This is not limited in this application.

In an embodiment, the zoom ratio of the terminal may be detected in real time. When the zoom ratio of the terminal is greater than a second preset threshold, the stabilization function is enabled, and a second control or a prompt related to enabling the stabilization function is displayed in the photographing interface.

In an embodiment, the zoom ratio of the terminal may be detected in real time. When the zoom ratio of the terminal is less than a first preset threshold, perspective distortion correction is enabled, and a first control or a prompt related to perspective distortion correction is displayed in the photographing interface.

In an embodiment, the controls for triggering to enable stabilization and perspective distortion correction may be displayed in the photographing interface, and the stabilization function and the perspective distortion correction function are enabled through interaction with a user, or in the foregoing mode, enabling of the stabilization function and the perspective distortion correction function is automatically triggered.

Alternatively, the controls for triggering to enable stabilization and perspective distortion correction are displayed in a photographing parameter adjustment interface on the camera, and the stabilization function and the perspective distortion correction function are enabled through interaction with a user, or in the foregoing mode, enabling of all or some of the stabilization function and the perspective distortion correction function is automatically triggered.

Details are provided below.

1. The Second Control Used to Indicate to Enable or Disable Stabilization and the First Control Used to Indicate to Enable Perspective Distortion Correction are Included in the Photographing Interface.

Figure 7:
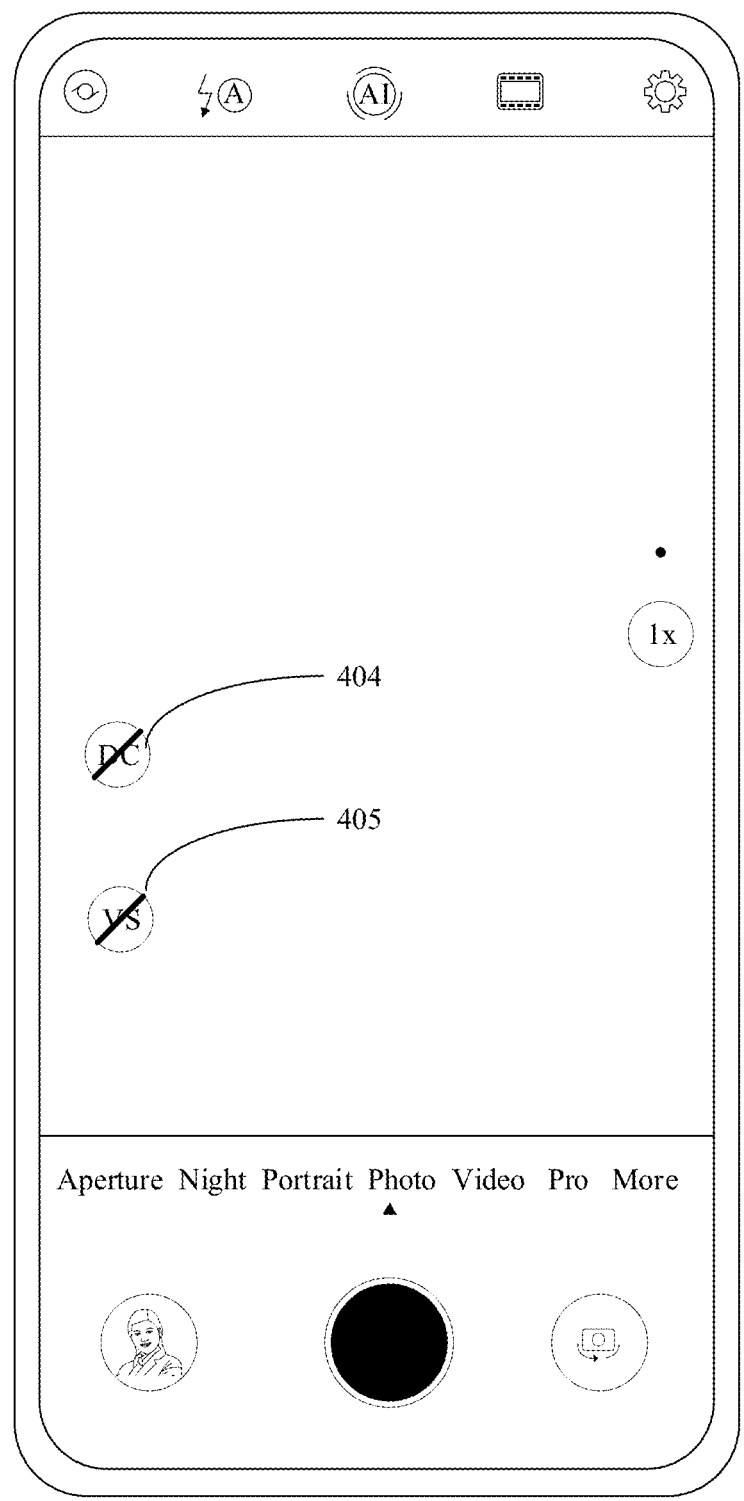
FIG. 7 is a schematic diagram of an interface on a terminal according to an embodiment of this application.
Figure 8:
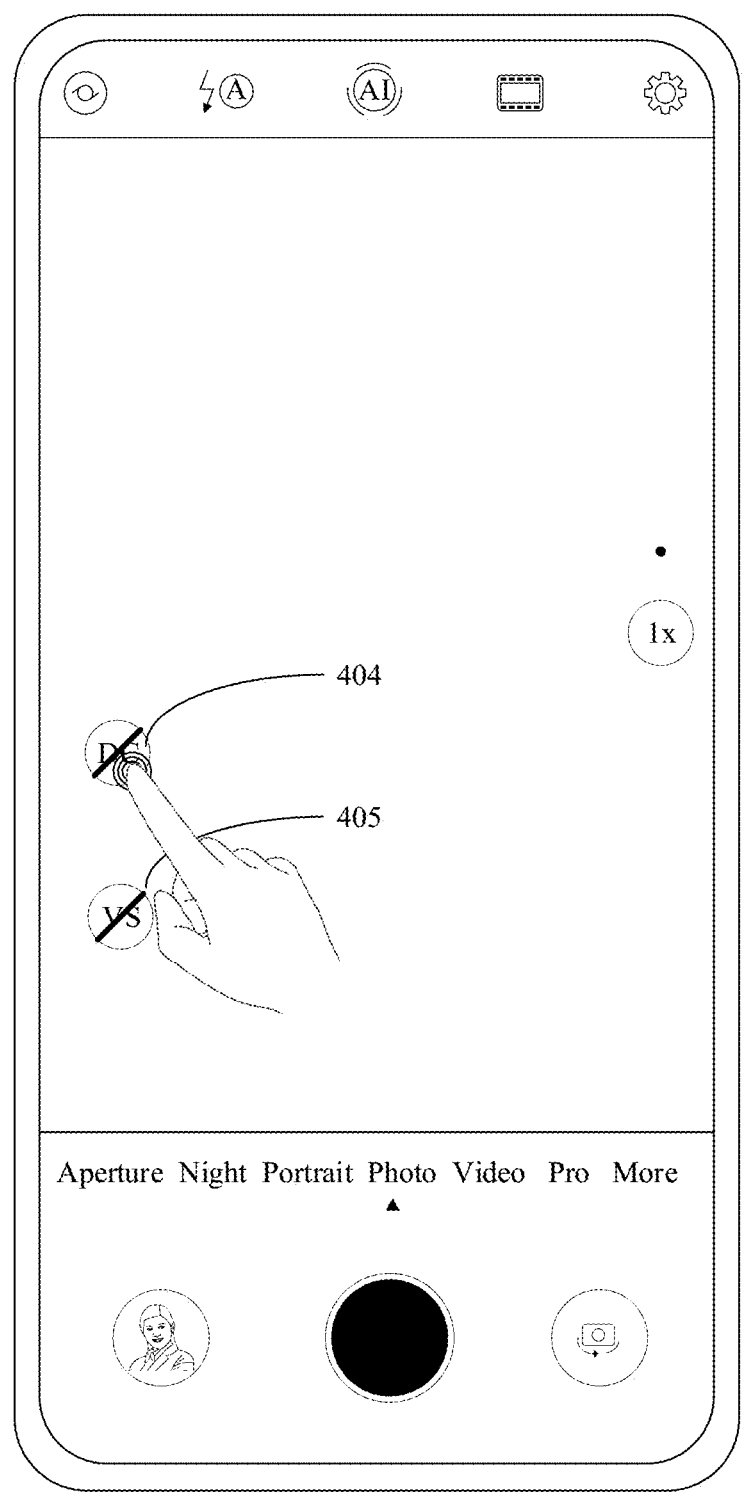
FIG. 8 is a schematic diagram of an interface on a terminal according to an embodiment of this application.
Figure 9:
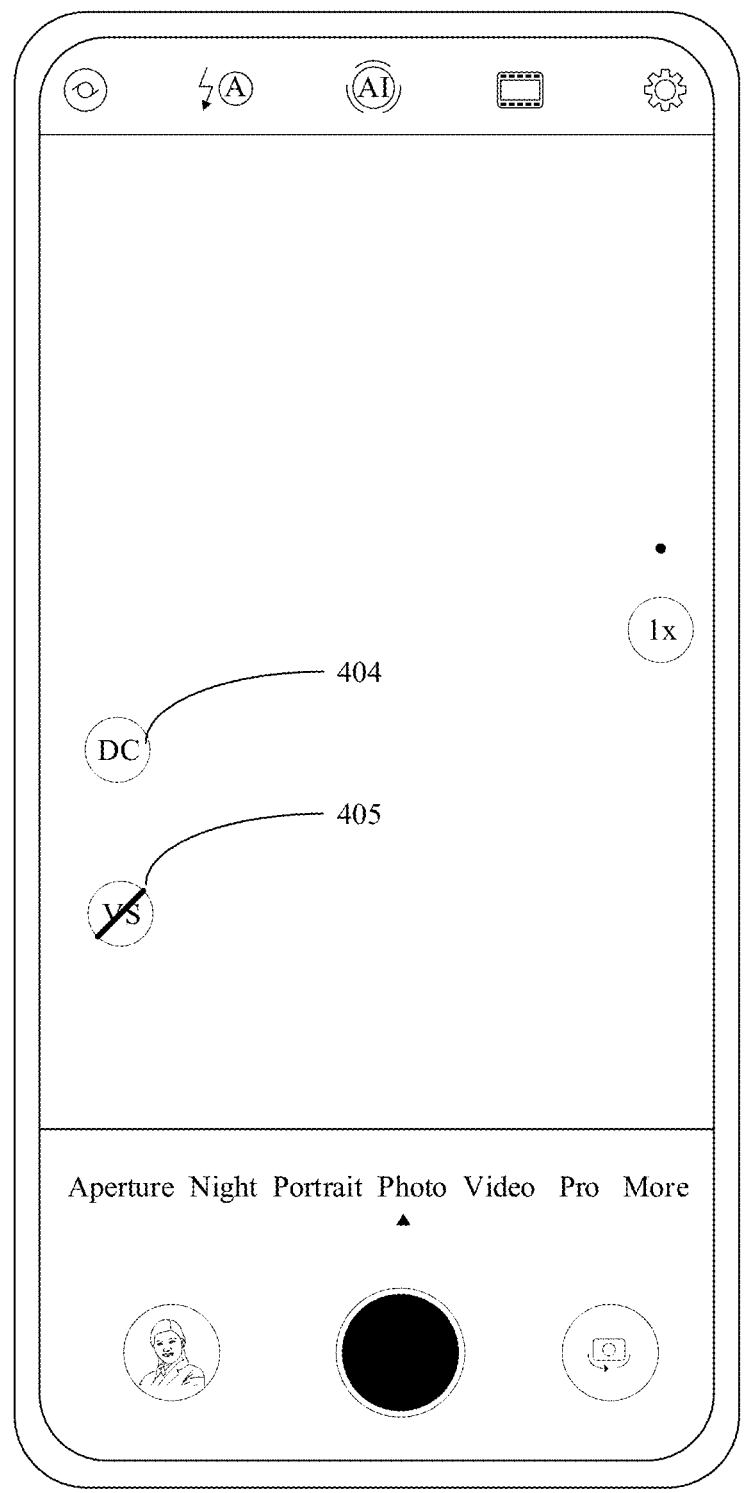
FIG. 9 is a schematic diagram of an interface on a terminal according to an embodiment of this application.

For example, the camera is in a main camera photographing mode, and the photographing interface on the camera is a preview interface in a photographing mode. Refer to FIG. 7. In this case, the second control 405 (a control VS (video stabilization) shown in FIG. 7) used to indicate to enable stabilization and the first control 404 (a control DC (distortion correction) shown in FIG. 7) used to indicate to enable perspective distortion correction may be displayed in the photographing interface. Because neither stabilization nor perspective distortion correction is enabled at a current moment, display content of the second control may prompt the user that stabilization is not enabled at the current moment, and display content of the first control may prompt the user that perspective distortion correction is not enabled at the current moment. Refer to FIG. 8. If the user wants to enable the stabilization function, the user may click the second control 405. In response to a clicking operation of the user on the second control, interface content shown in FIG. 9 may be displayed. Because the stabilization function is enabled at a current moment, display content of the second control 405 may prompt the user that stabilization is enabled at the current moment. If the user wants to enable the perspective distortion correction function, the user may click the first control 404. In response to a clicking operation of the user on the first control, the perspective distortion correction function is enabled at a current moment, and display content of the first control 404 may prompt the user that perspective distortion correction is enabled at the current moment.

If the user wants to disable the stabilization function, the user may click the second control 405. In response to a clicking operation of the user on the second control, the stabilization function is disabled at a current moment, and display content of the second control 405 may prompt the user that stabilization is disabled at the current moment. If the user wants to disable the perspective distortion correction function, the user may click the first control 404. In this case, the perspective distortion correction function is disabled, and display content of the first control 404 may prompt the user that perspective distortion correction is disabled at a current moment.

In an embodiment, when the camera is in a wide-angle photographing mode, the second control used to indicate to enable stabilization and the first control used to indicate to enable perspective distortion correction may be included in the photographing interface on the camera.

Figure 10:
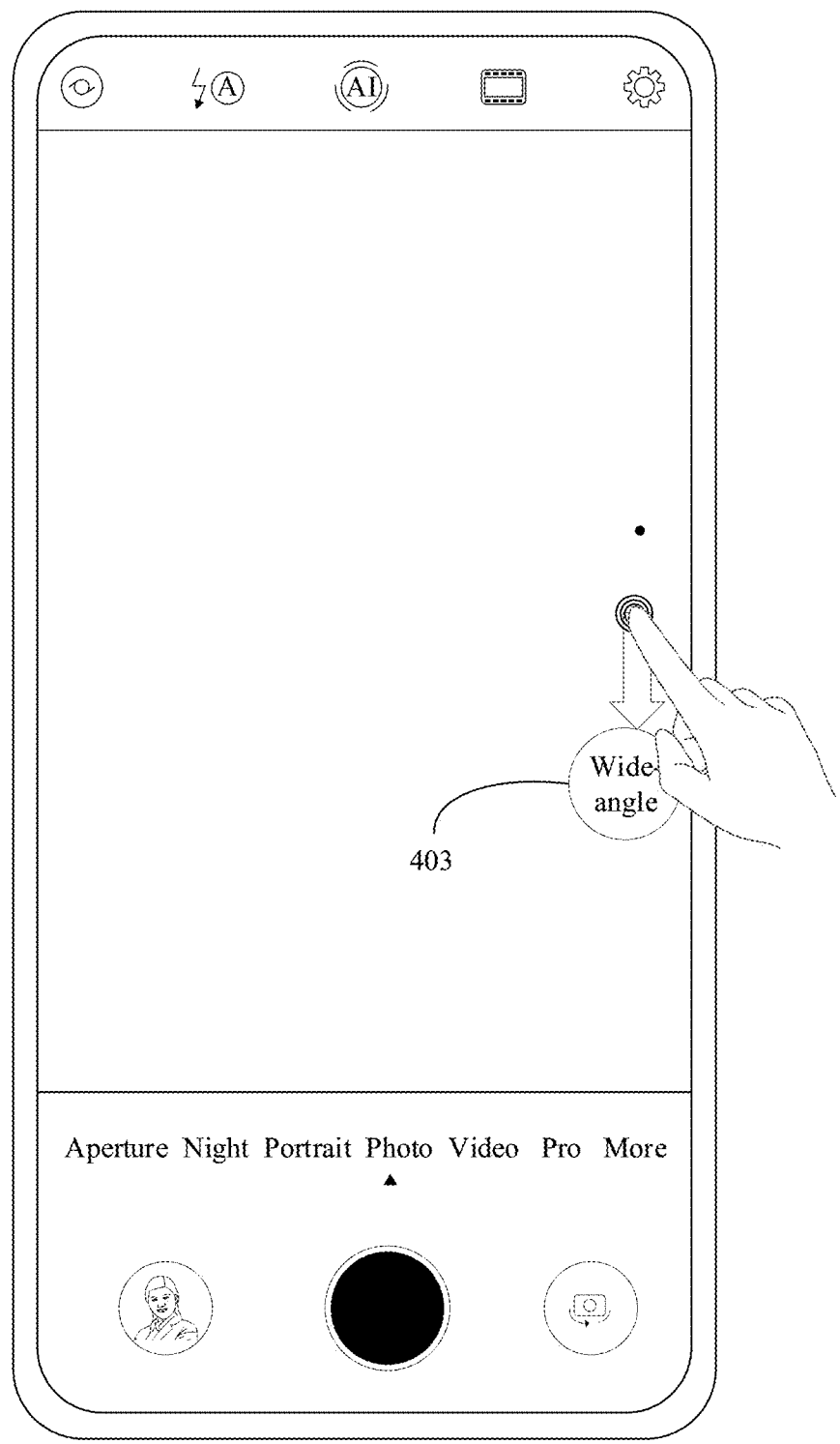
FIG. 10 is a schematic diagram of an interface on a terminal according to an embodiment of this application.
Figure 11:
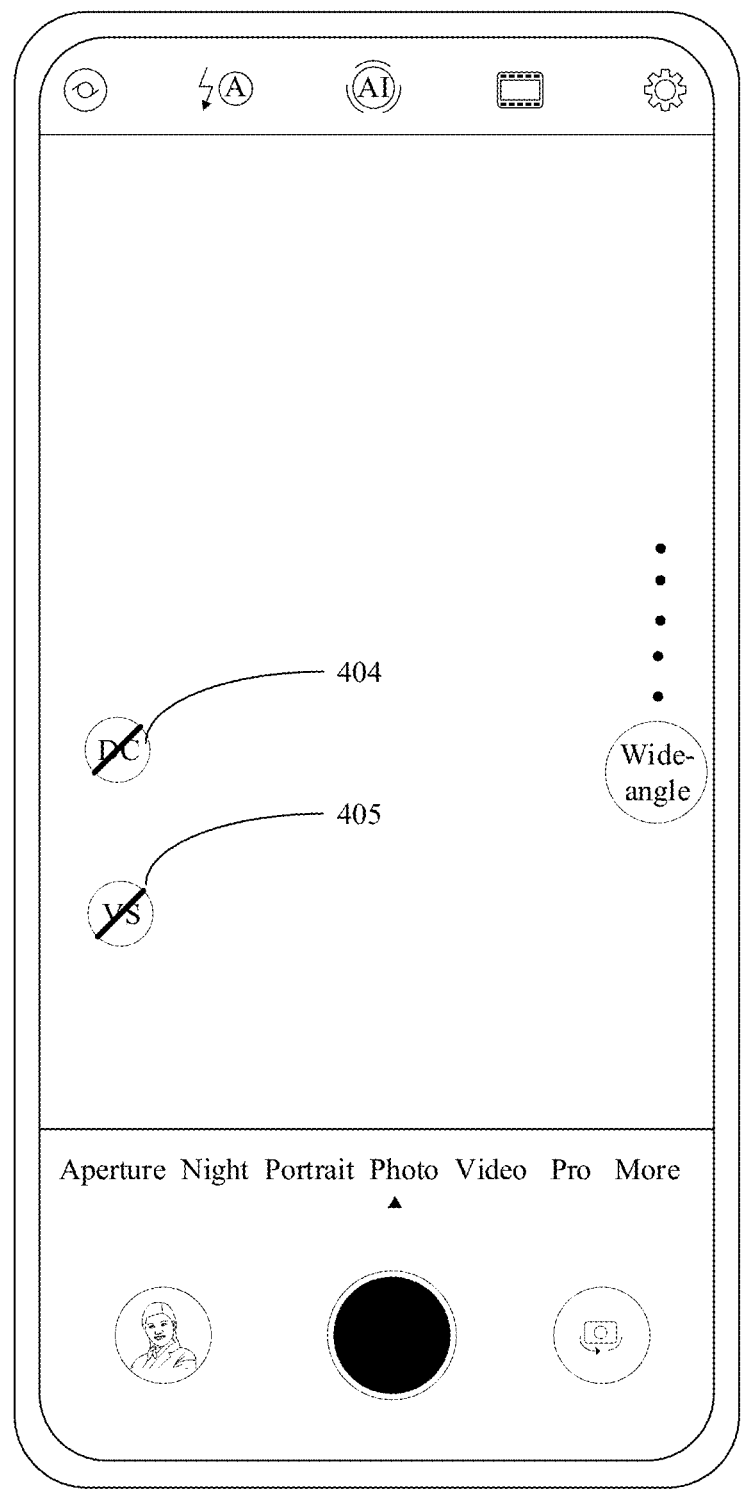
FIG. 11 is a schematic diagram of an interface on a terminal according to an embodiment of this application.

Refer to FIG. 10. The user may adjust the zoom ratio used by the terminal by operating on the zoom ratio indication 403 in the photographing interface, to switch to the wide-angle photographing mode of the camera, so that a photographing interface as shown in FIG. 11 can be displayed. If the user wants to enable the stabilization function, the user may click the second control 405. In response to a clicking operation of the user on the second control, the stabilization function is enabled, and display content of the second control 405 may prompt the user that stabilization is enabled at a current moment. If the user wants to enable the perspective distortion correction function, the user may click the first control 404. In response to a clicking operation of the user on the second control, the perspective distortion correction function is enabled at a current moment, and display content of the first control 404 may prompt the user that perspective distortion correction is enabled at the current moment.

If the user wants to disable the stabilization function, the user may click the second control 405. In response to a clicking operation of the user on the second control, the stabilization function is disabled at a current moment, and display content of the second control 405 may prompt the user that stabilization is disabled at the current moment. If the user wants to disable the perspective distortion correction function, the user may click the first control 404. In this case, the perspective distortion correction function is disabled, and display content of the first control 404 may prompt the user that perspective distortion correction is disabled at a current moment.

Figure 12:
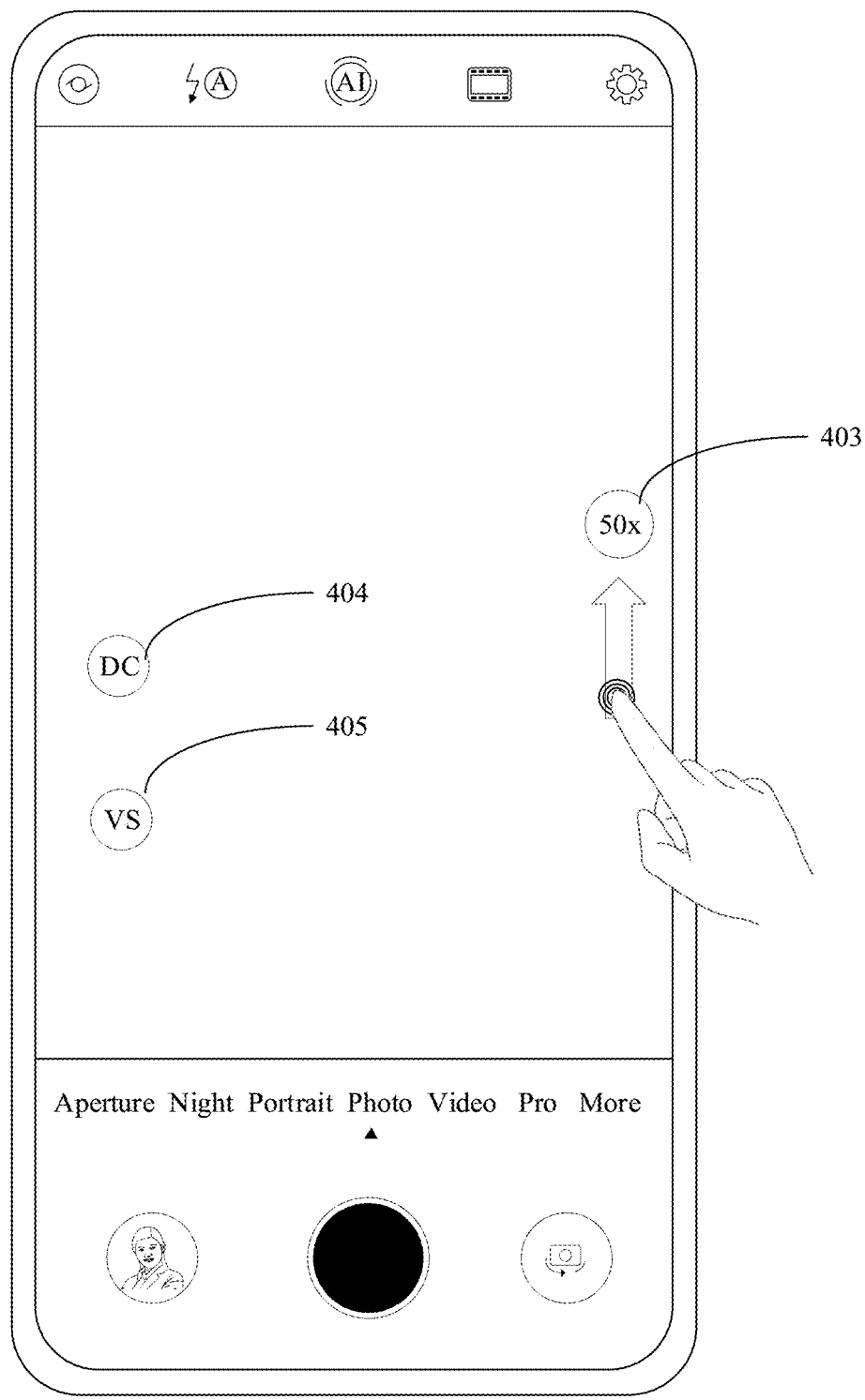
FIG. 12 is a schematic diagram of an interface on a terminal according to an embodiment of this application.
Figure 13:
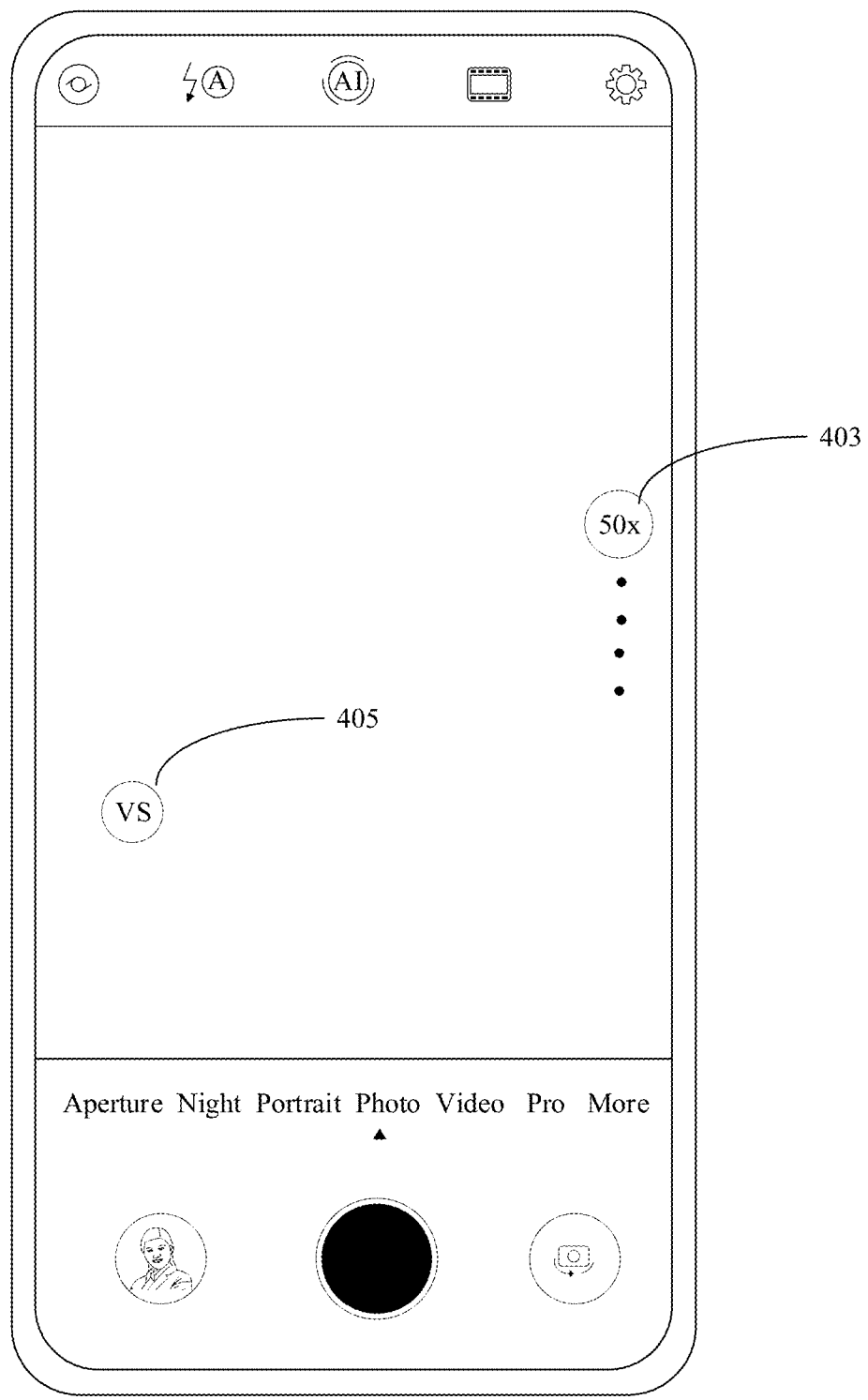
FIG. 13 is a schematic diagram of an interface on a terminal according to an embodiment of this application.

It should be understood that, in a long-focus photographing mode, perspective distortion is not obvious, and perspective distortion correction may not be performed on an image. Therefore, in the photographing interface in the long-focus photographing mode, the second control used to indicate to enable stabilization may be displayed, and the first control used to indicate to enable perspective distortion correction may not be displayed, or a prompt indicating that a user has disabled perspective distortion correction is displayed, to indicate that perspective distortion correction is disabled by default. The prompt cannot be used for interaction with a user to switch between enabling and disabling of perspective distortion correction. For example, refer to FIG. 12. The user may adjust the zoom ratio used by the mobile phone by operating on the zoom ratio indication 403 in the photographing interface, to switch to the long-focus photographing mode of the camera, so that a photographing interface as shown in FIG. 13 can be displayed. The first control used to indicate to enable perspective distortion correction may not be included in a photographing interface shown in FIG. 13.

2. The Second Control Used to Indicate to Enable Stabilization and the First Control Used to Trigger to Enable Perspective Distortion Correction are Displayed in the Photographing Parameter Adjustment Interface on the Camera.

In an embodiment, when the camera is in the wide-angle photographing mode, an ultra-wide-angle photographing mode, and a medium-focus photographing mode, the second control used to indicate to enable stabilization and the first control used to trigger to enable perspective distortion correction may be displayed in the photographing parameter adjustment interface on the camera.

Figure 14:
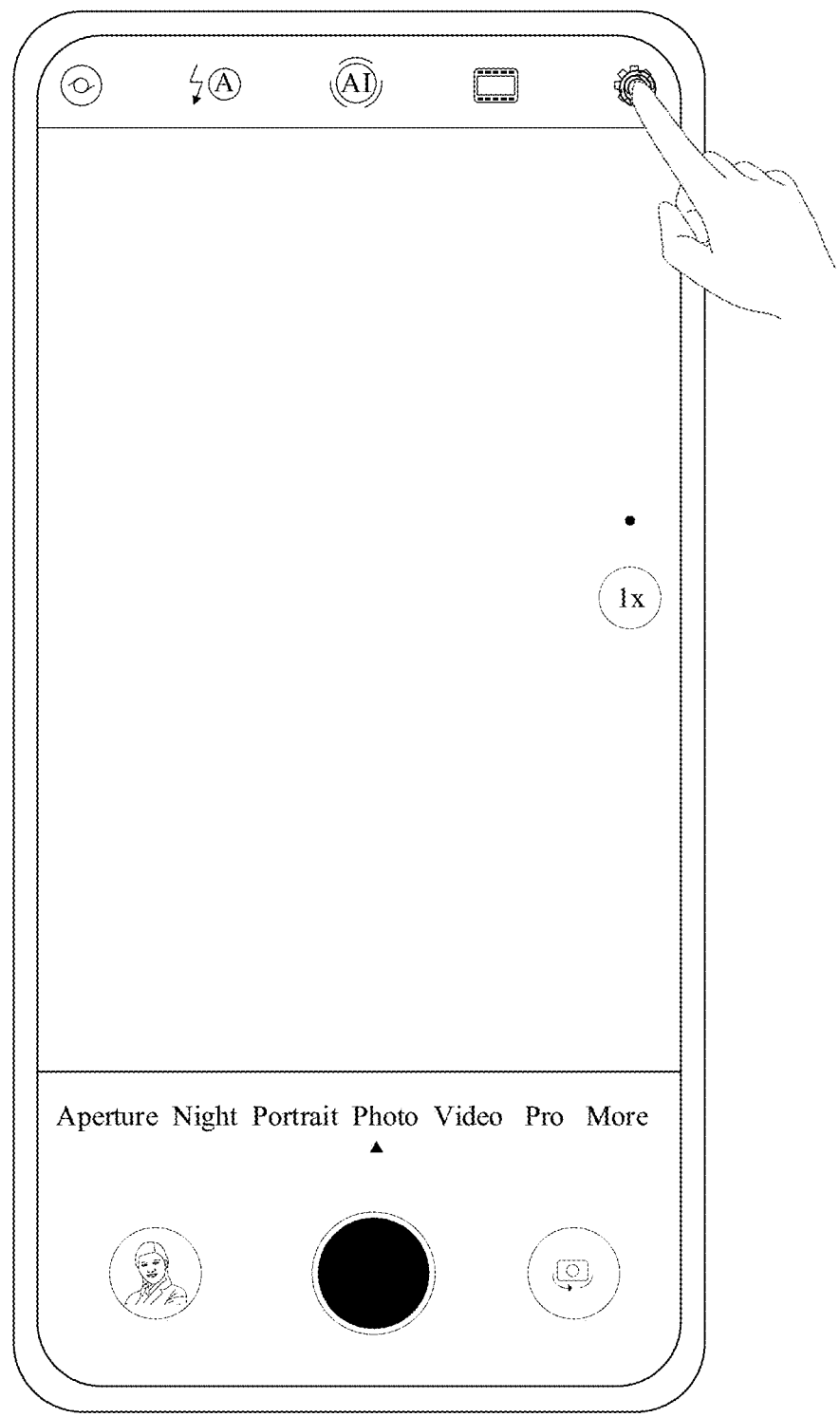
FIG. 14 is a schematic diagram of an interface on a terminal according to an embodiment of this application.
Figure 15:
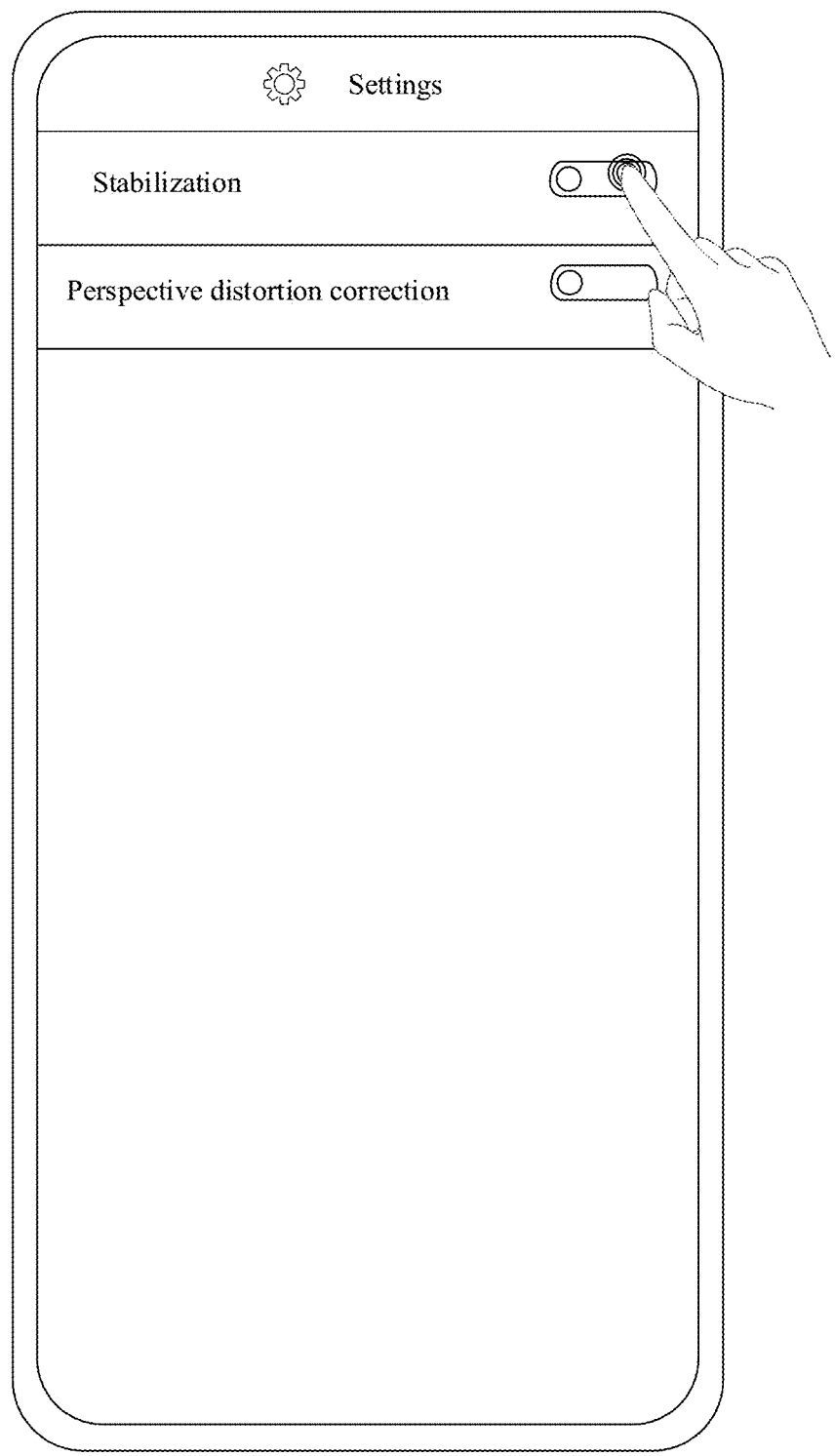
FIG. 15 is a schematic diagram of an interface on a terminal according to an embodiment of this application.
Figure 16:
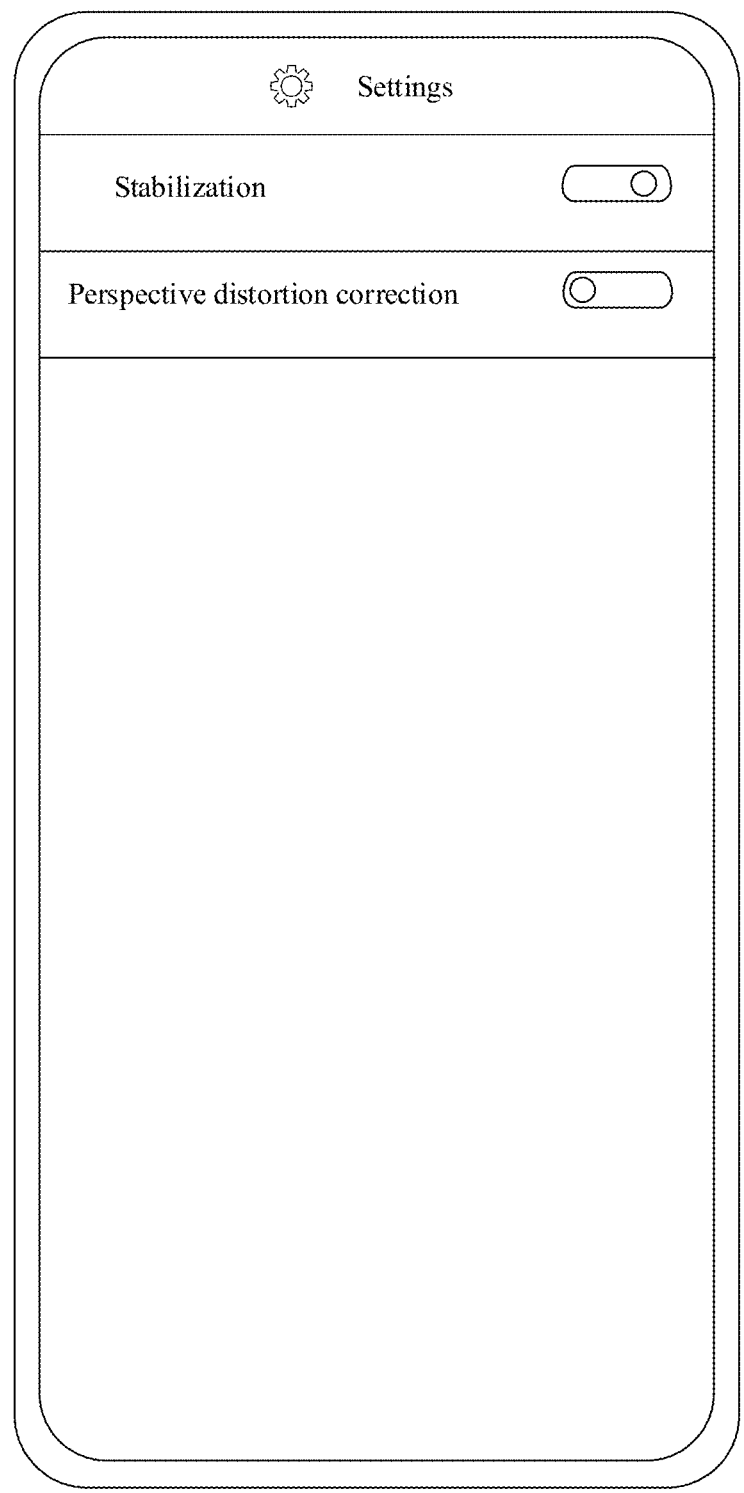
FIG. 16 is a schematic diagram of an interface on a terminal according to an embodiment of this application.

In this embodiment of this application, refer to FIG. 14. A first control may be included in a photographing interface on the camera shown in FIG. 14. The first control is used to indicate to open the photographing parameter adjustment interface. A user may click the first control, and a terminal device may receive a third operation of the user on the first control, and may open the photographing parameter adjustment interface as shown in FIG. 15 in response to the third operation. As shown in FIG. 15, the second control used to indicate to enable stabilization and the first control used to indicate to enable perspective distortion correction are included in the photographing parameter adjustment interface. Because neither stabilization nor perspective distortion correction is enabled at a current moment, display content of the second control may prompt the user that stabilization is not enabled at the current moment, and display content of the first control may prompt the user that perspective distortion correction is not enabled at the current moment. Refer to FIG. 15. If the user wants to enable the stabilization function, the user may click the second control. In response to a clicking operation of the user on the second control, interface content shown in FIG. 16 may be displayed. Because the stabilization function is enabled at a current moment, display content of the second control may prompt the user that stabilization is enabled at the current moment. If the user wants to enable the perspective distortion correction function, the user may click the first control. In response to a clicking operation of the user on the second control, the perspective distortion correction function is enabled at a current moment, and display content of the first control may prompt the user that perspective distortion correction is enabled at the current moment.

If the user wants to disable the stabilization function, the user may click the second control. In response to a clicking operation of the user on the second control, the stabilization function is disabled at a current moment, and display content of the second control may prompt the user that stabilization is disabled at the current moment. If the user wants to disable the perspective distortion correction function, the user may click the first control. In this case, the perspective distortion correction function is disabled, and display content of the first control may prompt the user that perspective distortion correction is disabled at a current moment.

It should be understood that, after the user returns to the photographing interface, a prompt indicating whether to enable stabilization and perspective distortion correction currently may be further displayed in the photographing interface.

Figure 17:
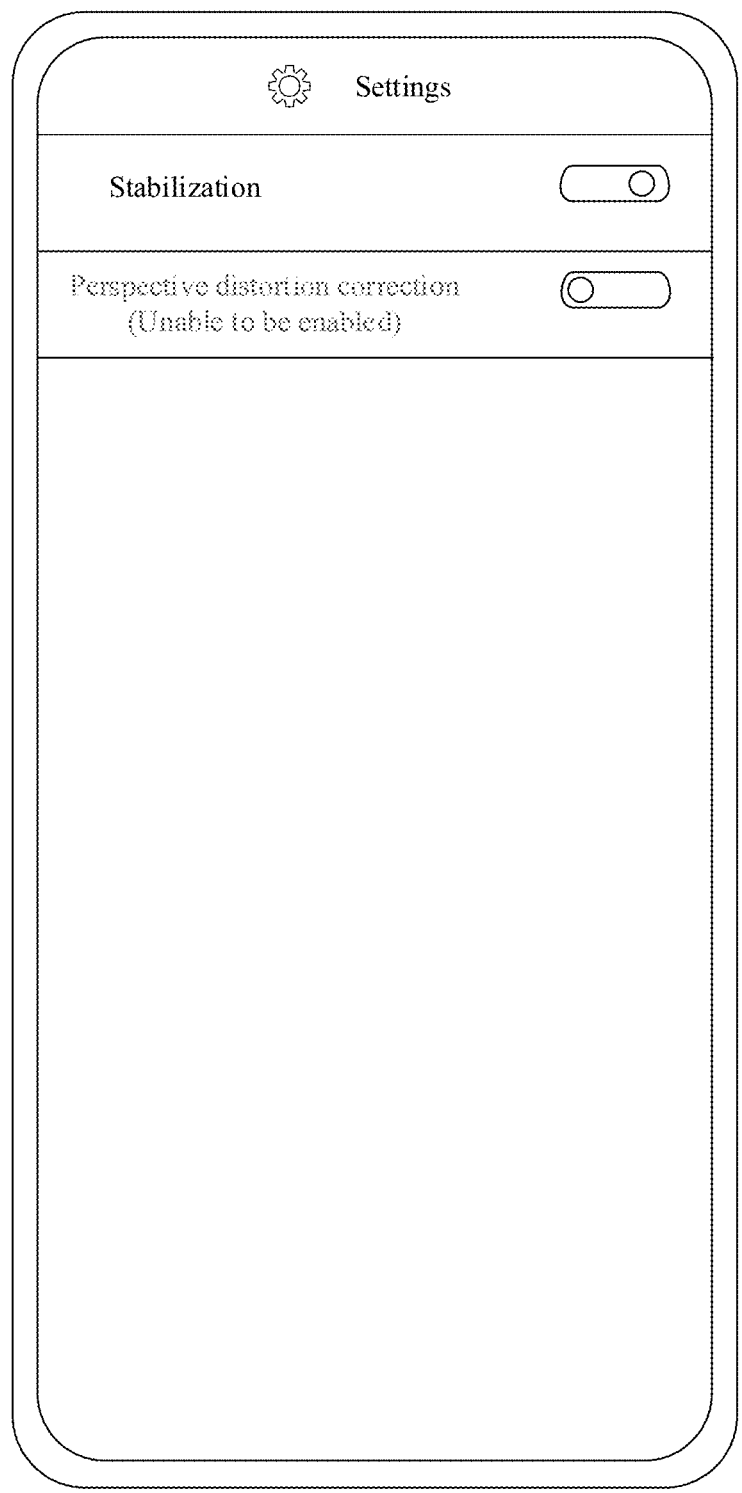
FIG. 17 is a schematic diagram of an interface on a terminal according to an embodiment of this application.

In an embodiment, in a long-focus photographing mode, perspective distortion is not obvious, and perspective distortion correction may not be performed on an image. Therefore, in the photographing parameter adjustment interface on the camera in the long-focus photographing mode, the second control used to indicate to enable stabilization may be displayed, and the first control used to indicate to enable perspective distortion correction may not be displayed, or a prompt indicating that a user has disabled perspective distortion correction is displayed, to indicate that perspective distortion correction is disabled by default. The prompt cannot be used for interaction with a user to switch between enabling and disabling of perspective distortion correction. For example, refer to FIG. 17. The first control used to indicate to enable perspective distortion correction is not included in the photographing parameter adjustment interface shown in FIG. 17, and a prompt indicating that a user has disabled perspective distortion correction is included, to indicate that perspective distortion correction is disabled by default.

3. The Second Control Used to Indicate to Enable Stabilization is Displayed, and Perspective Distortion Correction is Enabled by Default.

In an embodiment, when the camera is in the wide-angle photographing mode, the ultra-wide-angle photographing mode, or the medium-focus photographing mode, the second control used to indicate to enable stabilization may be displayed in the photographing interface, and the first control used to indicate to enable perspective distortion correction may not be displayed, or a prompt indicating that a user has enabled perspective distortion correction is displayed, to indicate that perspective distortion correction is enabled by default. The prompt cannot be used for interaction with a user to switch between enabling and disabling of perspective distortion correction.

In an embodiment, when the camera is in the wide-angle photographing mode, the second control used to indicate to enable stabilization may be included in the photographing interface on the camera, and perspective distortion correction is enabled by default.

In an embodiment, when the camera is in the ultra-wide-angle photographing mode, the second control used to indicate to enable stabilization may be included in the photographing interface on the camera, and perspective distortion correction is enabled by default.

In an embodiment, when the camera is in the medium-focus photographing mode, the second control used to indicate to enable stabilization may be included in the photographing interface on the camera, and perspective distortion correction is enabled by default.

Figure 18:
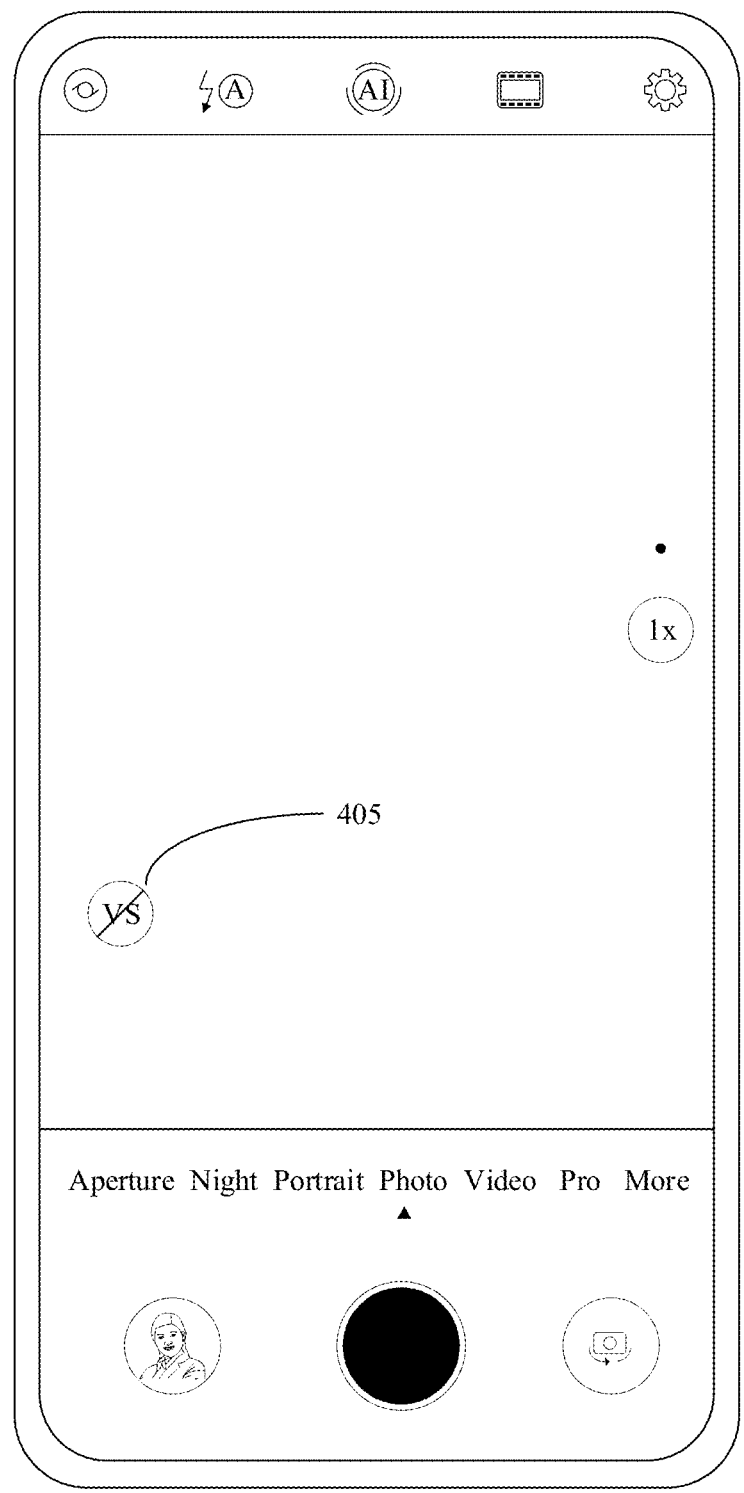
FIG. 18 is a schematic diagram of an interface on a terminal according to an embodiment of this application.
Figure 19:
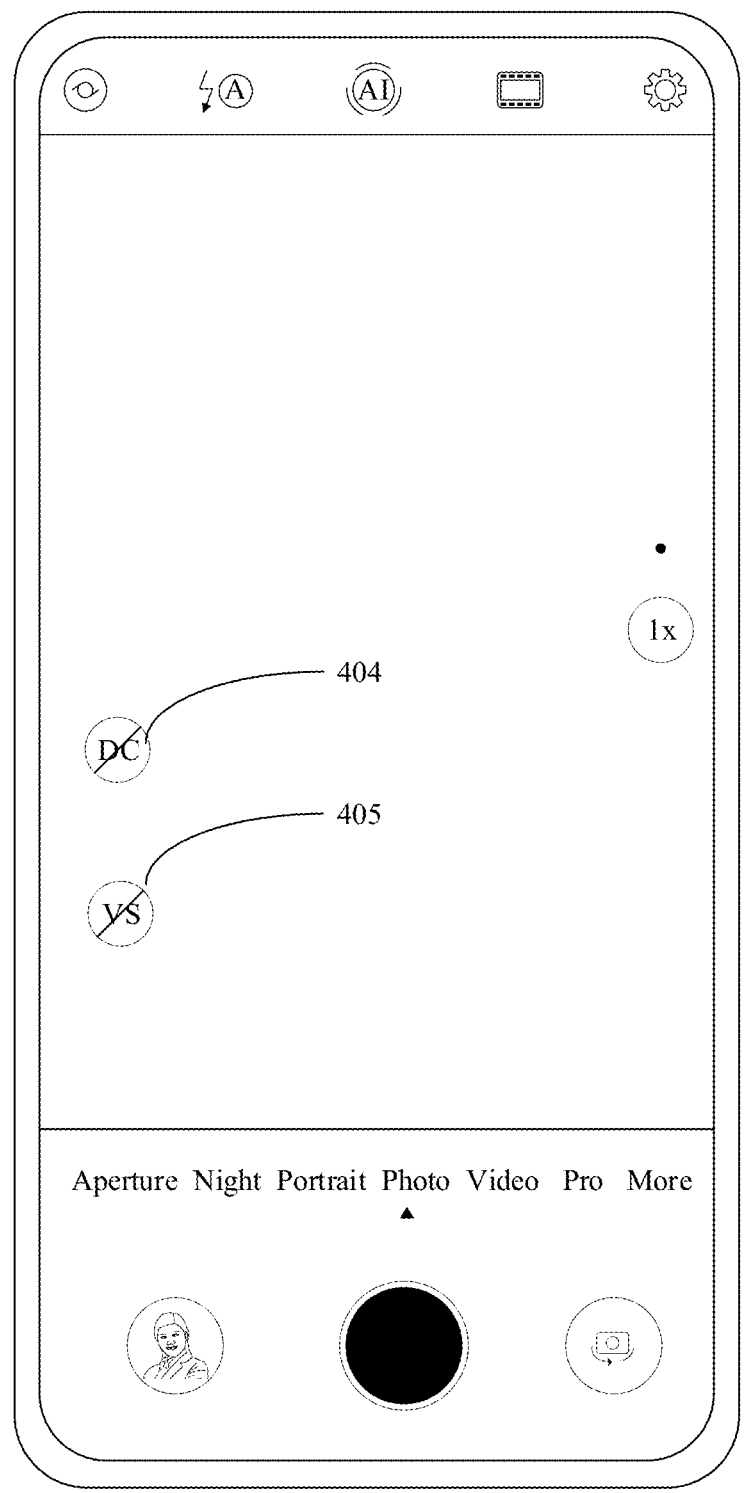
FIG. 19 is a schematic diagram of an interface on a terminal according to an embodiment of this application.

Refer to FIG. 18. The second control 405 used to indicate to enable stabilization may be displayed in the photographing interface on the camera, and the first control used to indicate to enable perspective distortion correction may not be displayed. Alternatively, refer to FIG. 19. A prompt 404 indicating that a user has enabled perspective distortion correction is displayed, to indicate that perspective distortion correction is enabled by default. The prompt 404 cannot be used for interaction with a user to switch between enabling and disabling of perspective distortion correction. Because stabilization is not enabled at a current moment, display content of the second control may prompt the user that stabilization is not enabled at the current moment. If the user wants to enable the stabilization function, the user may click the second control. In response to a clicking operation of the user on the second control, the stabilization function is enabled, and the display content of the second control may prompt the user that stabilization is enabled at the current moment.

4. The Second Control Used to Indicate to Enable Stabilization is Displayed in the Photographing Parameter Adjustment Interface on the Camera, and Perspective Distortion Correction is Enabled by Default.

In an embodiment, when the camera is in the wide-angle photographing mode, the ultra-wide-angle photographing mode, or the medium-focus photographing mode, the second control used to indicate to enable stabilization may be displayed in the photographing parameter adjustment interface on the camera, and the first control used to indicate to enable perspective distortion correction may not be displayed, or a prompt indicating that a user has enabled perspective distortion correction is displayed, to indicate that perspective distortion correction is enabled by default. The prompt cannot be used for interaction with a user to switch between enabling and disabling of perspective distortion correction.

In an embodiment, a third image acquired by the camera may be obtained. The third image is an image frame acquired before the first image is acquired. Perspective distortion correction is performed on the third image to obtain a fourth image, and the fourth image is displayed in the photographing interface on the camera. In this embodiment, stabilization is not enabled on the camera, and perspective distortion correction is enabled by default. In this case, an image displayed in the photographing interface is an image (the fourth image) on which perspective distortion correction is performed but stabilization is not performed.

5. The First Control Used to Indicate to Enable Perspective Distortion Correction is Displayed, and Stabilization is Enabled by Default.

In an embodiment, when the camera is in the wide-angle photographing mode, the ultra-wide-angle photographing mode, or the medium-focus photographing mode, the first control used to indicate to enable perspective distortion correction may be displayed in the photographing interface, and the second control used to indicate to enable stabilization may not be displayed, or a prompt indicating that a user has enabled stabilization is displayed, to indicate that stabilization is enabled by default. The prompt cannot be used for interaction with a user to switch between enabling and disabling of stabilization.

In an embodiment, when the camera is in the wide-angle photographing mode, the first control used to indicate to enable perspective distortion correction may be included in the photographing interface on the camera, and stabilization is enabled by default.

In an embodiment, when the camera is in the ultra-wide-angle photographing mode, the first control used to indicate to enable perspective distortion correction may be included in the photographing interface on the camera, and stabilization is enabled by default.

In an embodiment, when the camera is in the medium-focus photographing mode, the first control used to indicate to enable perspective distortion correction may be included in the photographing interface on the camera, and stabilization is enabled by default.

Figure 20:
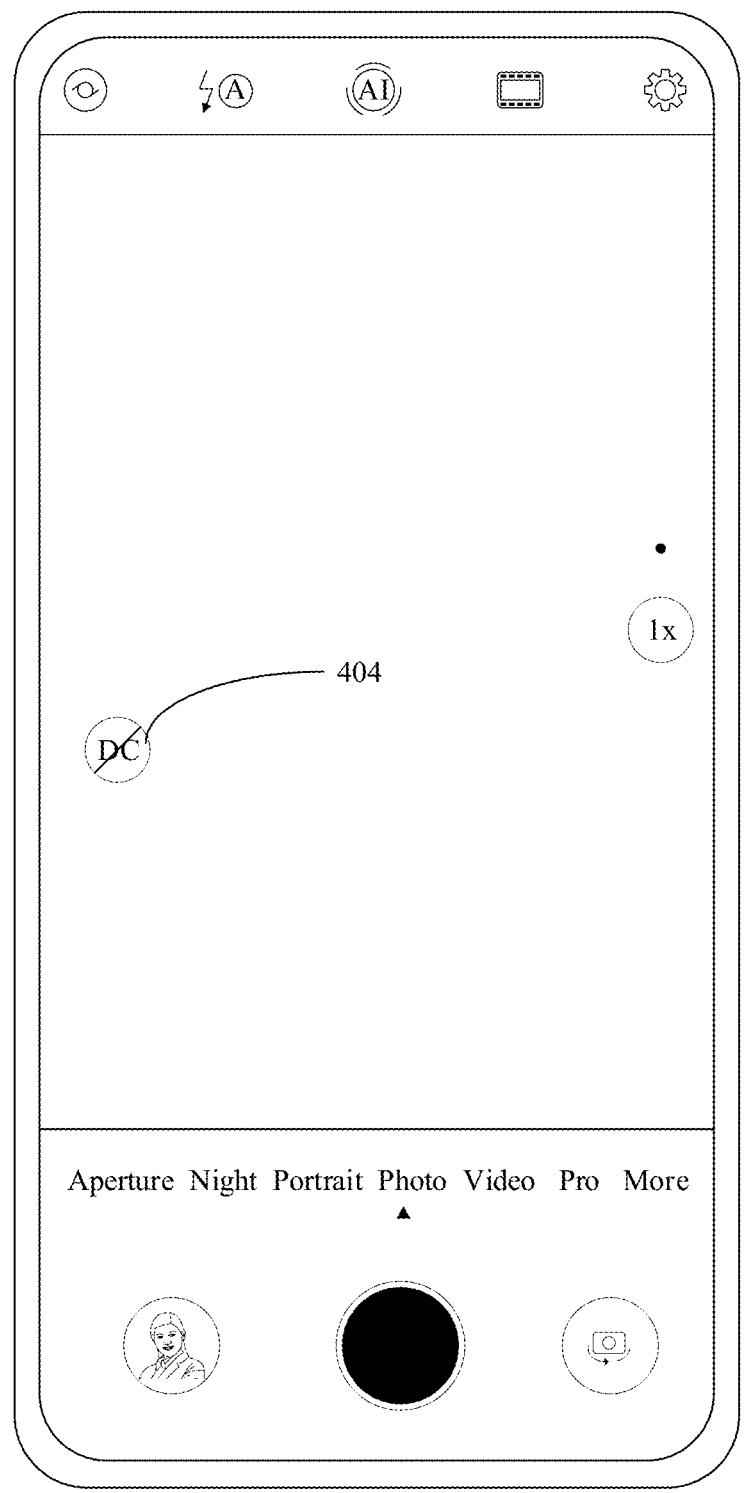
FIG. 20 is a schematic diagram of an interface on a terminal according to an embodiment of this application.
Figure 21:
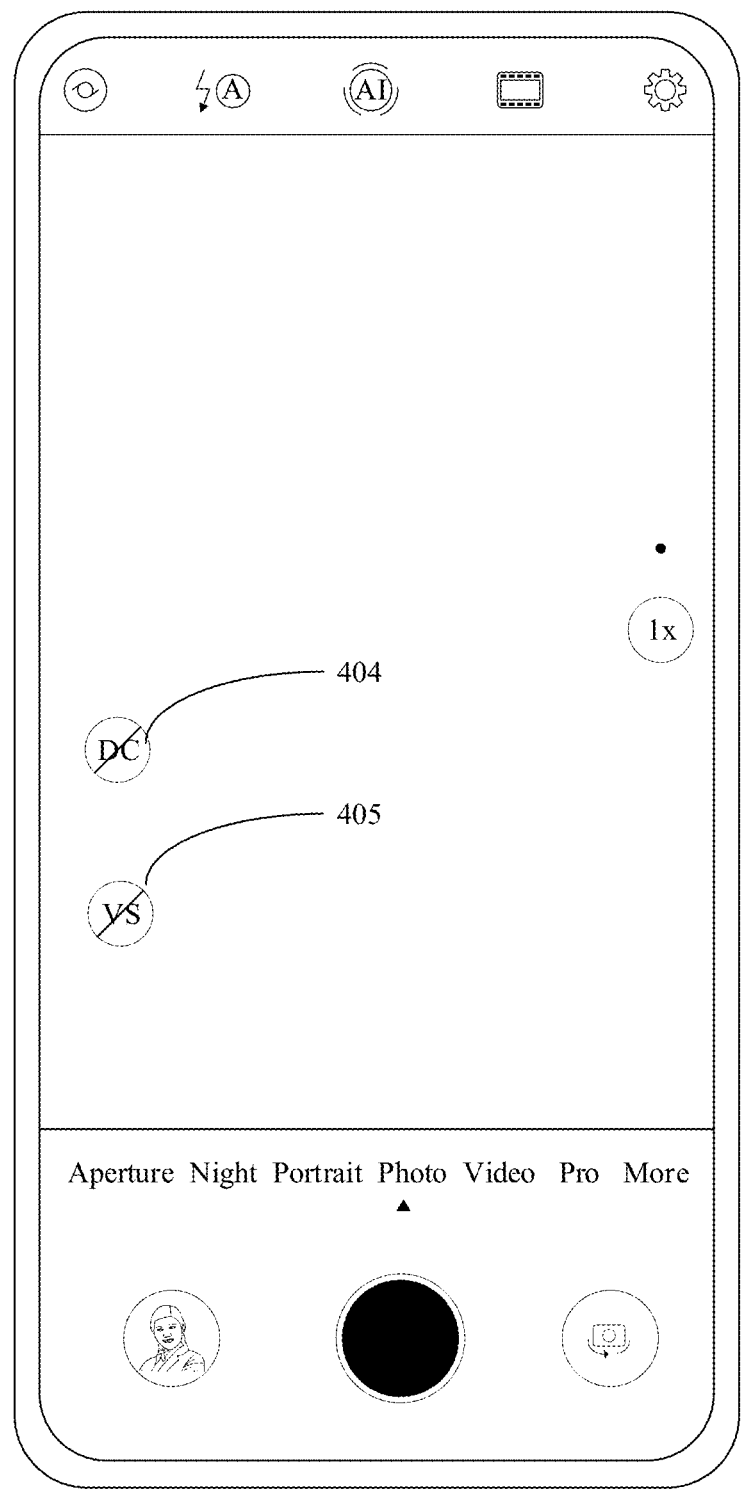
FIG. 21 is a schematic diagram of an interface on a terminal according to an embodiment of this application.

Refer to FIG. 20. The first control 404 used to indicate to enable perspective distortion correction may be displayed in the photographing interface on the camera, and the second control used to indicate to enable stabilization may not be displayed. Alternatively, refer to FIG. 21. A prompt 405 indicating that a user has enabled stabilization is displayed, to indicate that stabilization is enabled by default. The prompt 405 cannot be used for interaction with a user to switch between enabling and disabling of stabilization. Because perspective distortion correction is not enabled at a current moment, display content of the first control may prompt the user that perspective distortion correction is not enabled at the current moment. If the user wants to enable the perspective distortion correction function, the user may click the first control. In response to a clicking operation of the user on the first control, the perspective distortion correction function is enabled, and the display content of the first control may prompt the user that perspective distortion correction is enabled at the current moment.

6. The First Control Used to Indicate to Enable Perspective Distortion Correction is Displayed in the Photographing Parameter Adjustment Interface on the Camera, and Stabilization is Enabled by Default.

In an embodiment, when the camera is in the wide-angle photographing mode, the ultra-wide-angle photographing mode, or the medium-focus photographing mode, the first control used to indicate to enable perspective distortion correction may be displayed in the photographing parameter adjustment interface on the camera, and the second control used to indicate to enable stabilization may not be displayed, or a prompt indicating that a user has enabled stabilization is displayed, to indicate that stabilization is enabled by default. The prompt cannot be used for interaction with a user to switch between enabling and disabling of stabilization.

In an embodiment, a fourth image acquired by the camera may be obtained. The fourth image is an image frame acquired before the first image is acquired. Stabilization is performed on the fourth image to obtain a second output of stabilization, and an image indicated by the second output of stabilization is displayed in the photographing interface on the camera. In this embodiment, if perspective distortion correction is not enabled on the camera, stabilization is enabled by default. In this case, an image displayed in the photographing interface is an image (the image indicated by the second output of stabilization) on which stabilization is performed but perspective distortion correction is not performed.

7. Perspective Distortion Correction and Stabilization are Enabled by Default.

In an embodiment, when the camera is in the wide-angle photographing mode, the ultra-wide-angle photographing mode, or the medium-focus photographing mode, the first control used to indicate to enable perspective distortion correction may not be displayed in the photographing interface, and the second control used to indicate to enable stabilization may not be displayed. The perspective distortion correction and stabilization functions are enabled by default. Alternatively, a prompt indicating that a user has enabled stabilization is displayed, to indicate that stabilization is enabled by default. The prompt cannot be used for interaction with a user to switch between enabling and disabling of stabilization; and a prompt indicating that a user has enabled perspective distortion correction is displayed, to indicate that perspective distortion correction is enabled by default. The prompt cannot be used for interaction with a user to switch between enabling and disabling of perspective distortion correction.

The foregoing descriptions are provided by using an example in which the photographing interface is a photographing interface on the camera before photographing is started. In an embodiment, the photographing interface may be a photographing interface before a video recording function is enabled, or a photographing interface after a video recording function is enabled.

In Another Embodiment, Some Controls in the Photographing Interface May be Further Hidden on the Mobile Phone, to Prevent an Image from being Blocked by a Control as Far as Possible, Thereby Improving Visual Experience of a User.

For example, when the user has not operated in the photographing interface for a long time, the "second control" and the "first control" in the foregoing embodiment may not be displayed anymore. After an operation of the user of clicking on a touchscreen is detected, the hidden "second control" and "first control" may be displayed again.

For how to perform stabilization on the acquired first image to obtain a first cropped area, and perform perspective distortion correction on the first cropped area to obtain a third cropped area, refer to the descriptions about operation 301 and operation 302 in the foregoing embodiment. Details are not described herein again.

504: Perform stabilization on an acquired first image to obtain a first cropped area; perform perspective distortion correction on the first cropped area to obtain a third cropped area; obtain a third image based on the first image and the third cropped area; perform stabilization on an acquired second image to obtain a second cropped area, where the second cropped area is related to the first cropped area and shake information, and the shake information indicates a shake that occurs in a process in which the terminal acquires the first image and the second image; perform perspective distortion correction on the second cropped area to obtain a fourth cropped area; and obtain a fourth image based on the second image and the fourth cropped area.

For descriptions about operation 504, refer to the descriptions about operation 301 to operation 305. Details are not described herein again.

505: Generate a target video based on the third image and the fourth image, and display the target video.

In an embodiment, the target video may be generated based on the third image and the fourth image, and the target video is displayed. In an embodiment, for any two image frames of a video stream acquired by a terminal device in real time, an output image on which stabilization and perspective distortion correction has been performed may be obtained according to the foregoing operation 301 to operation 306, and then a video (that is, the target video) on which stabilization and perspective distortion correction has been performed may be obtained. For example, the first image may be an $n^{th}$ frame of the video stream, and the second image may be an $(n+1)^{th}$ frame. In this case, an $(n-2)^{th}$ frame and an $(n-1)^{th}$ frame may be further used as the first image and the second image respectively for processing in operation 301 to operation 306, the $(n-1)^{th}$ frame and the $n^{th}$ frame may be further used as the first image and the second image respectively for processing in operation 301 to operation 306, and the $(n+1)^{th}$ frame and the $(n+2)^{th}$ frame may be further used as the first image and the second image respectively for processing in operation 301 to operation 306.

In an embodiment, after the target video is obtained, the target video may be displayed in the viewfinder frame in the photographing interface on the camera.

It should be understood that the photographing interface may be a preview interface in a photographing mode, and the target video is a preview picture in the photographing mode. A user may trigger the camera to photograph by clicking a photographing control in the photographing interface or in another manner of triggering, to obtain a photographed image.

It should be understood that the photographing interface may be a preview interface before video recording is started in a video recording mode, and the target video is a preview picture before video recording is started in the video recording mode. A user may trigger the camera to start recording by clicking a photographing control in the photographing interface or in another manner of triggering.

It should be understood that the photographing interface may be a preview interface after video recording is started in a video recording mode, and the target video is a preview picture after video recording is started in the video recording mode. A user may trigger the camera to stop recording by clicking a photographing control in the photographing interface or in another manner of triggering, and save a video photographed during recording.

Example 2: Video Post-Processing

The image processing method according to embodiments of this application is described by using a scenario of real-time photographing as an example. In another embodiment, stabilization and perspective distortion correction described above may be performed on a video in a gallery on a terminal device or a cloud-side server.

Figure 24A:
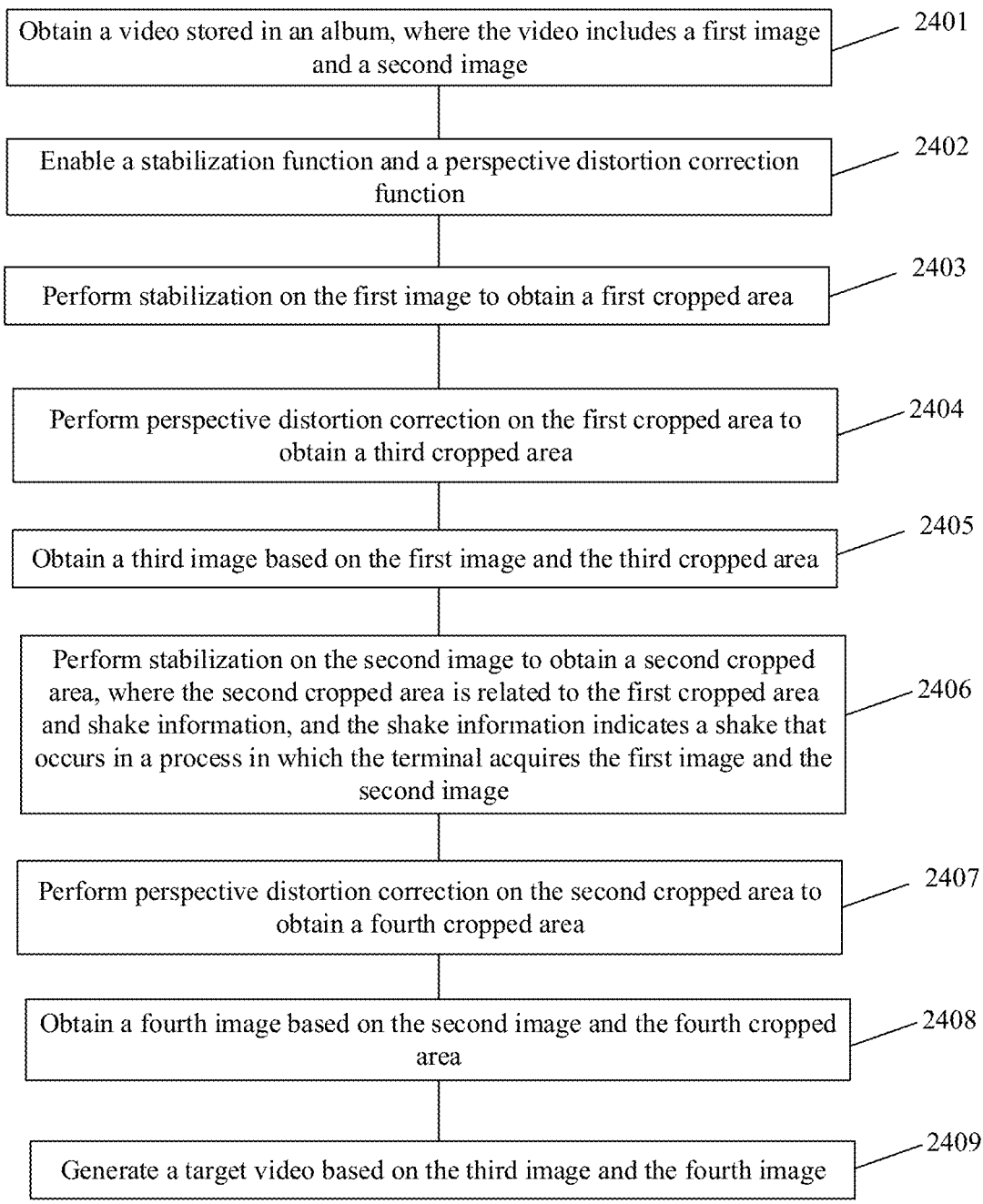
FIG. 24a is a schematic diagram of an embodiment of an image processing method according to an embodiment of this application.

Refer to FIG. 24a. FIG. 24a is a schematic flowchart of an image processing method according to an embodiment of this application. As shown in FIG. 24a, the method includes the following operations.

2401: Obtain a video stored in an album, where the video includes a first image and a second image.

Figure 24B:
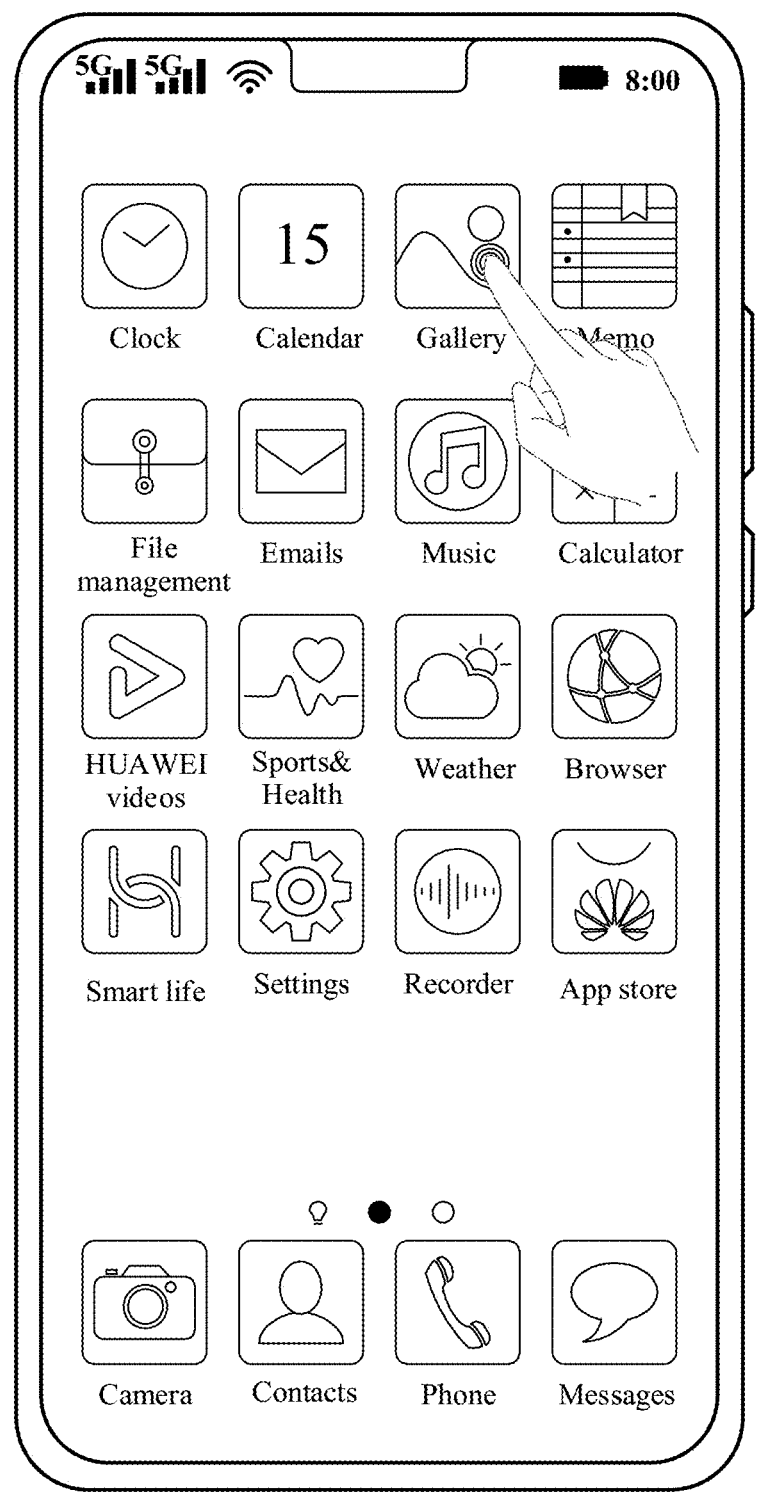
FIG. 24b is a schematic diagram of an interface on a terminal according to an embodiment of this application.
Figure 25:
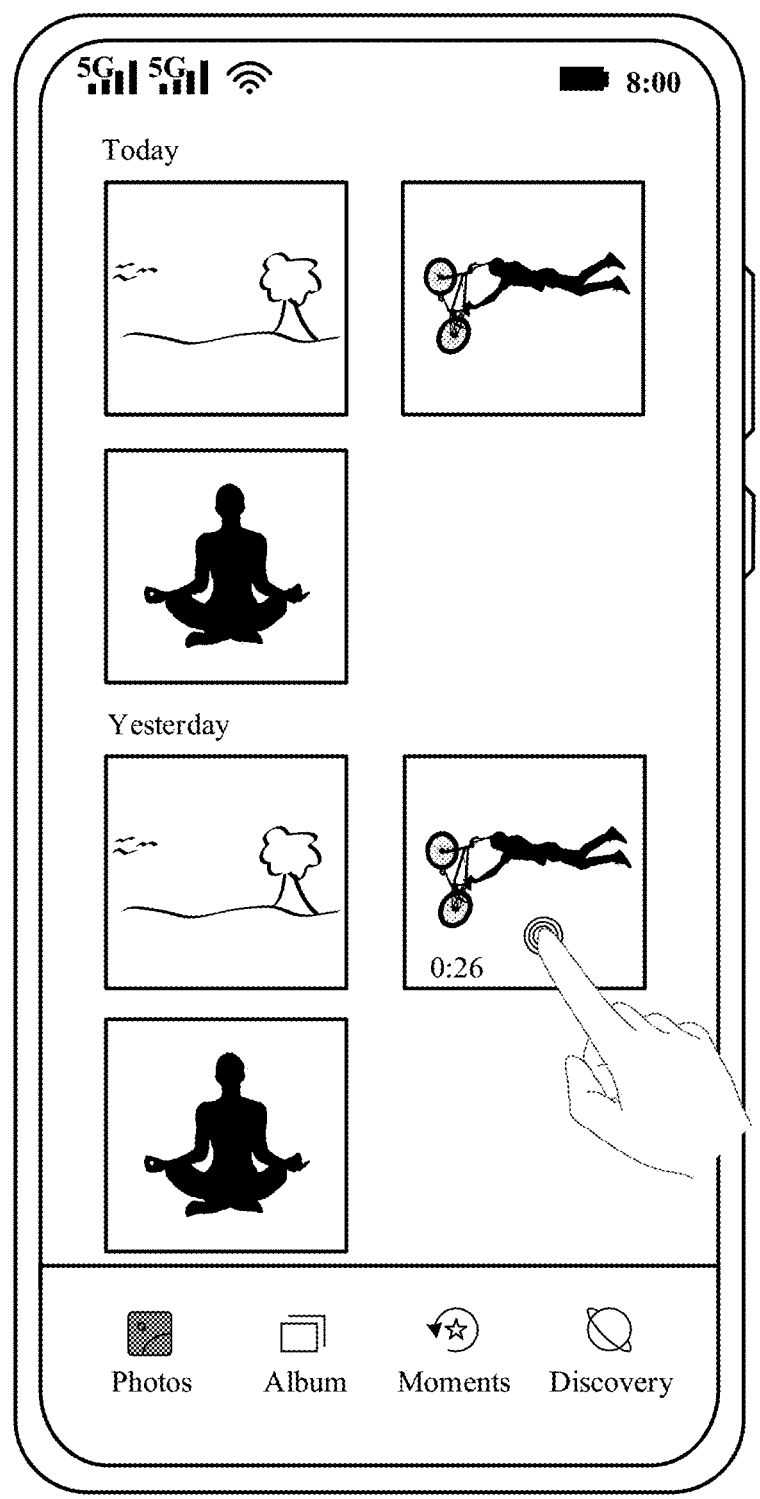
FIG. 25 is a schematic diagram of an interface on a terminal according to an embodiment of this application.
Figure 26:
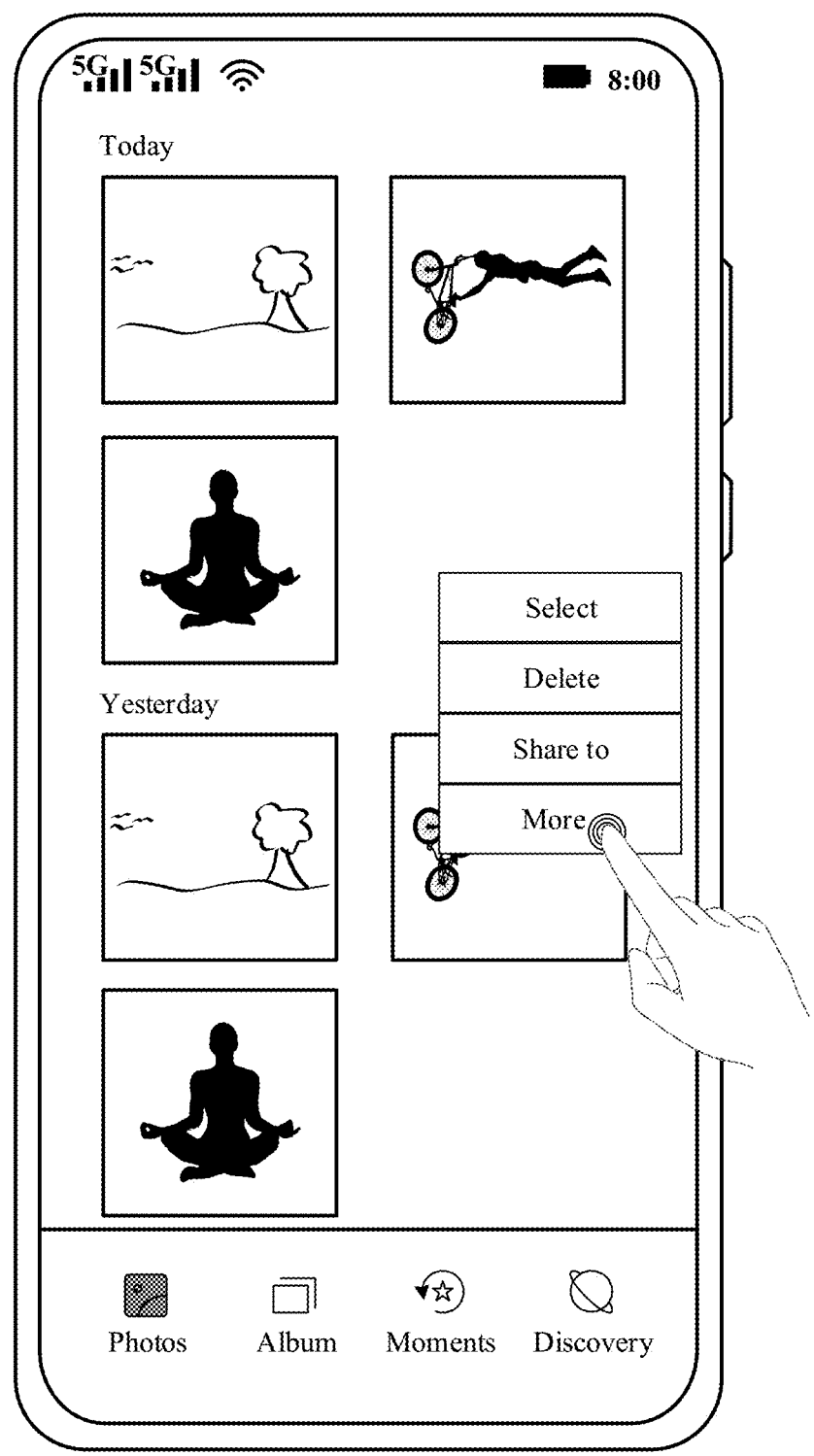
FIG. 26 is a schematic diagram of an interface on a terminal according to an embodiment of this application.

A user may click an application icon "Gallery" on a home screen (for example, as shown in FIG. 24b) on a mobile phone to indicate the mobile phone to start a gallery application, and the mobile phone may display an application interface as shown in FIG. 25. The user may long press a selected video. The terminal device may obtain, in response to the long press operation of the user, the video that is stored in an album and selected by the user, and display an interface as shown in FIG. 26. A control for selection (including a control "Select", a control "Delete", a control "Share to", and a control "More") may be included in the interface.

2402: Enable a stabilization function and a perspective distortion correction function.

Figure 27:
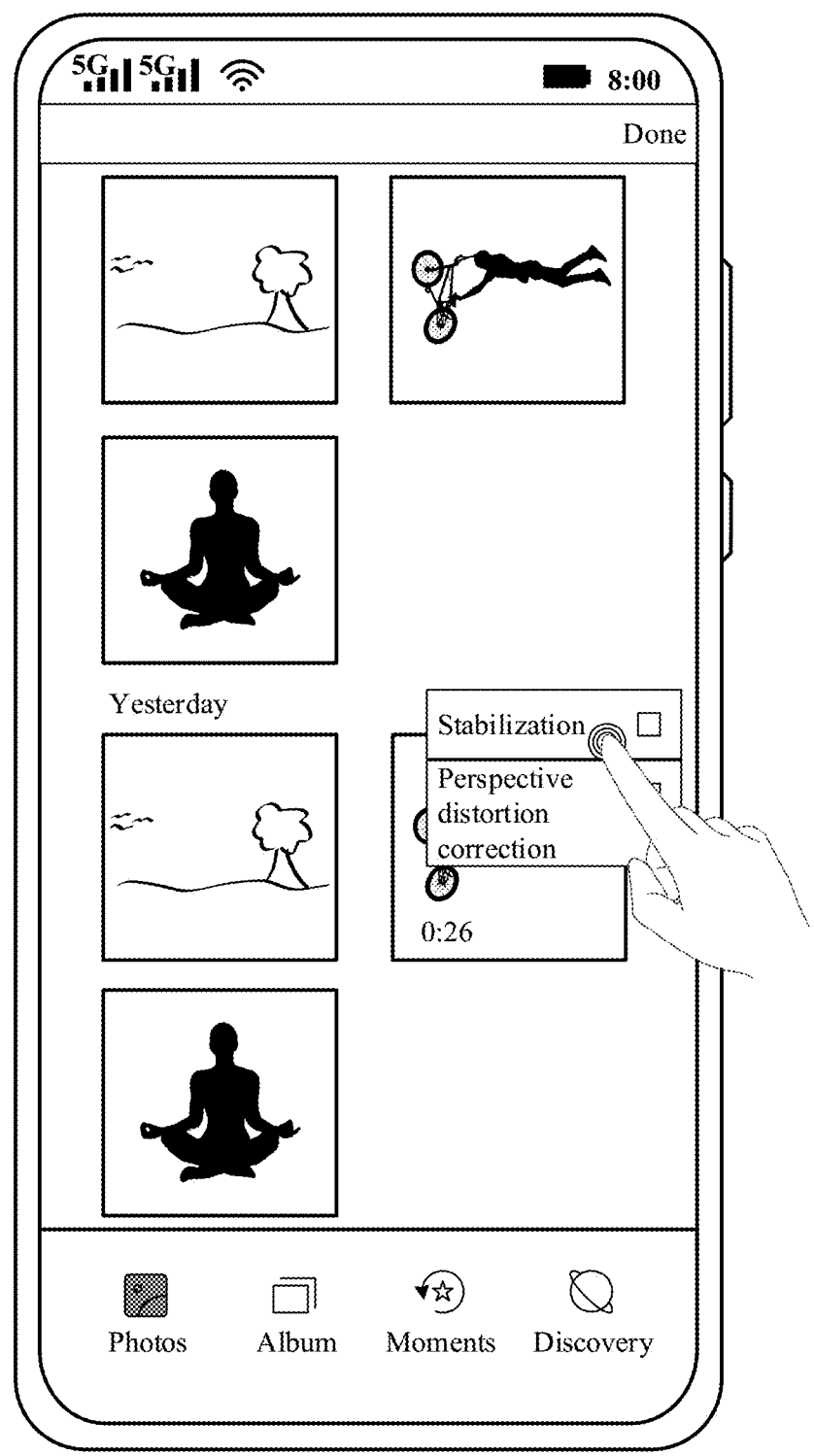
FIG. 27 is a schematic diagram of an interface on a terminal according to an embodiment of this application.
Figure 28:
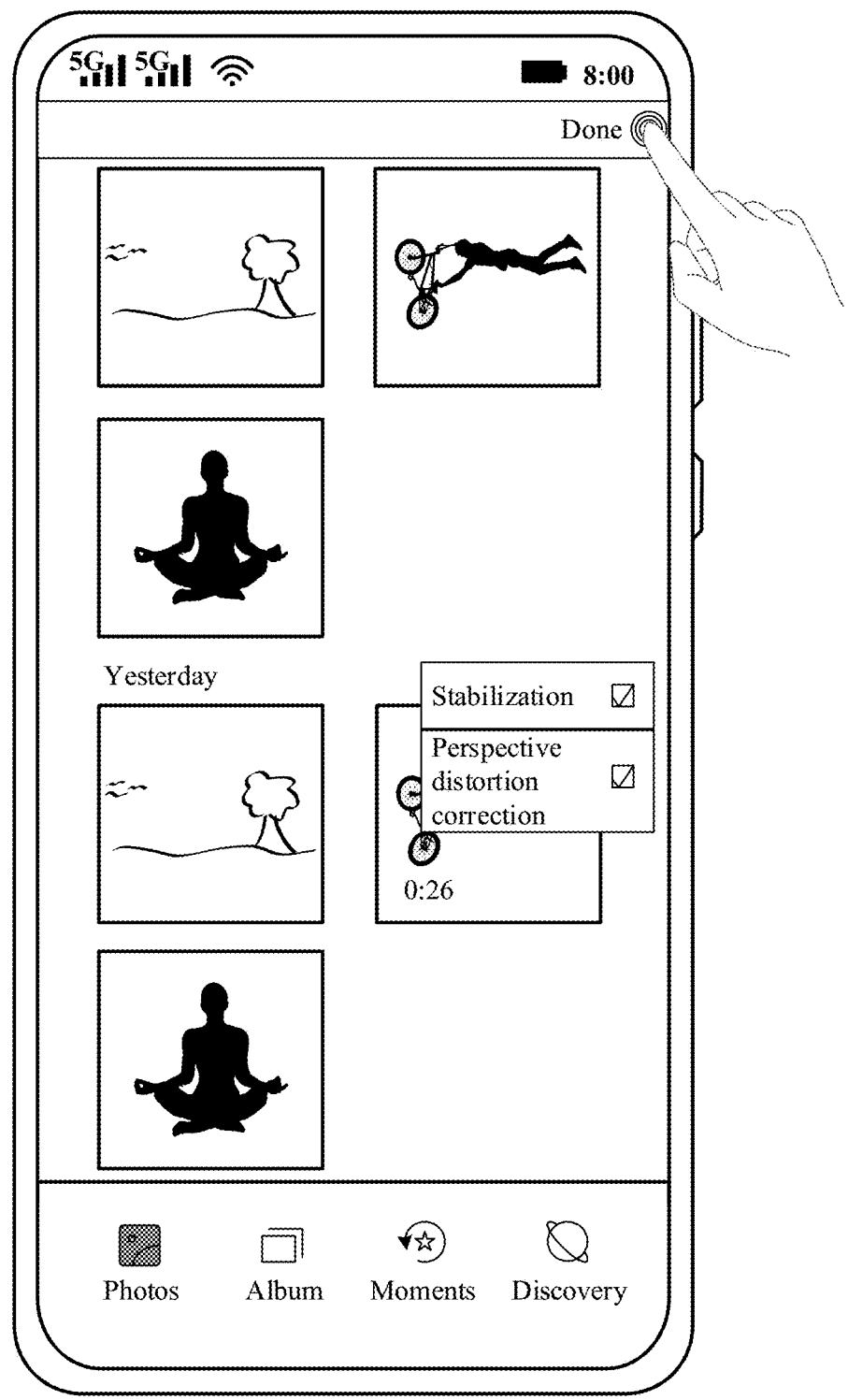
FIG. 28 is a schematic diagram of an interface on a terminal according to an embodiment of this application.

The user may click the control "More", and an interface as shown in FIG. 27 is displayed in response to the clicking operation of the user. A control for selection (including a control "Stabilization" and a control "Video distortion correction") may be included in the interface. The user may click the control "Stabilization" and the control "Video distortion correction", and click a control "Done" as shown in FIG. 28.

2403: Perform stabilization on the first image to obtain a first cropped area.

2404: Perform perspective distortion correction on the first cropped area to obtain a third cropped area.

2405: Obtain a third image based on the first image and the third cropped area.

2406: Perform stabilization on the second image to obtain a second cropped area, where the second cropped area is related to the first cropped area and shake information, and the shake information indicates a shake that occurs in a process in which the terminal acquires the first image and the second image.

It should be understood that the shake information herein may be obtained and stored in real time when the terminal acquires the video.

2407: Perform perspective distortion correction on the second cropped area to obtain a fourth cropped area.

2408: Obtain a fourth image based on the second image and the fourth cropped area.

2409: Generate a target video based on the third image and the fourth image.

Figure 29:
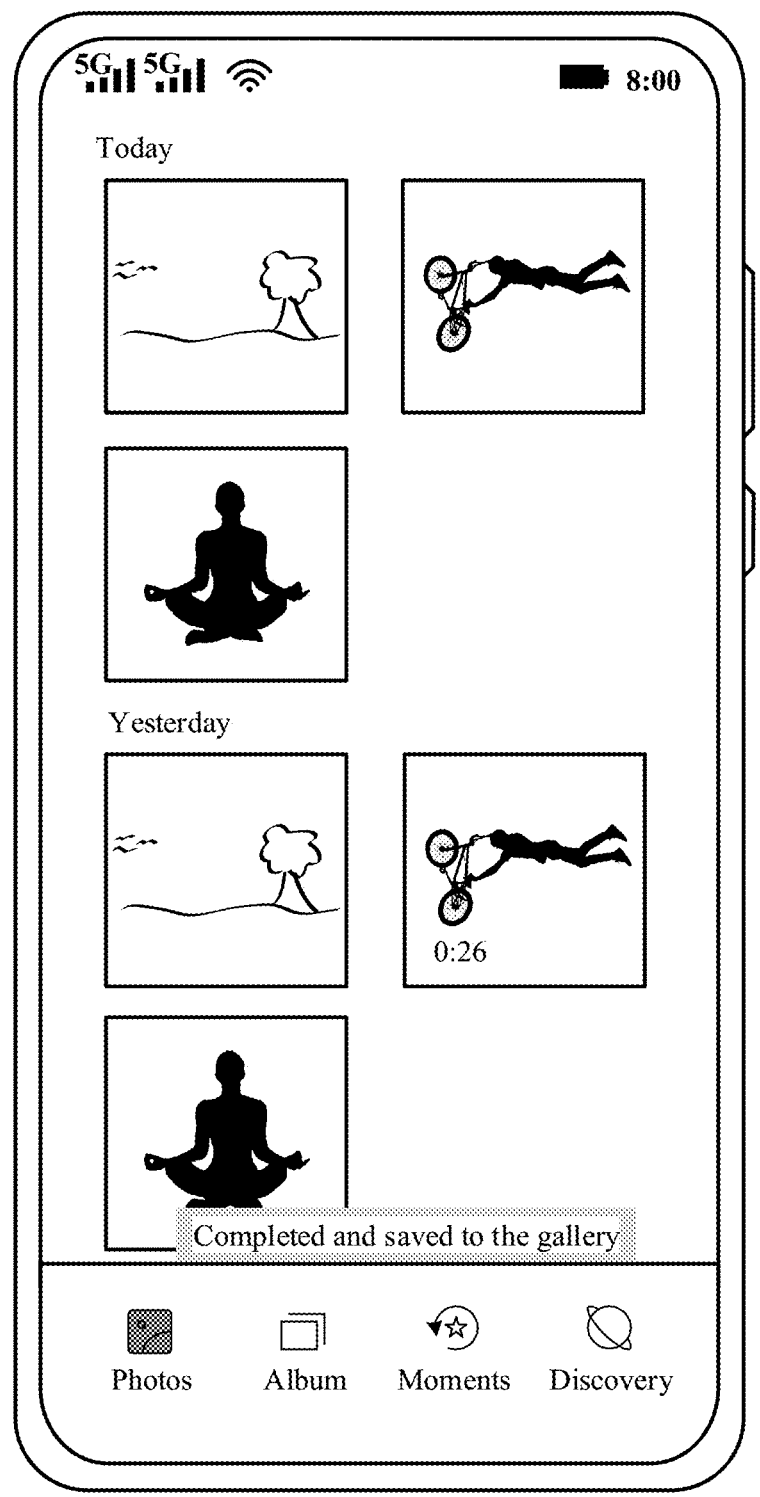
FIG. 29 is a schematic diagram of an interface on a terminal according to an embodiment of this application.

The terminal device may perform stabilization and perspective distortion correction on the selected video. For detailed descriptions about operation 2403 to operation 2408, refer to the descriptions in the embodiment corresponding to FIG. 3. Details are not described herein again. After stabilization and perspective distortion correction are completed, the terminal device may display an interface as shown in FIG. 29 to prompt the user that stabilization and perspective distortion correction are completed.

Example 3: Target Tracking

Figure 30:
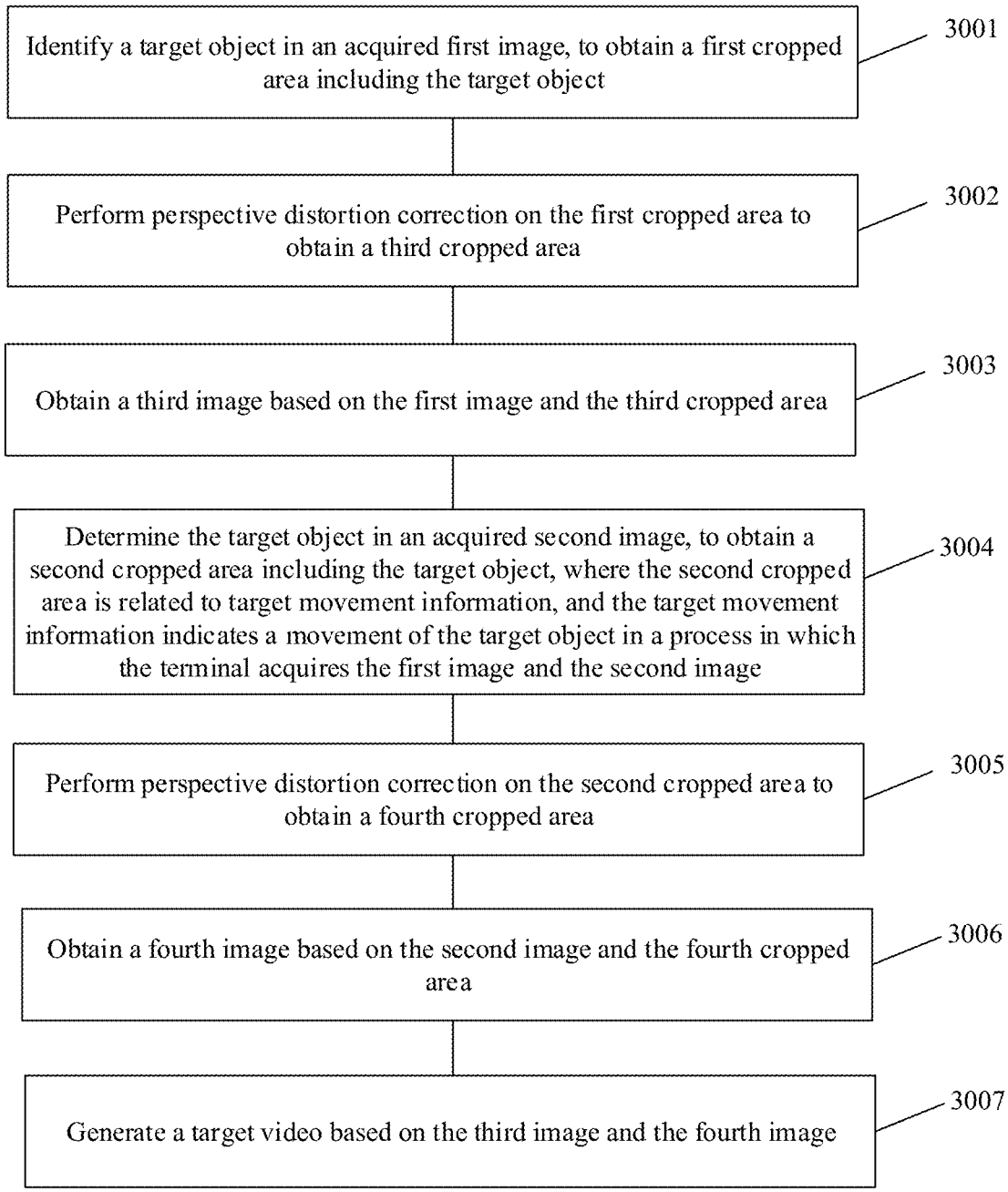
FIG. 30 is a schematic diagram of an embodiment of an image display method according to an embodiment of this application.

Refer to FIG. 30. FIG. 30 is a schematic flowchart of an image processing method provided in an embodiment of this application. As shown in FIG. 30, the image processing method provided in this embodiment of this application includes the following operations.

3001: Determine a target object in an acquired first image, to obtain a first cropped area including the target object.

In some scenarios, a camera may enable an object tracking function. The function can ensure that a terminal device outputs, when a posture remains unchanged, an image including the moving target object. For example, a tracked object is a human object. In an embodiment, when the camera is in a wide-angle photographing mode or an ultra-wide-angle photographing mode, a coverage area of an obtained original image is large, and the original image includes a target human object. An area in which the human object is located can be identified, and the original image is cropped and zoomed in, to obtain a cropped area including the human object. The cropped area is a part of the original image. When the human object moves and does not go beyond a photographing range of the camera, the human object may be tracked, an area in which the human object is located is obtained in real time, and the original image is cropped and zoomed in, to obtain the cropped area including the human object. In this way, the terminal device may also output, when a posture remains unchanged, an image including the moving human object.

Figure 31:
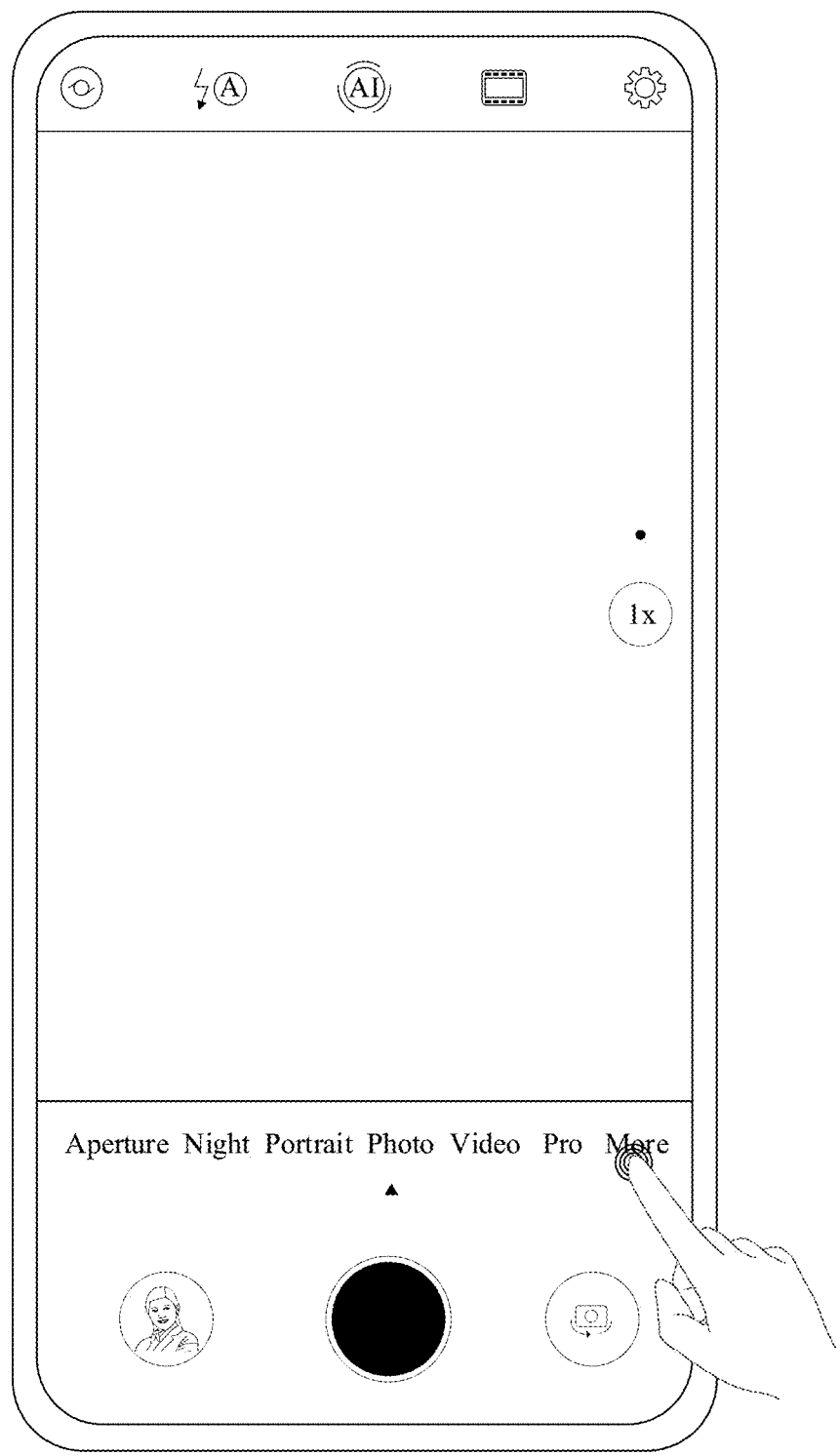
FIG. 31 is a schematic diagram of an interface on a terminal according to an embodiment of this application.
Figure 32:
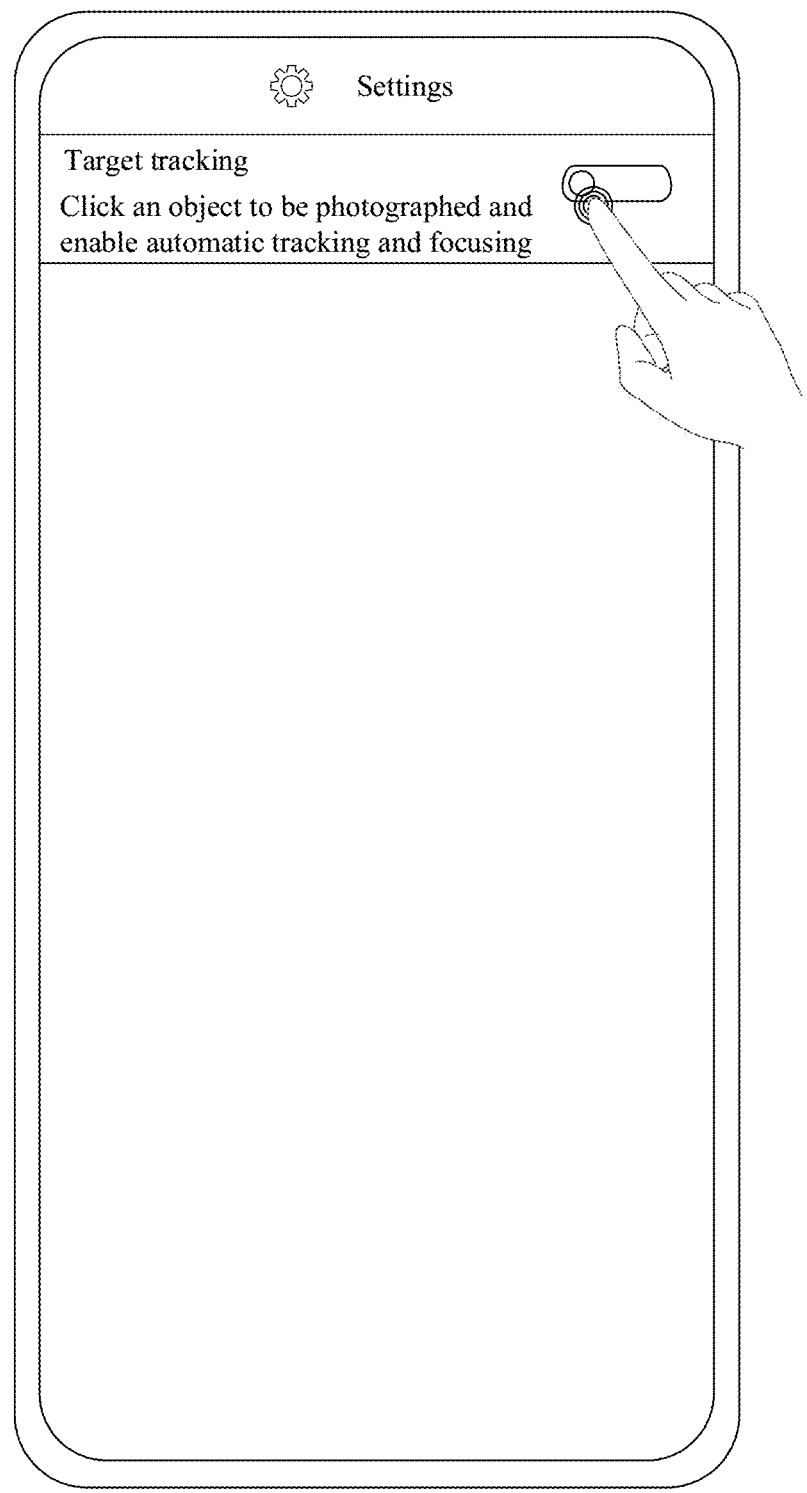
FIG. 32 is a schematic diagram of an interface on a terminal according to an embodiment of this application.

In an embodiment, refer to FIG. 31. A control "More" may be included in a photographing interface on the camera. A user may click the control "More", and in response to the clicking operation of the user, an application interface as shown in FIG. 32 may be displayed. A control for indicating the user to enable target tracking may be included in the interface, and the user may click the control to enable a target tracking function of the camera.

Similar to stabilization described above, in an existing embodiment, to perform stabilization and perspective distortion correction on an image at a same time, a cropped area including a human object needs to be confirmed in an original image, and perspective distortion correction needs to be performed on all areas of the original image. In this case, it is equivalent to that perspective distortion correction is performed on the cropped area including the human object, and the cropped area on which perspective distortion correction is performed is output. However, the foregoing manner has the following problems: As when a target object moves, positions, of cropped areas including a human object, in a former image frame and a latter image frame, are different, and as a result, shifts for perspective distortion correction on position points or pixels in two image frames to be output are different. Because outputs of stabilization on two adjacent frames are images that include same or basically same content, degrees of transformation of a same object in the images are different, that is, inter-frame consistency is lost, the jello (Jello) phenomenon occurs, and quality of a video output is reduced.

3002: Perform perspective distortion correction on the first cropped area to obtain a third cropped area.

In this embodiment, different from performing perspective distortion correction on all areas of an original image according to an existing embodiment, in this embodiment of this application, perspective distortion correction is performed on a cropped area. Because the target object moves, positions, of cropped areas including a target object, in a former image frame and a latter image frame are different, shifts for perspective distortion correction on position points or pixels in two output image frames are different. However, sizes of the cropped areas, of the two frames, determined after target identification is performed are the same. Therefore, if perspective distortion correction is performed on each of the cropped areas, degrees of perspective distortion correction performed on adjacent frames are the same (because distances between each position point or pixel in the cropped area of each of the two frames and a center point of each of the cropped areas are the same). In addition, because the cropped areas of the two adjacent frames are images that include same or basically same content, and degrees of transformation of a same object in the cropped areas are the same, that is, inter-frame consistency is kept, an obvious jello (Jello) phenomenon does not occur, thereby improving quality of a video output.

In this embodiment of this application, a same target object (for example, a human object) may be included in cropped areas of a former frame and a latter frame. Because an object for perspective distortion correction is a cropped area, for the target object, a difference between shapes of the transformed target object in outputs of perspective distortion correction in the former frame and the latter frame is tiny. In an embodiment, the difference may be within a preset range. The preset range may be understood as that it is difficult to identify a shape difference from naked eyes of a human, or it is difficult to find a jello phenomenon between the former frame and the latter frame from naked eyes of a human.

In an embodiment, a second control is included in the photographing interface on the camera. The second control is used to indicate to enable perspective distortion correction; receive a second operation of the user on the second control; and perform perspective distortion correction on the cropped areas in response to the second operation.

For more detailed descriptions about operation 3002, refer to the descriptions about operation 302 in the foregoing embodiment. Similar descriptions are not described herein again.

3003: Obtain a third image based on the first image and the third cropped area.

For detailed descriptions about operation 3003, refer to the descriptions about operation 303 in the foregoing embodiment. Details are not described herein again.

3004: Determine the target object in an acquired second image, to obtain a second cropped area including the target object, where the second cropped area is related to target movement information, and the target movement information indicates a movement of the target object in a process in which the terminal acquires the first image and the second image.

For detailed descriptions about operation 3004, refer to the descriptions about operation 301 in the foregoing embodiment. Similar descriptions are not described herein again.

3005: Perform perspective distortion correction on the second cropped area to obtain a fourth cropped area.

For detailed descriptions about operation 3005, refer to the descriptions about operation 305 in the foregoing embodiment. Similar descriptions are not described herein again. 3006: Obtain a fourth image based on the second image and the fourth cropped area.

3007: Generate a target video based on the third image and the fourth image.

For detailed descriptions about operation 3006, refer to the descriptions about operation 306 in the foregoing embodiment. Similar descriptions are not described herein again.

In an embodiment, a position, of the target object, in the second image is different from a position, of the target object, in the first image.

In an embodiment, before perspective distortion correction is performed on the first cropped area, the method further includes:

detecting that the terminal satisfies a distortion correction condition, and enabling a distortion correction function.

In an embodiment, detecting that the terminal satisfies the distortion correction condition includes, but is not limited to, one or more of the following cases: Case 1: It is detected that a zoom ratio of the terminal is less than a first preset threshold.

In an embodiment, whether perspective distortion correction is enabled may be determined based on the zoom ratio of the terminal. When the zoom ratio of the terminal is large (for example, within a full or partial zoom ratio range of a long-focus photographing mode, or within a full or partial zoom ratio range of a medium-focus photographing mode), a degree of perspective distortion in a picture of an image acquired by the terminal is low. That the degree of perspective distortion is low may be understood as that human eyes almost cannot identify any perspective distortion in the picture of the image acquired by the terminal. Therefore, when the zoom ratio of the terminal is large, perspective distortion correction does not need to be enabled.

In an embodiment, when the zoom ratio ranges from a to 1, the terminal acquires a video stream in real time by using a front-facing wide-angle camera or a rear-facing wide-angle camera, where the first preset threshold is greater than 1, a is a fixed zoom ratio of the front-facing wide-angle camera or the rear-facing wide-angle camera, and a value of a ranges from 0.5 to 0.9; or when the zoom ratio ranges from 1 to b, the terminal acquires a video stream in real time by using a rear-facing main camera, where b is a fixed zoom ratio of a rear-facing long-focus camera on the terminal or a maximum zoom of the terminal, the first preset threshold ranges from 1 to 15, and a value of b ranges from 3 to 15.

Case 2: A first enabling operation of a user for enabling the perspective distortion correction function is detected.

In an embodiment, the first enabling operation includes a first operation on a first control in a photographing interface on the terminal, the first control is used to indicate to enable or disable perspective distortion correction, and the first operation is used to indicate to enable perspective distortion correction.

In an embodiment, a control (referred to as the first control in this embodiment of this application) used to indicate to enable or disable perspective distortion correction may be included in the photographing interface. The user may trigger to enable perspective distortion correction through the first operation on the first control, that is, enable perspective distortion correction through the first operation on the first control. In this way, the terminal may detect the first enabling operation of the user for enabling perspective distortion correction, and the first enabling operation includes the first operation on the first control in the photographing interface on the terminal.

In an embodiment, the control (referred to as the first control in this embodiment of this application) used to indicate to enable or disable perspective distortion correction is displayed in the photographing interface only when it is detected that the zoom ratio of the terminal is less than the first preset threshold.

Case 3: A human face in a photographing scenario is identified;

a human face in a photographing scenario is identified, where a distance between the human face and the terminal is less than a preset value; or a human face in a photographing scenario is identified, where a proportion of pixels occupied by the human face in an image corresponding to the photographing scenario is greater than a preset proportion.

It should be understood that, when there is a human face in the photographing scenario, because a degree of transformation of the human face due to perspective distortion correction is more visually obvious, and when a distance between the human face and the terminal is smaller or a proportion of pixels occupied by the human face in an image corresponding to the photographing scenario is greater, a size of the human face in the image is larger, the degree of transformation of the human face due to perspective distortion correction is even more visually obvious. Therefore, perspective distortion correction needs to be enabled in the foregoing scenario. In this embodiment, whether to enable perspective distortion correction is determined by determining the foregoing condition related to a human face in a photographing scenario, so that a photographing scenario in which perspective distortion occurs can be accurately determined, and perspective distortion correction is performed for the photographing scenario in which perspective distortion occurs. Perspective distortion correction is not performed in a photographing scenario in which perspective distortion does not occur. In this way, an image signal is processed accurately, and power consumption is reduced.

This embodiment of this application provides the image processing method, including: determining a target object in an acquired first image, to obtain a first cropped area including the target object; performing perspective distortion correction on the first cropped area to obtain a third cropped area; obtaining a third image based on the first image and the third cropped area; determining the target object in an acquired second image, to obtain a second cropped area including the target object, where the second cropped area is related to target movement information, and the target movement information indicates a movement of the target object in a process in which the terminal acquires the first image and the second image; performing perspective distortion correction on the second cropped area to obtain a fourth cropped area; and obtaining a fourth image based on the second image and the fourth cropped area, where the third image and the fourth image are used for generating a video, and the first image and the second image are a pair of original images that are acquired by the terminal and that are adjacent to each other in time domain. Different from performing perspective distortion correction on all areas of an original image according to an existing embodiment, in this embodiment of this application, perspective distortion correction is performed on a cropped area. Because the target object moves, positions, of cropped areas including a human object, in a former image frame and a latter image frame are different, shifts for perspective distortion correction on position points or pixels in two output image frames are different. However, sizes of the cropped areas, of the two frames, determined after target identification is performed are the same. Therefore, if perspective distortion correction is performed on each of the cropped areas, a degree of perspective distortion correction performed on an adjacent frame is the same (because distances between each position point or pixel in the cropped area of each of the two frames and a center point of the cropped area are the same). In addition, because the cropped areas of the two adjacent frames are images that include same or basically same content, and degrees of transformation of a same object in the images are the same, that is, inter-frame consistency is kept, an obvious jello (Jello) phenomenon does not occur, thereby improving quality of a video output.

Figure 33:
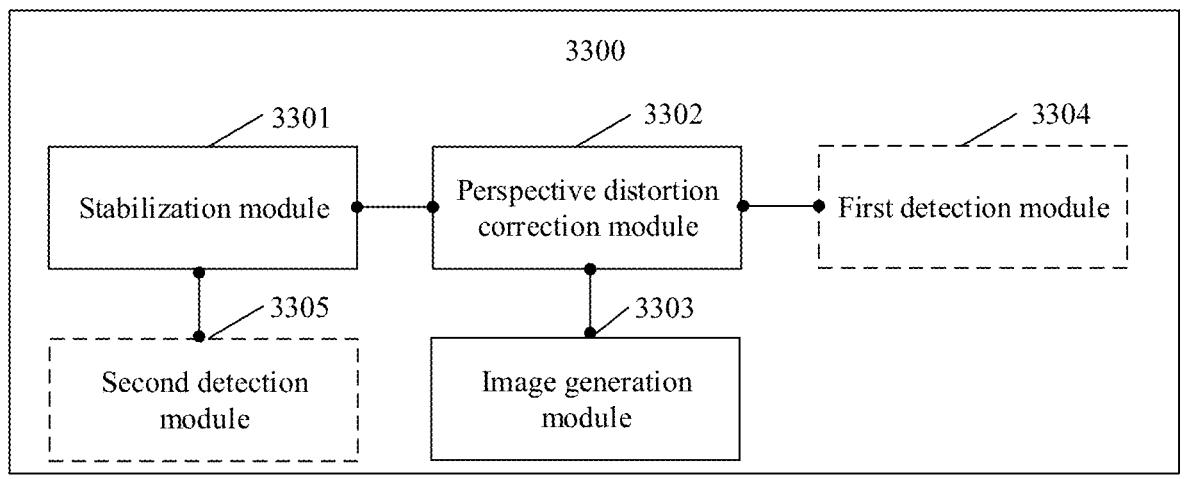
FIG. 33 is a schematic diagram of a structure of an image display apparatus according to an embodiment of this application.

This application further provides an image display apparatus. The image display apparatus may be a terminal device. Refer to FIG. 33. FIG. 33 is a schematic diagram of a structure of an image processing apparatus according to an embodiment of this application. As shown in FIG. 33, the image processing apparatus 3300 includes:

a stabilization module 3301, configured to perform stabilization on an acquired first image to obtain a first cropped area, and further configured to perform stabilization on an acquired second image to obtain a second cropped area, where the second cropped area is related to the first cropped area and shake information, and the shake information indicates a shake that occurs in a process in which the terminal acquires the first image and the second image, and the first image and the second image are a pair of original images that are acquired by the terminal and that are adjacent to each other in time domain.

For detailed descriptions about the stabilization module 3301, refer to the descriptions about operation 301 and operation 304. Details are not described herein again.

The image processing apparatus further includes a perspective distortion correction module 3302, configured to perform perspective distortion correction on the first cropped area to obtain a third cropped area, and further configured to perform perspective distortion correction on the second cropped area to obtain a fourth cropped area.

For detailed descriptions about the perspective distortion correction module 3302, refer to the descriptions about operation 302 and operation 305. Details are not described herein again.

The image processing apparatus further includes an image generation module 3303, configured to: obtain a third image based on the first image and the third cropped area; obtain a fourth image based on the second image and the fourth cropped area; and generate a target video based on the third image and the fourth image.

For detailed descriptions about the image generation module 3303, refer to the descriptions about operation 303, operation 306, and operation 307. Details are not described herein again.

In an embodiment, a direction of an offset of a position of the second cropped area in the second image relative to a position of the first cropped area in the first image is opposite to a shake direction, on an image plane, of the shake that occurs in the process in which the terminal acquires the first image and the second image.

In an embodiment, the first cropped area indicates a first sub-area in the first image, and the second cropped area indicates a second sub-area in the second image.

A similarity between first image content, in the first image, corresponding to the first sub-area and second image content, in the second image, corresponding to the second sub-area is greater than a similarity between the first image and the second image.

In an embodiment, the apparatus further includes:
a first detection module 3304, configured to: before the stabilization module performs stabilization on the acquired first image, detect that the terminal satisfies a distortion correction condition, and enable a distortion correction function.

In an embodiment, detecting that the terminal satisfies the distortion correction condition includes, but is not limited to:
detecting that a zoom ratio of the terminal is less than a first preset threshold.

In an embodiment, when the zoom ratio ranges from a to 1, the terminal acquires a video stream in real time by using a front-facing wide-angle camera or a rear-facing wide-angle camera, where the first preset threshold is greater than 1, a is a fixed zoom ratio of the front-facing wide-angle camera or the rear-facing wide-angle camera, and a value of a ranges from 0.5 to 0.9; or
when the zoom ratio ranges from 1 to b, the terminal acquires a video stream in real time by using a rear-facing main camera, where b is a fixed zoom ratio of a rear-facing long-focus camera on the terminal or a maximum zoom of the terminal, the first preset threshold ranges from 1 to 15, and a value of b ranges from 3 to 15.

In an embodiment, detecting that the terminal satisfies the distortion correction condition includes, but is not limited to:
detecting a first enabling operation of a user for enabling the perspective distortion correction function, where the first enabling operation includes a first operation on a first control in a photographing interface on the terminal, the first control is used to indicate to enable or disable perspective distortion correction, and the first operation is used to indicate to enable perspective distortion correction.

In an embodiment, detecting that the terminal satisfies the distortion correction condition includes, but is not limited to:
identifying a human face in a photographing scenario;
identifying a human face in a photographing scenario, where a distance between the human face and the terminal is less than a preset value; or
identifying a human face in a photographing scenario, where a proportion of pixels occupied by the human face in an image corresponding to the photographing scenario is greater than a preset proportion.

In an embodiment, the apparatus further includes:
a second detection module 3305, configured to: before the stabilization module performs stabilization on the acquired first image, detect that the terminal satisfies a stabilization condition, and enable a stabilization function.

In an embodiment, detecting that the terminal satisfies the stabilization condition includes, but is not limited to:
detecting that the zoom ratio of the terminal is greater than a fixed zoom ratio of a camera, on the terminal, with a smallest zoom ratio.

In an embodiment, detecting that the terminal satisfies the stabilization condition includes, but is not limited to:
detecting a second enabling operation of the user for enabling the stabilization function, where the second enabling operation includes a second operation on a second control in the photographing interface on the terminal, the second control is used to indicate to enable or disable the stabilization function, and the second operation is used to indicate to enable the stabilization function.

In an embodiment, the image generation module is configured to: obtain a first mapping relationship and a second mapping relationship, where the first mapping relationship indicates a mapping relationship between each position point in the second cropped area and a corresponding position point in the second image, and the second mapping relationship indicates a mapping relationship between each position point in the fourth cropped area and a corresponding position point in the second cropped area; and
obtain the fourth image based on the second image, the first mapping relationship, and the second mapping relationship.

In an embodiment, the image generation module is configured to: couple the first mapping relationship to the second mapping relationship, to determine a target mapping relationship, where the target mapping relationship includes a mapping relationship between each position point in the fourth cropped area and a corresponding position point in the second image; and
determine the fourth image based on the second image and the target mapping relationship.

In an embodiment, the first mapping relationship is different from the second mapping relationship.

In an embodiment, the perspective distortion correction module is configured to:
perform optical distortion correction on the first cropped area to obtain a corrected first cropped area; and perform perspective distortion correction on the corrected first cropped area;
the image generation module is configured to: perform optical distortion correction on the third cropped area to obtain a corrected third cropped area; and obtain the third image based on the first image and the corrected third cropped area;
the perspective distortion correction module is configured to: perform optical distortion correction on the second cropped area to obtain a corrected second cropped area; and perform perspective distortion correction on the corrected second cropped area; or
the image generation module is configured to: perform optical distortion correction on the fourth cropped area to obtain a corrected fourth cropped area; and obtain the fourth image based on the second image and the corrected fourth cropped area.

This embodiment of this application provides the image processing apparatus. The apparatus is used by a terminal to acquire a video stream in real time. The apparatus includes: a stabilization module, configured to perform stabilization on an acquired first image to obtain a first cropped area, and further configured to perform stabilization on an acquired second image to obtain a second cropped area, where the second cropped area is related to the first cropped area and shake information, and the shake information indicates a shake that occurs in a process in which the terminal acquires the first image and the second image, and the first image and the second image are a pair of original images that are acquired by the terminal and that are adjacent to each other in time domain; a perspective distortion correction module, configured to perform perspective distortion correction on the first cropped area to obtain a third cropped area, and further configured to perform perspective distortion correction on the second cropped area to obtain a fourth cropped area; and an image generation module, configured to obtain a third image based on the first image and the third cropped area, and further configured to: obtain a fourth image based on the second image and the fourth cropped area, and generate a target video based on the third image and the fourth image. In addition, because outputs of stabilization on two adjacent frames are images that include same or basically same content, and degrees of transformation of a same object in the images are the same, that is, inter-frame consistency is kept, an obvious jello phenomenon does not occur, thereby improving quality of video display.

Figure 34:
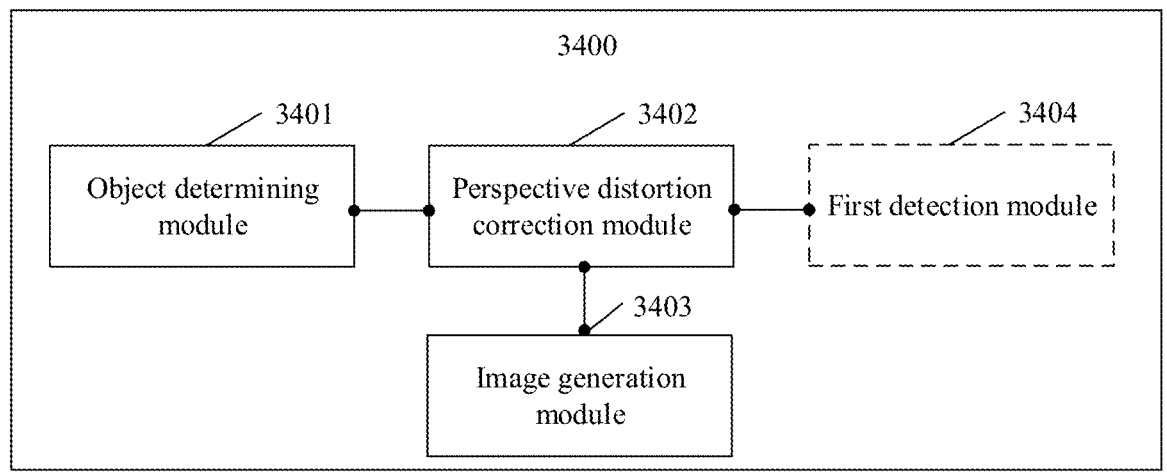
FIG. 34 is a schematic diagram of a structure of an image display apparatus according to an embodiment of this application.

This application further provides an image processing apparatus. The image display apparatus may be a terminal device. Refer to FIG. 34. FIG. 34 is a schematic diagram of a structure of an image processing apparatus according to an embodiment of this application. As shown in FIG. 34, the image processing apparatus 3400 includes:
an object determining module 3401, configured to determine a target object in an acquired first image, to obtain a first cropped area including the target object, and further configured to determine the target object in an acquired second image, to obtain a second cropped area including the target object, where the second cropped area is related to target movement information, the target movement information indicates a movement of the target object in a process in which the terminal acquires the first image and the second image, and the first image and the second image are a pair of original images that are acquired by the terminal and that are adjacent to each other in time domain.

For detailed descriptions about the object determining module 3401, refer to the descriptions about operation 3001 and operation 3004. Details are not described herein again.

The apparatus further includes a perspective distortion correction module 3402, configured to perform perspective distortion correction on the first cropped area to obtain a third cropped area, and further configured to perform perspective distortion correction on the second cropped area to obtain a fourth cropped area.

For detailed descriptions about the perspective distortion correction module 3402, refer to the descriptions about operation 3002 and operation 3005. Details are not described herein again.

The apparatus further includes an image generation module 3403, configured to: obtain a third image based on the first image and the third cropped area; obtain a fourth image based on the second image and the fourth cropped area; and generate a target video based on the third image and the fourth image.

For detailed descriptions about the image generation module 3403, refer to the descriptions about operation 3003, operation 3006, and operation 3007. Details are not described herein again.

In an embodiment, a position, of the target object, in the second image is different from a position, of the target object, in the first image.

In an embodiment, the apparatus further includes:
a first detection module 3404, configured to: before the perspective distortion correction module performs perspective distortion correction on the first cropped area, detect that the terminal satisfies a distortion correction condition, and enable a distortion correction function.

In an embodiment, detecting that the terminal satisfies the distortion correction condition includes, but is not limited to:
detecting that a zoom ratio of the terminal is less than a first preset threshold.

In an embodiment, when the zoom ratio ranges from a to 1, the terminal acquires a video stream in real time by using a front-facing wide-angle camera or a rear-facing wide-angle camera, where the first preset threshold is greater than 1, a is a fixed zoom ratio of the front-facing wide-angle camera or the rear-facing wide-angle camera, and a value of a ranges from 0.5 to 0.9; or
when the zoom ratio ranges from 1 to b, the terminal acquires a video stream in real time by using a rear-facing main camera, where b is a fixed zoom ratio of a rear-facing long-focus camera on the terminal or a maximum zoom of the terminal, the first preset threshold ranges from 1 to 15, and a value of b ranges from 3 to 15.

In an embodiment, detecting that the terminal satisfies the distortion correction condition includes, but is not limited to:
detecting a first enabling operation of a user for enabling the perspective distortion correction function, where the first enabling operation includes a first operation on a first control in a photographing interface on the terminal, the first control is used to indicate to enable or disable perspective distortion correction, and the first operation is used to indicate to enable perspective distortion correction.

In an embodiment, detecting that the terminal satisfies the distortion correction condition includes, but is not limited to:
identifying a human face in a photographing scenario;

identifying a human face in a photographing scenario, where a distance between the human face and the terminal is less than a preset value; or identifying a human face in a photographing scenario, where a proportion of pixels occupied by the human face in an image corresponding to the photographing scenario is greater than a preset proportion.

This embodiment of this application provides the image processing apparatus. The apparatus is used by a terminal to acquire a video stream in real time. The apparatus includes: an object determining module, configured to determine a target object in an acquired first image, to obtain a first cropped area including the target object, and further configured to determine the target object in an acquired second image, to obtain a second cropped area including the target object, where the second cropped area is related to target movement information, the target movement information indicates a movement of the target object in a process in which the terminal acquires the first image and the second image, and the first image and the second image are a pair of original images that are acquired by the terminal and that are adjacent to each other in time domain; a perspective distortion correction module, configured to perform perspective distortion correction on the first cropped area to obtain a third cropped area, and further configured to perform perspective distortion correction on the second cropped area to obtain a fourth cropped area; and an image generation module, configured to obtain a third image based on the first image and the third cropped area, and further configured to: obtain a fourth image based on the second image and the fourth cropped area, and generate a target video based on the third image and the fourth image.

Different from performing perspective distortion correction on all areas of an original image according to an existing embodiment, in this embodiment of this application, perspective distortion correction is performed on a cropped area. Because the target object moves, positions, of cropped areas including a human object, in a former image frame and a latter image frame are different, shifts for perspective distortion correction on position points or pixels in two output image frames are different. However, sizes of the cropped areas, of the two frames, determined after target identification is performed are the same. Therefore, if perspective distortion correction is performed on each of the cropped areas, a degree of perspective distortion correction performed on an adjacent frame is the same (because distances between each position point or pixel in the cropped area of each of the two frames and a center point of the cropped area are the same). In addition, because the cropped areas of the two adjacent frames are images that include same or basically same content, and degrees of transformation of a same object in the images are the same, that is, inter-frame consistency is kept, an obvious jello phenomenon does not occur, thereby improving quality of a video output.

Figure 35:
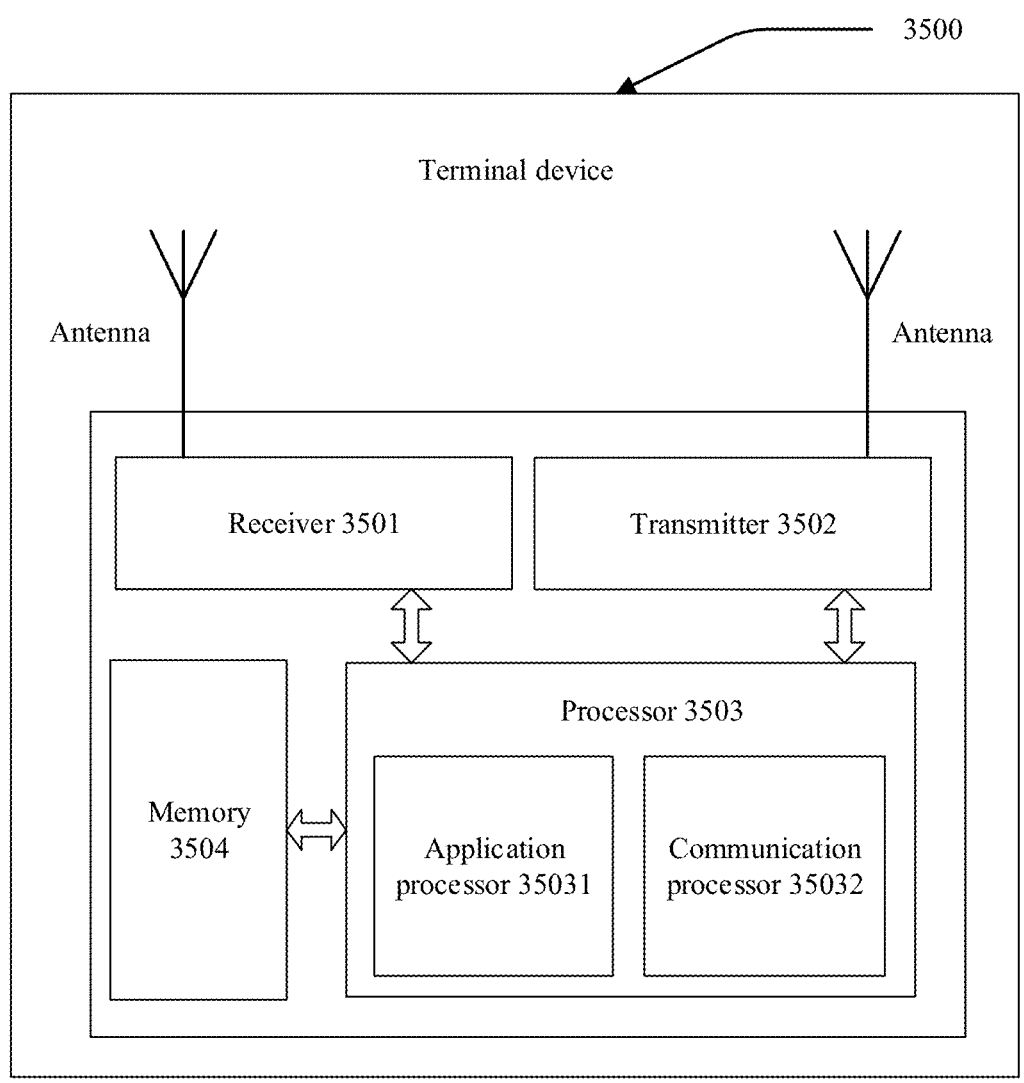
FIG. 35 is a schematic diagram of a structure of a terminal device according to an embodiment of this application.

A terminal device according to an embodiment of this application is described below. The terminal device may be the image processing apparatus in FIG. 33 or FIG. 34. Refer to FIG. FIG. 35 is a schematic diagram of a structure of a terminal device according to an embodiment of this application. The terminal device 3500 may be represented as a virtual reality VR device, a mobile phone, a tablet, a laptop computer, an intelligent wearable device, or the like. This is not limited herein. In an embodiment, the terminal device 3500 includes a receiver 3501, a transmitter 3502, a processor 3503, and a memory 3504 (there may be one or more processors 3503 in the terminal device 3500, and one processor is used as an example in FIG. 35). The processor 3503 may include an application processor 35031 and a communication processor 35032. In some embodiments, the receiver 3501, the transmitter 3502, the processor 3503, and the memory 3504 may be connected through a bus or in another manner.

The memory 3504 may include a read-only memory and a random access memory and provide instructions and data for the processor 3503. A part of the memory 3504 may further include a non-volatile random access memory (NVRAM). The memory 3504 stores a processor and operation instructions, an executable module or a data structure, a subset thereof, or an extended set thereof. The operation instructions may include various operation instructions for implementing various operations.

The processor 3503 controls an operation of the terminal device. In specific application, components of the terminal device are coupled to each other by using a bus system. In addition to a data bus, the bus system may further include a power bus, a control bus, a status signal bus, and the like. However, for clearer description, various types of buses in the figure are referred to as the bus system.

The method disclosed in the foregoing embodiments of this application may be applied to the processor 3503, or may be implemented by using the processor 3503. The processor 3503 may be an integrated circuit chip that has a signal processing capability. During implementation, the operations in the foregoing method may be implemented by using a hardware integrated logic circuit in the processor 3503 or instructions in a form of software. The processor 3503 may be a general-purpose processor, a digital signal processor (digital signal processor, DSP), a microprocessor, or a microcontroller, and may further include an application-specific integrated circuit (ASIC), a field-programmable gate array (FPGA) or another programmable logic device, a discrete gate or transistor logic device, or a discrete hardware assembly. The processor 3503 may implement or perform the methods, operations, and logic block diagrams disclosed in embodiments of this application. The general-purpose processor may be a microprocessor, or the processor may be any conventional processor or the like. The operations in the method disclosed with reference to embodiments of this application may be directly presented as being performed and completed by a hardware decoding processor, or performed and completed by a combination of hardware and software modules in a decoding processor. The software module may be located in a mature storage medium in the art, for example, a random access memory, a flash memory, a read-only memory, a programmable read-only memory, an electrically erasable programmable memory, or a register. The storage medium is located in the memory 3504, and the processor 3503 reads information in the memory 3504 and completes the operations in the foregoing method in combination with hardware of the processor. In an embodiment, the processor 3503 may read the information in the memory 3504, and complete, in combination with hardware of the processor 3503, operations related to data processing in operation 301 to operation 304 in the foregoing embodiment and operations related to data processing in operation 3001 to operation 3004 in the foregoing embodiment.

The receiver 3501 may be configured to: receive input digital or character information, and generate signal input related to a setting related to and function control of the terminal device. The transmitter 3502 may be configured to output digital or character information through a first interface. The transmitter 3502 may be further configured to send instructions to a disk pack through the first interface, to modify data in the disk pack. The transmitter 3502 may further include a display device, for example, a display screen.

An embodiment of this application further provides a computer program product. When the computer program product runs on a computer, the computer is enabled to perform operations in the image processing method described in the embodiments corresponding to FIG. 5a, FIG. 24a, and FIG. 30 in the foregoing embodiments.

An embodiment of this application further provides a computer-readable storage medium. The computer-readable storage medium stores a program for signal processing. When the program is run on a computer, the computer is enabled to perform operations in the image processing method in the method embodiments described above.

The image display apparatus provided in this embodiment of this application may be a chip. The chip includes a processing unit and a communication unit. The processing unit may be, for example, a processor, and the communication unit may be, for example, an input/output interface, a pin, a circuit, or the like. The processing unit may execute computer-executable instructions stored in a storage unit, so that a chip in an execution device performs the data processing method described in the foregoing embodiments, or a chip in a training device performs the data processing method described in the foregoing embodiments. In an embodiment, the storage unit is a storage unit in the chip, for example, a register or a cache. The storage unit may alternatively be a storage unit that is in a wireless access device and that is outside the chip, for example, a read-only memory (ROM) or another type of static storage device that can store static information and instructions, or a random access memory (RAM).

In addition, it should be noted that the apparatus embodiments described above are merely an example. The units described as separate parts may or may not be physically separate, and parts displayed as units may or may not be physical units, and may have one location, or may be distributed over a plurality of network units. All or some of the modules may be selected as actually required to achieve the objectives of the solutions of embodiments. In addition, in the accompanying drawings corresponding to the apparatus embodiments provided in this application, a connection relationship between modules indicates that the modules have a communication connection that may be implemented through one or more communication buses or signal wires.

Based on the descriptions in the foregoing embodiments, a person skilled in the art can clearly understand that this application may be implemented by using software in addition to necessary general-purpose hardware, or by using special-purpose hardware, including an application-specific integrated circuit, a dedicated CPU, a dedicated memory, a dedicated element or component, and the like. Usually, any function implemented by using a computer program can be easily implemented by using corresponding hardware. In addition, there may be various types of specific hardware structures used to implement a same function, for example, an analog circuit, a digital circuit, or a dedicated circuit. However, for this application, an implementation of a software program is a better implementation in most cases. Based on such an understanding, the technical solutions of this application essentially, or the part contributing to the prior art may be embodied in a form of a software product. The computer software product is stored in a readable storage medium, for example, a floppy disk, a USB flash drive, a removable hard disk, an ROM, a RAM, a magnetic disk, or an optical disc on a computer, and includes several instructions for enabling a computer device (that may be a personal computer, a server, a network device, or the like) to perform the method described in embodiments of this application.

All or some of the foregoing embodiments may be implemented by using software, hardware, firmware, or any combination thereof. When software is used for implementation, all or some of embodiments may be implemented in a form of a computer program product.

The computer program product includes one or more computer instructions. When the computer program instruction is loaded and executed on a computer, the procedures or functions according to embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, by using a coaxial cable, an optical fiber, or a digital subscriber line (DSL)) or wireless (for example, via infrared, radio, or microwaves) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, Solid-State Drive (SSD)), or the like.

What is claimed is:

1. An image processing method for acquiring video stream in real time, the image processing method comprising:
    performing stabilization on an acquired first image to obtain a first cropped area;
    performing perspective distortion correction on the first cropped area to obtain a third cropped area;
    obtaining a third image based on the first image and the third cropped area;
    performing stabilization on an acquired second image to obtain a second cropped area, wherein the second cropped area is related to the first cropped area and shake information, and the shake information indicates a shake that occurs in a process in which a terminal acquires the first image and the second image;
    performing perspective distortion correction on the second cropped area to obtain a fourth cropped area;
    obtaining a fourth image based on the second image and the fourth cropped area; and
    generating a target video based on the third image and the fourth image;
    wherein the first image and the second image are a pair of original images that are acquired by the terminal and are adjacent to each other in time domain.

2. The image processing method according to claim 1, wherein a direction of an offset of a position of the second cropped area relative to a position of the first cropped area in the first image is opposite to a shake direction, on an image plane, of the shake that occurs in the process in which the terminal acquires the first image and the second image.

3. The image processing method according to claim 1, wherein
the first cropped area indicates a first sub-area in the first image, and the second cropped area indicates a second sub-area in the second image; and
a similarity between first image content, in the first image, corresponding to the first sub-area and second image content, in the second image, corresponding to the second sub-area is greater than a similarity between the first image and the second image.

4. The image processing method according to claim 1, wherein before performing the perspective distortion correction on the first cropped area, the method further comprises:
detecting that the terminal satisfies a distortion correction condition, and enabling a distortion correction function.

5. The image processing method according to claim 4, wherein detecting that the terminal satisfies the distortion correction condition comprises:
detecting that a zoom ratio of the terminal is less than a first preset threshold.

6. The image processing method according to claim 5, wherein
when the zoom ratio ranges from a to 1, acquiring, by the terminal, a video stream in real time by using a front-facing wide-angle camera or a rear-facing wide-angle camera, wherein the first preset threshold is greater than 1, a is a fixed zoom ratio of the front-facing wide-angle camera or the rear-facing wide-angle camera, and a value of a ranges from 0.5 to 0.9; or
when the zoom ratio ranges from 1 to b, acquiring, by the terminal, a video stream in real time by using a rear-facing main camera, wherein b is a fixed zoom ratio of a rear-facing long-focus camera on the terminal or a maximum zoom of the terminal, the first preset threshold ranges from 1 to 15, and a value of b ranges from 3 to 15.

7. The image processing method according to claim 4, wherein detecting that the terminal satisfies the distortion correction condition comprises:
detecting a first enabling operation of a user for enabling the perspective distortion correction function, wherein the first enabling operation comprises a first operation on a first control in a photographing interface on the terminal, the first control is used to indicate to enable or disable perspective distortion correction, and the first operation is used to indicate to enable perspective distortion correction.

8. The image processing method according to claim 1, wherein before performing stabilization on the acquired first image, the method further comprises:
detecting that the terminal satisfies a stabilization condition, and enabling a stabilization function.

9. The image processing method according to claim 8, wherein detecting that the terminal satisfies the stabilization condition comprises:
detecting a second enabling operation of the user for enabling the stabilization function, wherein the second enabling operation comprises a second operation on a second control in the photographing interface on the terminal, the second control is used to indicate to enable or disable the stabilization function, and the second operation is used to indicate to enable the stabilization function.

10. The image processing method according to claim 1, wherein obtaining the fourth image comprises:
obtaining a first mapping relationship and a second mapping relationship, wherein the first mapping relationship indicates a mapping relationship between each position point in the second cropped area and a corresponding position point in the second image, and the second mapping relationship indicates a mapping relationship between each position point in the fourth cropped area and a corresponding position point in the second cropped area; and
obtaining the fourth image based on the second image, the first mapping relationship, and the second mapping relationship.

11. The image processing method according to claim 1, wherein
performing the perspective distortion correction on the first cropped area comprises: performing optical distortion correction on the first cropped area to obtain a corrected first cropped area; and performing perspective distortion correction on the corrected first cropped area;
obtaining the third image comprises: performing optical distortion correction on the third cropped area to obtain a corrected third cropped area; and obtaining the third image based on the first image and the corrected third cropped area;
performing the perspective distortion correction on the second cropped area comprises: performing optical distortion correction on the second cropped area to obtain a corrected second cropped area; and performing perspective distortion correction on the corrected second cropped area; or
obtaining the fourth image comprises: performing optical distortion correction on the fourth cropped area to obtain a corrected fourth cropped area; and obtaining the fourth image based on the second image and the corrected fourth cropped area.

12. An image processing apparatus, comprising:
a processor; and
a memory coupled to the processor to store instructions, which when executed by the processor, cause the image processing apparatus to:
perform stabilization on an acquired first image to obtain a first cropped area;
perform stabilization on an acquired second image to obtain a second cropped area, wherein the second cropped area is related to the first cropped area and shake information, and the shake information indicates a shake that occurs in a process in which the image processing apparatus acquires the first image and the second image, and the first image and the second image are a pair of original images that are acquired by the image processing apparatus and are adjacent to each other in time domain;
perform perspective distortion correction on the first cropped area to obtain a third cropped area;
perform perspective distortion correction on the second cropped area to obtain a fourth cropped area;
obtain a third image based on the first image and the third cropped area;
obtain a fourth image based on the second image and the fourth cropped area; and
generate a target video based on the third image and the fourth image.

13. The image processing apparatus according to claim 12, wherein a direction of an offset of a position of the second cropped area relative to a position of the first cropped area in the first image is opposite to a shake direction, on an image plane, of the shake that occurs in the process in which the image processing apparatus acquires the first image and the second image.

14. The image processing apparatus according to claim 12, wherein
the first cropped area indicates a first sub-area in the first image, and the second cropped area indicates a second sub-area in the second image; and
a similarity between first image content, in the first image, corresponding to the first sub-area and second image content, in the second image, corresponding to the second sub-area is greater than a similarity between the first image and the second image.

15. The image processing apparatus according to claim 12, wherein the instructions, which when executed by the processor, further cause the image processing apparatus to:
before performing the stabilization on the acquired first image, detect that the image processing apparatus satisfies a distortion correction condition, and enable a distortion correction function.

16. The image processing apparatus according to claim 12, wherein the instructions, which when executed by the processor, further cause the image processing apparatus to:
performing the stabilization on the acquired first image, detect that the image processing apparatus satisfies a stabilization condition, and enable a stabilization function.

17. The image processing apparatus according to claim 16, wherein detecting that the image processing apparatus satisfies the stabilization condition comprises:
detecting a second enabling operation of the user for enabling the stabilization function, wherein the second enabling operation comprises a second operation on a second control in the photographing interface on the image processing apparatus, the second control is used to indicate to enable or disable the stabilization function, and the second operation is used to indicate to enable the stabilization function.

18. The image processing apparatus according to claim 12, wherein obtaining the fourth image comprises:
obtaining a first mapping relationship and a second mapping relationship, wherein the first mapping relationship indicates a mapping relationship between each position point in the second cropped area and a corresponding position point in the second image, and the second mapping relationship indicates a mapping relationship between each position point in the fourth cropped area and a corresponding position point in the second cropped area; and
obtaining the fourth image based on the second image, the first mapping relationship, and the second mapping relationship.

19. The image processing apparatus according to claim 12, wherein
performing the perspective distortion correction on the first cropped area comprises: performing optical distortion correction on the first cropped area to obtain a corrected first cropped area; and performing perspective distortion correction on the corrected first cropped area;
obtaining the third image comprises: performing optical distortion correction on the third cropped area to obtain a corrected third cropped area; and obtaining the third image based on the first image and the corrected third cropped area;
performing the perspective distortion correction on the second cropped area comprises: performing optical distortion correction on the second cropped area to obtain a corrected second cropped area; and performing perspective distortion correction on the corrected second cropped area; or
obtaining the fourth image comprises: performing optical distortion correction on the fourth cropped area to obtain a corrected fourth cropped area; and obtaining the fourth image based on the second image and the corrected fourth cropped area.

20. A non-transitory computer-readable storage medium, comprising a program, which when run on a computer, cause the computer to perform operations, the operations comprising:
performing stabilization on an acquired first image to obtain a first cropped area;
performing perspective distortion correction on the first cropped area to obtain a third cropped area;
obtaining a third image based on the first image and the third cropped area;
performing stabilization on an acquired second image to obtain a second cropped area, wherein the second cropped area is related to the first cropped area and shake information, and the shake information indicates a shake that occurs in a process in which a terminal acquires the first image and the second image;
performing perspective distortion correction on the second cropped area to obtain a fourth cropped area;
obtaining a fourth image based on the second image and the fourth cropped area; and
generating a target video based on the third image and the fourth image;
wherein the first image and the second image are a pair of original images that are acquired by the terminal and are adjacent to each other in time domain.

* * * * *